US008876167B2

(12) United States Patent
Kiuchi et al.

(10) Patent No.: US 8,876,167 B2
(45) Date of Patent: Nov. 4, 2014

(54) ANTI-COUNTERFEIT PRINTED MATTER

(75) Inventors: Masato Kiuchi, Kashiwa (JP); Toshihiro Kimura, Tokyo-To (JP); Yoshinobu Matsumoto, Tokyo-To (JP); Kenichiro Yoneyama, Ina-Machi (JP)

(73) Assignee: National Printing Bureau, Incorporated Administrative Agency, Tokyo-To (JP)

(*) Notice: Subject to any disclaimer, the term of this patent is extended or adjusted under 35 U.S.C. 154(b) by 314 days.

(21) Appl. No.: 13/122,291

(22) PCT Filed: Oct. 1, 2009

(86) PCT No.: PCT/JP2009/067144
§ 371 (c)(1), (2), (4) Date: Apr. 1, 2011

(87) PCT Pub. No.: WO2010/038824
PCT Pub. Date: Apr. 8, 2010

(65) Prior Publication Data

US 2011/0181035 A1 Jul. 28, 2011

(30) Foreign Application Priority Data

Oct. 3, 2008 (JP) ................................ 2008-258770
Jul. 7, 2009 (JP) ................................ 2009-160673

(51) Int. Cl.
*B42D 15/00* (2006.01)
*B42D 15/10* (2006.01)
*G09C 3/00* (2006.01)

(52) U.S. Cl.
CPC ......... *B42D 15/0013* (2013.01); *Y10S 283/901* (2013.01); *Y10S 283/902* (2013.01)
USPC .................. 283/98; 283/72; 283/73; 283/74; 283/93; 283/901; 283/902

(58) Field of Classification Search
USPC .................. 283/72, 73, 74, 93, 98, 901, 902
See application file for complete search history.

(56) References Cited

U.S. PATENT DOCUMENTS 6,103,353 A * 8/2000 Gasper et al. .................. 283/72
2007/0246930 A1* 10/2007 Wicker .......................... 283/73

FOREIGN PATENT DOCUMENTS

JP 56-19273 B2 5/1981
JP 2-127078 A 5/1990

(Continued)

OTHER PUBLICATIONS

"Hidden and scrambled images," Conference on Optical Security and Counterfeit Deterrence Techniques IV, Jan. 28, 2002, SPIE vol. 4677, pp. 333-348.

*Primary Examiner* — Shelley Self
*Assistant Examiner* — Justin V Lewis
(74) *Attorney, Agent, or Firm* — Birch, Stewart, Kolasch & Birch, LLP

(57) ABSTRACT

This invention relates to an anti-counterfeit printed matter, including securities such as banknotes, stock certificates, and bonds, various kinds of certificates, and important documents, which requires anti-counterfeit or anti-copy.
[Solving Means] A visible image is formed by a first object group arrayed in a first direction at a predetermined pitch and a second object group arranged in the non-imaging area of the first object group. The second object group forms the negative and positive images of a first invisible image by arbitrarily arranging two kinds of objects in pairs in the on/off relationship. Addition, in the anti-counterfeit printed matter, the first object group includes object portions that are formed in at least two height levels from the surface of the printed matter so as to have a predetermined difference in height, thereby forming a second invisible image.

20 Claims, 54 Drawing Sheets

(56) References Cited

FOREIGN PATENT DOCUMENTS

| | | | |
|---|---|---|---|
| JP | 2004-174997 | A | 6/2004 |
| JP | 2004-202951 | A | 7/2004 |
| JP | 2005-262492 | A | 9/2005 |
| JP | 2007-015120 | A | 1/2007 |
| JP | 2007-043171 | A | 2/2007 |
| JP | 4013450 | B2 | 11/2007 |
| JP | 4132122 | B2 | 8/2008 |

* cited by examiner (a)

ANTI-COUNTERFEIT PRINTED MATTER

TECHNICAL FIELD

The present invention relates to an anti-counterfeit printed matter, including securities such as banknotes, stock certificates, and bonds, various kinds of certificates, and important documents, which requires anti-counterfeit or anti-copy.

BACKGROUND ART

When expressing the continuous tone of a design on a printed matter, the design in print colors on the printed matter is constituted by fine figure groups of dots, lines, and the like, and the shapes and sizes of the fine figures are controlled based on the density of the continuous tone of the design. Continuous tone expression methods include screen continuous tone expression that expresses a continuous tone by fine constituent element groups made of equilateral polygon arrays of halftone dots and the like, and a line tone expression method that forms the outlines, patterns, and the like of a motif (for example, a person, landscape, object, or pattern) in a design by pictorial dots and fine lines.

In the above-described line tone expression method that forms a pattern using pictorial dots and fine lines, the shade (continuous tone) and texture of a motif in a design are expressed using a sketch-like drawing technique. Since the dots and fine lines of the design, for example, intersect and congest, the object shapes and arrangements on the printed matter are complex. The above-described line tone expression method that forms a pattern using pictorial dots and fine lines is therefore a continuous tone expression method capable of reflecting intention in designing. As the main expression technique, when objects are "lines", the density of the design can be expressed by the object widths and the sparseness of object arrangements. When objects are "dots", the density of the design can be expressed by the dot sizes and the sparseness of dots.

The typical technique of the above-described line tone expression method that forms a pattern using pictorial dots and fine lines is used to express the tone of a motif in a design like the intaglio-printed image of a banknote. For example, a printed matter having complex objects of dots and fine lines formed by the line tone expression method is hard to duplicate because of the complex object arrangement. In addition, allowing an ordinary person, when trained, to identify during circulation on the market whether the object shapes are authentic by observation using a magnifier or the like, the patterns formed by the method are used all over the world for printed matters such as securities having monetary values. Simultaneously, patterns formed by the line tone expression method add a quality appearance in design, and have therefore been the necessaries of printed matters including securities such as banknotes, stock certificates, and bonds, various kinds of certificates, and important documents (to be referred to as "securities" hereinafter) since old times. FIG. 1 shows an example of the general line tone expression method. In the line tone expression method, main lines 4 and sub-lines 5 exist on a printed pattern 3 of a printed matter 1, as indicated by the partial enlarged view (circle) of the printed pattern 3. In many cases, the main lines 4 have tonal elements. As for the tonal elements of the main lines 4 that express light and shade of a design, the objects of the main lines 4 are thinned to produce lightness or thickened to bring about darkness, thereby expressing a continuous tone. Note that in the example of FIG. 1, the main lines 4 are illustrated as horizontal parallel lines, and the sub-lines 5 as 45° parallel lines. However, the angles of the parallel lines are not particularly limited.

Various techniques are applied to a background pattern called a ground object pattern to produce an anti-counterfeit effect on printed matters of securities. However, along with the recent advent of high-quality color copying machines and computerized color plate making techniques, certificate document counterfeit techniques tend to be rich in variety. Measures against certificate document counterfeit cope with this by growing in sophistication. However, this leads to an increase in manufacturing cost necessary for anti-counterfeit, and for example, introducing dedicated facilities including special machines and tools for obtaining an environment to confirm the anti-counterfeit effect sometimes requires higher cost for authenticity determination.

To determine authenticity of securities such as banknotes, stock certificates, and bonds, various kinds of certificates, and important documents, an anti-counterfeit technique called latent image intaglio has been used for a long time. The latent image intaglio produces the effect by using projecting objects formed by intaglio ink or the like. For example, as indicated by a printed matter 11 shown in FIG. 42, an object group 13 that forms the background of a printed pattern 12 and an object group 14 that forms a latent image are arranged as parallel line objects in two directions with an angular difference of 90°. When the printed surface of the printed matter 11 is observed from the front, it is not easy to recognize the latent image pattern "P". However, when observing from off-center, as shown in FIG. 43, adjacent projecting objects of the object group 13 formed by, for example, intaglio ink overlap each other at the viewing angle. For this reason, the object group 13 has a low lightness (high density) than that of the objects 14 that form the actual latent image portion. The latent image "P" thus appears as a visible image. In place of the parallel line objects in two directions, objects in one direction may be used by changing the projection height of the intaglio ink (for example, patent reference 1). This technique features easy authenticity determination without using a special discrimination tool.

On the other hand, there exists a useful technique that enables more remarkable authenticity determination using a simple discrimination tool on a printed matter. More specifically, a discrimination tool is overlaid on a printed matter containing an invisible image, thereby making the invisible image visible. The major form of the discrimination tool is a lenticular lens or a transparent sheet (to be referred to as a "parallel line filter" hereinafter) with a parallel line screen printed on it. The techniques of visualizing an invisible image are roughly classified into two types: dot phase modulation and line phase modulation.

As a printed matter whose latent image is visualized upon overlaying a discrimination tool formed from such a parallel line filter and an authenticity determination method therefor, there exists a printed matter having a background image portion printed by parallel line (or halftone dot) objects and a latent image portion printed by parallel line (or halftone dot) objects in a phase different from that of the background image portion. The background image portion and latent image portion of the printed matter appear to be hard to visually recognize discriminately. However, a method is known which allows to visually recognize the background image portion and latent image portion discriminately by overlaying a parallel line filter on the printed matter at a predetermined position.

An example of dot phase modulation includes an image forming method and a printed matter with patterns phasemodulated in the first and second directions, in which a first multi-tone image is formed by overlaying a parallel line filter so as to make the first direction of the printed matter coincide with the parallel line pattern of the parallel line filter, and a second multi-tone image is formed by changing the overlay angle of the parallel line filter so as to make the second direction of the printed matter coincide with the parallel line pattern (see, for example, patent reference 2).

Another example of dot phase modulation is a printed matter in which dots of a dot pattern whose image becomes visible upon overlaying a lens array (for example, flyeye lens, honeycomb lens, or lenticular lens) on the base material include halftone dots in at least two types of screen line numbers and at least two types of screen angles. If the printed matter is authentic, the percent dot area of the dots of the dot pattern does not change. Hence, an invisible image is visualized by overlaying a lens array. If the printed matter is a duplication, the dots reproduced by the size of the screen line number or the halftone dot angle degrade, and the dot density changes. Hence, an image different from the invisible image becomes visible on the printed matter (see, for example, patent reference 3).

An example of dot phase modulation on abroad is Isogram available from Astron Design, Netherlands (see, for example, non-patent reference p. 1340). More specifically, as indicated by a printed matter shown in FIG. 60(*a*), a flat pattern having an apparently uniform density includes an invisible image formed by the phase of fine halftone dots upon enlargement, as shown in FIG. 60(*b*). When a dedicated sheet is overlaid on the printed matter, the invisible image is made visible as a negative or positive image, as shown in FIG. 60(*c*) or 60(*d*). However, it is impossible to clearly visualize the image because of the flat pattern having a uniform density.

The present applicants have applied for a patent concerning a printed matter using dot phase modulation. This is a latent image printed matter having two latent image patterns formed by periodically arraying a plurality of isochromatic pixels on a base material. The printed matter has a first latent image pattern (invisible image) in a first region where the plurality of pixels are arrayed with a phase shift in the first direction and a second latent image pattern (invisible image) in a second region printed by a functional ink (see, for example, patent reference 4).

An example of line phase modulation is a printed matter having line portions and non-line portions on a base material, in which a plurality of kinds of latent image parallel line patterns each printed in a different color and having a latent image portion formed by shifting the parallel line phase by a ½ pitch with respect to a parallel line pattern having a single pitch and width are superimposed at different angles and printed, and the latent image portion is made visible by overlaying a film having the same pitch as that of the parallel line pattern of the printed matter on the plurality of kinds of invisible images (see, for example, patent reference 5).

An example of line phase modulation on abroad is HIT (Hidden Image Technology) available from Jura, Hungary (see non-patent reference p. 1341). As shown in FIG. 61(*a*), a flat pattern having an apparently uniform density includes an invisible image formed by the phase of fine parallel lines upon enlargement, as shown in FIG. 61(*b*). When a dedicated sheet is overlaid on the printed matter, the invisible image is made visible as a negative or positive image, as shown in FIG. 61(*c*) or 61(*d*). Note that since it may be possible to identify the invisible image of the printed matter in FIG. 61(*a*) by normal observation, a visible image is formed as a camouflage pattern by changing the object width of some parallel lines, as shown in FIG. 61(*b*). Hollow objects may be used to form the visible image. However, when the invisible image is made visible by overlaying the dedicated sheet, the camouflage pattern is simultaneously visualized as a visible image to impede visibility of the visualized invisible image.

In general, a pattern formed by dot phase modulation or line phase modulation is flat.

There has also been proposed an anti-counterfeit image printed matter, in which a unit block is divided into m columns×n rows to form minimum unit blocks b1, b2, b3, b4, . . . having the same shape. Latent images G1, G2, G3, G4, . . . whose pixel units g1, g2, g3, g4, . . . are the minimum unit blocks b1, b2, b3, b4, . . . , respectively, are formed on an image forming sheet. The pixel units g1, g2, g3, g4, . . . are parallel line patterns each formed from one or more parallel lines. One of the different parallel line patterns that are formed from parallel lines at parallel line pitches p including pitches p1, p2, p3, p4, . . . and parallel line angles θ including parallel line angles θ1, θ2, θ3, θ4, . . . constructs the anti-counterfeit image printed matter. Visualizing parallel line sheets obtained by forming, on transparent sheets, different parallel line patterns formed from parallel lines having the same parallel line pitches p and parallel line angles θ as those of the parallel line patterns constructing the pixel units g1, g2, g3, g4, . . . are overlaid, thereby visualizing the latent images G1, G2, G3, G4, . . . (for example, patent reference 6).

The anti-counterfeit image printed matter according to patent reference 6 visualizes the plurality of latent images by changing the parallel line pattern pitch and angle between the unit pixels. However, the visible image can only be expressed as a uniform background pattern. To visualize the latent images, transparent sheets that require pitches and angles conforming to the parallel line patterns of the unit pixels of the latent images are necessary. That is, a plurality of discrimination tools need to be prepared.

In addition, the techniques disclosed in non-patent reference 1 and patent references 2 to 5 cannot completely nonvisualize a latent image, that is, an embedded image. Low affinity to the designs of securities poses the most serious problem because it is hard to apply the techniques to the above-described line tone expression method. Furthermore, the techniques disclosed in non-patent reference 1 and patent references 2 to 5 need an extra printing process in addition to the process of forming a printed pattern by the above-described line tone expression method. This results in an increase in the manufacturing cost necessary for the anti-counterfeit measure.

PRIOR ART REFERENCES

Patent References

Patent reference 1: Japanese Utility Model Publication No. 56-19273
Patent reference 2: Japanese Patent No. 4132122
Patent reference 3: Japanese Patent No. 4013450
Patent reference 4: Japanese Patent Application No. 2007-43171
Patent reference 5: Japanese Patent Laid-Open No. 2004-174997
Patent reference 6: Japanese Patent Laid-Open No. 2007-015120

NON-PATENT REFERENCE

Non-patent reference 1: Optical Security and Counterfeit Deterrence Techniques IV Vol. 4677 (by SPIE—The International Society for Optical Engineering)

SUMMARY OF THE INVENTION

Securities need many objects having an anti-counterfeit effect on a printed surface. However, the printed surface has only a limited area, and there is demanded an anti-counterfeit measure capable of providing an effect using a plurality of authenticity determination methods even in a small printed area.

In the above-described conventional printed matters, the latent image is formed from print objects having a flat density. It is therefore impossible to form an invisible image that can clearly be visualized. In the conventional printed matters, the latent image may be recognized visually before the discrimination tool is overlaid. To prevent the latent image from being visually recognized in advance, the width of the shift between the latent image and the background pattern needs to be decreased by making the objects or halftone dots smaller. However, this may degrade the visibility of the latent image when the discrimination tool is overlaid. In addition, the objects or halftone dots of the printed matter are not tactile in themselves.

Even if some kind of visible image is provided, it is formed by simple hollow objects, as in the printed matter described in patent reference 3, and therefore impedes the visibility of the visualized invisible image. Furthermore, some printed matters require a plurality of discrimination tools, like that described in patent reference 6.

The present invention has been made in consideration of the above-described situations, and has as its object to provide an anti-counterfeit printed matter which forms an invisible image capable of clearly becoming visible via a single discrimination tool, makes the invisible image hard to visually recognize before the discrimination tool is overlaid without making objects, halftone dots, and a shift width smaller, and prevents any region other than the invisible image from impeding the visibility of the visualized invisible image, or to provide an anti-counterfeit printed matter which enables easy authenticity determination with or without a discrimination tool by obtaining an anti-counterfeit effect using a plurality of authenticity determination methods, forms an invisible image capable of clearly becoming visible even when the discrimination tool is used, makes the invisible image hard to visually recognize before the discrimination tool is overlaid without making objects, halftone dots, and a shift width smaller, and prevents any region other than the invisible image from impeding the visibility of the visualized invisible image.

Solutions to the Problems

An anti-counterfeit printed matter according to the present invention is characterized in that a visible image is formed by a first object group arrayed in a first direction at a predetermined pitch and a second object group arranged in a non-imaging area of the first object group, the second object group is arrayed in a second direction with respect to the first object group, the second object group forms a negative region and a positive region of an invisible image, the second object group includes a plurality of second objects that form one of the negative region and the positive region of the invisible image, a plurality of third objects that form the other region, and a plurality of fourth objects that relax density imbalance, an object area of the second object is the same or substantially the same as that of the third objects, and the fourth object has an object area ½ or substantially ½ that of the second object or the third objects, the second objects, the third objects, and the fourth objects are formed in a plurality of object units that are periodically arrayed, the plurality of object units include a first object unit, a second object unit, a third object unit, and a fourth object unit, the first object unit and the second object unit have the same size, the third object unit and the fourth object unit include an object unit whose size in the first direction is twice as large as that of the first object unit and the second object unit, in the first object unit, the second object is formed so as to pass through a center of the first object unit, in the second object unit, the third objects in pair are obtained by dividing the second object and formed at equal intervals from a center of the second object unit so as to oppose each other, in the third object unit, the second object, the fourth object, and one of the third objects in pair are sequentially formed, in the fourth object unit, the other of the third objects in pair, the fourth object, and the second object are sequentially formed, and one of the third object unit and the fourth object unit is formed on at least part of an outline of the invisible image.

An anti-counterfeit printed matter according to the present invention is characterized in that the third object unit formed on the outline of the invisible image is arranged on one side of the first object unit along the first direction, and the fourth object unit formed on the outline of the invisible image is arranged on the other side of the first object unit along the first direction.

An anti-counterfeit printed matter according to the present invention is characterized in that the second objects, the third objects, and the fourth objects are formed as one line across the object units adjacent in the second direction.

An anti-counterfeit printed matter according to the present invention is characterized in that when a width of the first object unit and the second object unit in the first direction is represented by 4, and a width of the third object unit and the fourth object unit in the first direction is represented by 8, the second object formed in the first object unit is arranged such that a center of the second object coincides with a center of the first object unit at a position based on a ratio of "2:2" in first direction, the third objects formed in the second object unit are arranged as a pair of objects at two edges of the second object unit based on ratios of "0:4" and "4:4" in the first direction so as to oppose each other, the second object, the fourth object, and one of the third objects in pair formed in the third object unit are arranged at positions based on a ratio of "2:3:3" in the first direction such that the center of the second object is spaced apart from one edge by 2, a center of the fourth object is spaced apart from the center the second object by 3, and one of the third objects in pair is spaced apart from the center of the fourth object by 3, and the other of the third objects in pair, the fourth object, and the second object formed in the fourth object unit are arranged at positions based on a ratio of "3:3:2" in the first direction such that the one of the third objects in pair is arranged at one edge, a center of the fourth object is spaced apart by 3, and the second object is spaced apart from the center of the fourth object by 3.

An anti-counterfeit printed matter according to the present invention is characterized in that each of the second object, the third object, and the fourth object has a triangular shape.

An anti-counterfeit printed matter according to the present invention is characterized in that a visible image is formed by a first object group formed radially from a center and a second object group arranged in a non-imaging area of the first object group, the second object group is arrayed concentrically from the center at a predetermined pitch, the second object group forms a negative region and a positive region of an invisible image, the second object group includes a plurality of second objects that form one of the negative region and the positive region of the invisible image, a plurality of third objects that form the other region, and a plurality of fourth objects that relax density imbalance, an object width of the second object is the same or substantially the same as that of the third object, the fourth object has an object width ½ or substantially ½ that of the second object or the third object width, the second objects, the third objects, and the fourth objects are formed in a plurality of arch-shaped object units that are periodically arrayed, the plurality of arch-shaped object units include a first object unit, a second object unit, a third object unit, and a fourth object unit, the first object unit and the second object unit have the same size, the third object unit and the fourth object unit include an object unit having a size larger than that of the first object unit and the second object unit and a shape elongated toward the center in a concentric direction with respect to the first object unit and the second object unit, in the first object unit, the second object is formed in the concentric direction at a predetermined position, in the second object unit, the third object is formed in the concentric direction at a position shifted from a formation position of the first object by a ½ or substantially ½ pitch, in the third object unit, the second object, the fourth object, and the third object are sequentially formed, in the fourth object unit, the third object and the fourth object are sequentially formed, and one of the third object unit and the fourth object unit is formed on at least part of an outline of the invisible image.

An anti-counterfeit printed matter according to the present invention is characterized in that the first object group and the second object group are formed from projecting objects.

An anti-counterfeit printed matter according to the present invention is characterized in that fifth object units and sixth object units that have the same area are arranged in a matrix on a surface of a base material, the fifth object unit has a first object arranged to run in a first direction, and a second object arranged at a first position in a region where the first object does not exist, the sixth object unit has the first object arranged to run in the first direction, and a third object arranged at a second position in the region where the first object does not exist, the first object has a first object portion having a first height from the surface of the base material and a second object portion having a second height different from the first height, thereby forming a first invisible image, and a region where one of the fifth object unit and the sixth object unit is arranged forms an image portion of a second invisible image, whereas a region where the other is arranged forms a background portion of the second invisible image.

An anti-counterfeit printed matter according to the present invention is characterized in that the first invisible image is visually recognizable from a predetermined angle range different from 90° with respect to the base material, and the second invisible image is visually recognizable by enlarging the second object arranged at the first position in each of the plurality of fifth object units or by enlarging the third object arranged at the second position in each of the plurality of sixth object units.

An anti-counterfeit printed matter according to the present invention is characterized in that when the sixth object unit is arranged on one side of the fifth object unit, one of the second object in the fifth object unit and the third object in the sixth object unit is deleted, and a fourth object having an object area ratio ½ or substantially ½ that of the second object and the third object is arranged substantially at a center of one of the fifth object unit and the sixth object unit in which the object has been deleted so as to relax density imbalance, and when the sixth object unit is arranged on the other side of the fifth object unit along the first direction, the fourth object is arranged at a position corresponding to a boundary line between the fifth object unit and the sixth object unit.

An anti-counterfeit printed matter according to the present invention is characterized in that the first objects, the second objects, the third objects, and the fourth objects are formed in a plurality of object units, the plurality of object units include a first object unit, a second object unit, a third object unit, and a fourth object unit, the first object unit and the second object unit have the same size, a size of the third object unit and the fourth object in the first direction is twice as large as that of the first object unit and the second object unit, in the first object unit, the second object is arranged so as to pass through a center of the first object unit, in the second object unit, the third object in pair having an object area ratio ½ or substantially ½ that of the second object are arranged at equal intervals from a center of the second object unit so as to oppose each other, in the third object unit, the second object, the fourth object, and the third object having the object area ratio ½ or substantially ½ that of the second object are arrayed in the order named, and in the fourth object unit, the third object having the object area ratio ½ or substantially ½ that of the second object, the fourth object, and the second object are arranged in the order named.

An anti-counterfeit printed matter according to the present invention is characterized in that object units arranged adjacently on one side of the first object unit along the first direction are the first object unit and the third object unit, object units arranged adjacently on the other side of the first object unit along the first direction are the first object unit and the fourth object unit, object units arranged adjacently on one side of the second object unit along the first direction are the second object unit and the fourth object unit, and object units arranged adjacently on the other side of the second object unit along the first direction are the second object unit and the third object unit.

An anti-counterfeit printed matter according to the present invention is characterized in that each of the second object, the third object, and the fourth object is formed from a hollow portion.

An anti-counterfeit printed matter according to the present invention is characterized in that a visible image is formed by arranging the first objects whose object area ratio per unit length at least partially varies.

An anti-counterfeit printed matter according to the present invention is characterized in that the visible image is formed by arranging the first objects at least partially in relief.

An anti-counterfeit printed matter according to the present invention is characterized in that the second object element is formed from one of a circle and a polygon.

An anti-counterfeit printed matter according to the present invention is characterized in that the second object element is arranged to be adjacent to the first object element or be integrated with the first object element.

The anti-counterfeit printed matter of the present invention includes a plurality of objects configured to relax density imbalance. For this reason, even if the objects, the halftone dots, and the shift width are not made smaller, the invisible image is hard to visually recognize before the discrimination tool is overlaid. In addition, since it is difficult for the counterfeiter to determine the place where the invisible image is formed on the printed matter, the printed matter is hard to duplicate.

The anti-counterfeit printed matter of the present invention can form a predetermined shift width in the negative and positive regions of the invisible image without making the objects, the halftone dots, and the shift width smaller. Hence, the invisible image is hard to visually recognize in advance. Additionally, upon overlaying the discrimination tool, the invisible image can clearly be visually recognized so that the discriminator can easily confirm it.

According to the present invention, there is provided an anti-counterfeit printed matter which forms an invisible image capable of clearly becoming visible via a single discrimination tool without compromising the design of a pattern made by the line tone expression method. Furthermore, in the anti-counterfeit printed matter of the present invention, the objects are tactile because they project in themselves. It is therefore possible to determine the authenticity based on the presence/absence of tactility.

According to the anti-counterfeit printed matter of the present invention, it is possible to confirm the anti-counterfeit effect of distinguishably visualizing the first invisible image and the second invisible image formed on the printed matter having the limited printing surface of securities in each of the two authenticity determination methods, that is, the method using the discrimination tool and the method without using the discrimination tool.

There is provided an anti-counterfeit printed matter for the method without using the discrimination tool, in which when observing the printed matter from the front, the first invisible image is formed not to compromise the design of the pattern made by the line expression, and when observing the printed matter from off-center, the first invisible image is visualized as a visible image.

DETAILED DESCRIPTION OF THE EMBODIMENTS

Anti-counterfeit printed matters according to the first to ninth embodiments of the present invention will now be described with reference to the accompanying drawings. However, the present invention is not limited to the best mode for carrying out to be described below and also incorporates various other embodiments within the technical scope defined in the appended claims.

Figure 1:
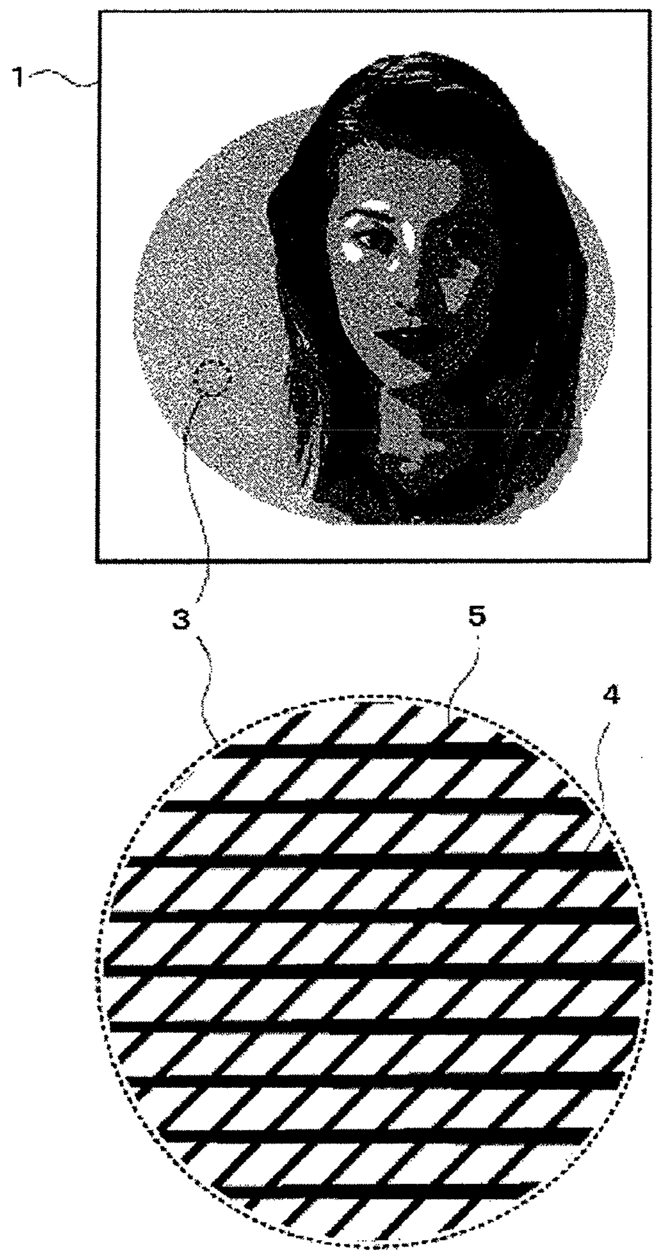
FIG. 1 is an explanatory view showing a state in which a printed pattern 3 including an arbitrary motif is visually recognized.
Figure 2:
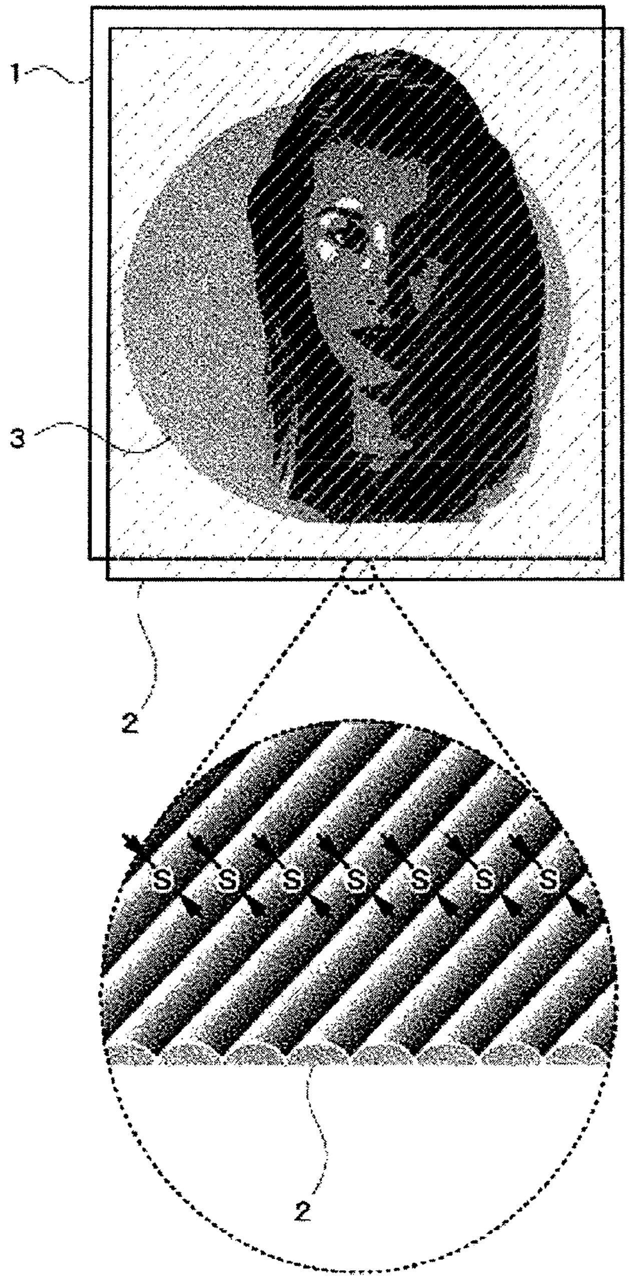
FIG. 2 is an explanatory view showing a state in which an invisible image can easily be visualized to determine the authenticity by overlaying a discrimination tool 2 on a printed matter 1.
Figure 3:
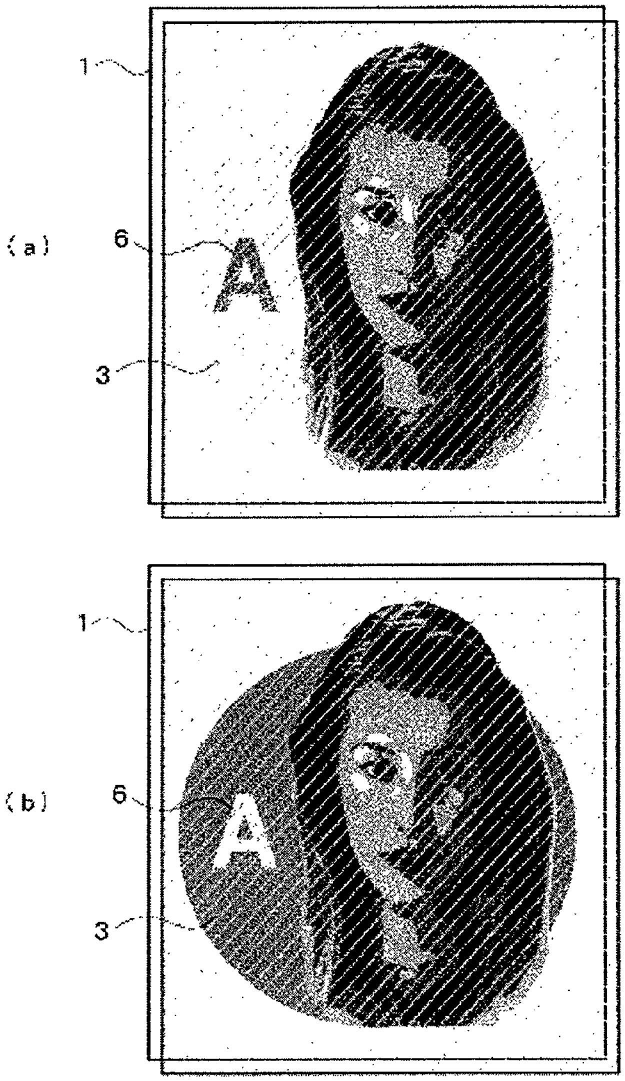
FIG. 3 shows explanatory views of a state in which an invisible image 6 is visualized as a visible image.

In the anti-counterfeit printed matters according to the first to ninth embodiments of the present invention, an invisible image can easily be visualized to determine the authenticity by overlaying a discrimination tool 2 on a printed matter 1, as shown in FIG. 2. The discrimination tool 2 is, for example, a lenticular lens or a parallel line filter constructed by forming a plurality of lines along one direction as parallel lines on a transparent filter. When visually observing a printed pattern 3 of the printed matter 1 under a normal visual conditions, the printed pattern 3 including an arbitrary motif is visually recognized, as shown in FIG. 1. When the lenticular lens, the parallel line filter having lines formed along one direction, or the like provided in the discrimination tool 2 is overlaid on the printed matter 1 at a predetermined angle (for example, 45°), an invisible image 6 as shown in FIG. 3(*a*) or 3(*b*) is visualized as a visible image. The visible image looks like a negative or positive image as shown in FIG. 3(*a*) or 3(*b*) depending on the relative positional relationship between the discrimination tool 2 and the printed matter 1, which is incorporated in the effect of the present invention.

Figure 4:
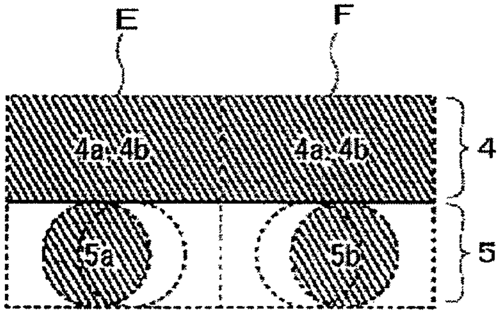
FIG. 4 is a partially enlarged explanatory view showing a basic object arrangement that two-dimensionally represents the positional relationship between figures.

In the printed matter of the present invention, a plurality of object elements having figures in an intentional positional relationship are arranged in a matrix. FIG. 4 simply illustrates the positional relationship of the figures two-dimensionally in the printed matter according to the present invention. As shown in FIG. 4, the printed matter of the present invention includes at least two kinds of object units. Each of object units E and F has a region where a first object 4 is formed and a region where a second or third object is formed. The first object 4 can include a low object portion 4*a* and a high object portion 4*b* to be described later. A second object 5*a* in the object unit E and a third object 5*b* in the object unit F have opposite positional relationships with respect to the longitudinal direction of the first object 4.

The present invention also allows to visually recognize an arbitrary invisible image as a visible image by overlaying the discrimination tool 2 on the printed matter 1, as shown in FIG. 2. The discrimination tool 2 is, for example, a lenticular lens or a parallel line filter constructed by forming a plurality of lines along one direction as parallel lines on a transparent filter. The discrimination tool 2 yields the effect by making each center line in the parallel line filter or the lenticular lens coincide with the second object 5*a* provided in the object unit E or the third object 5*b* provided in the object unit F. The shape of the second object 5*a* and the third object 5*b* is not particularly limited, and important factors are the positional relationship and the heights from the printed surface.

Figure 5:
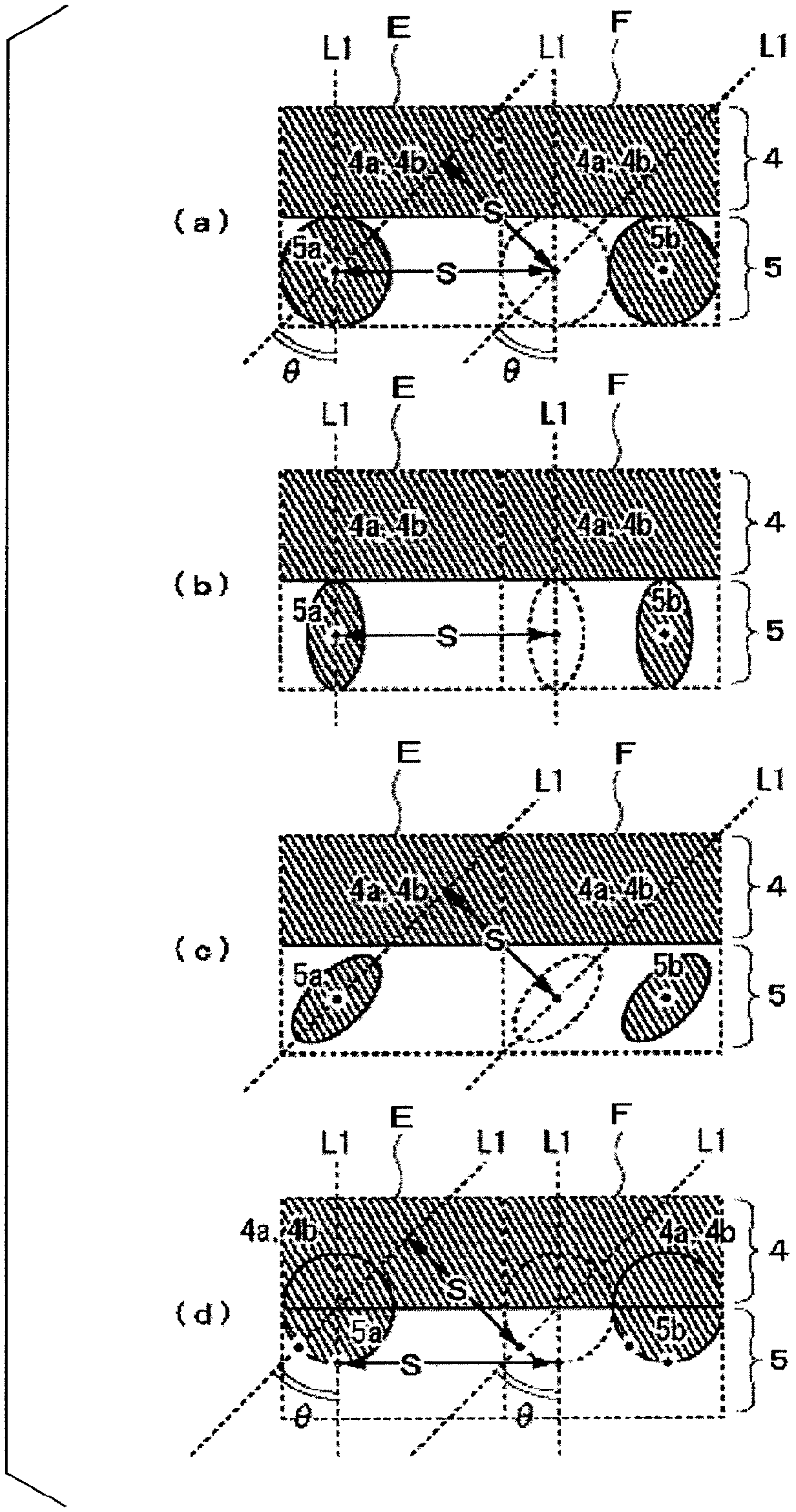
FIG. 5 shows views of examples of the shapes of objects 5*a* and 5*b* of object units E and F.

FIG. 5 shows examples of the shapes of the second object 5*a* and the third object 5*b*. In FIG. 5(*a*), the second object 5*a* and the third object 5*b* are circular. When a line L1 coincides with the discrimination tool 2 shown in FIG. 5, the invisible image can change to the visible image. This will be described later in detail. When the second object 5*a* and the third object 5*b* are circular, as shown in FIG. 5(*a*), an angle θ of the line L1 can range from 90° to almost 45° with respect to the longitudinal direction of the first object 4. When the second object 5*a* and the third object 5*b* are elliptical, as shown in FIG. 5(*b*), the angle of the line L1 is 90°, like the major axis of the ellipses. When the second object 5*a* and the third object 5*b* are elliptical but have a tilted major axis, as shown in FIG. 5(*c*), the line L1 preferably tilts in the same direction. When the second object 5*a* and the third object 5*b* are circular and partially combine with the first objects 4, as shown in FIG. 5(*d*), the line L1 is applied to a line that connects the center of the circular second object 5*a* or third object 5*b* to the external circle. Note that a dimension S shown in FIGS. 5(*a*) to 5(*d*) equals the pitch of the grooves of the discrimination tool 2.

The invisible image is formed by arbitrarily arranging the second objects 5*a* and the third objects 5*b* in the on/off relationship. Hence, when on objects or off objects continue, the object density is visually recognized as a shade, and density imbalance is visually recognized. When on objects are continuously arranged, one of the objects is deleted to relax the density imbalance. When off objects are continuously arranged, a fourth object 5*c* or a fifth object 5*d* having an object area ratio ½ that of the second object 5*a* or the third objects 5*b* is formed at the midpoint between the second objects 5*a* or the third objects 5*b* that are continuously off. This relaxes the density imbalance of the visible image on the printed matter. The objects having the above-described arrangement are formed by four kinds of object units.

Figure 6:
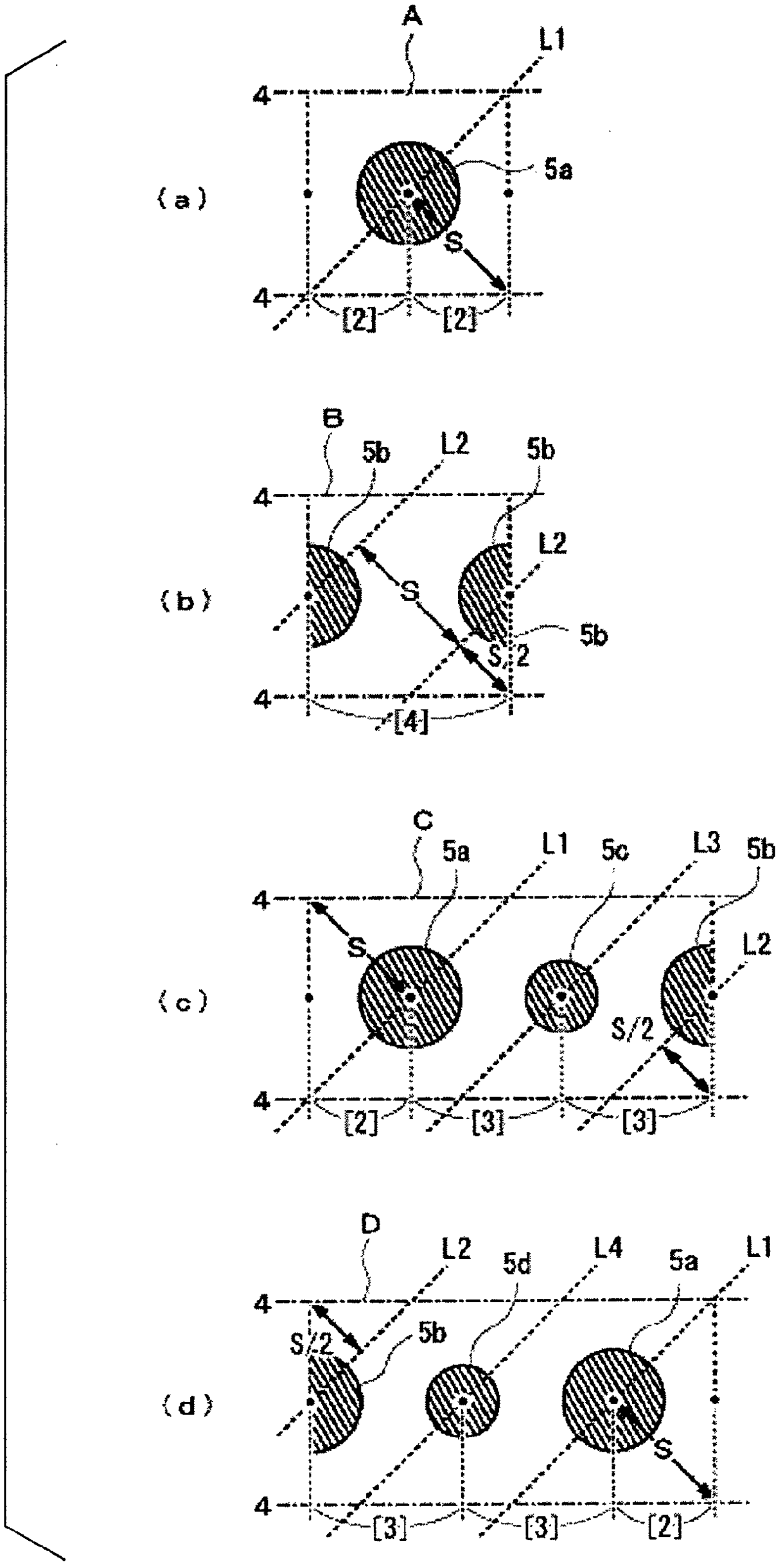
FIG. 6 shows partially enlarged explanatory views of an example of the basic object arrangement of an anti-counterfeit printed matter according to the present invention.

FIG. 6 shows partially enlarged explanatory views of an example of the basic object arrangement of the above-described four kinds of object units. In the present invention, the object units include four object units A to D shown in FIGS. 6(*a*) to 6(*d*). In the object units A to D, object groups including the objects 5*a* to 5*d* are formed in a desired arrangement. Lines L1 to L4 run along the direction of the grooves of the discrimination tool 2 shown in FIG. 2. In FIG. 6, the angle is, for example, 45°, and the dimension S equals the pitch of the grooves of the discrimination tool 2. The object units A to D shown in FIGS. 6(*a*) to 6(*d*) are arranged on the surface of the printed matter in accordance with desired rules. The size of the object units C and D is twice as large as that of the object units A and B in the longitudinal direction of the main line 4. The object 5*a* is arranged in the object unit A shown in FIG. 6(*a*). The pair of objects 5*b* is arranged in the object unit B shown in FIG. 6(*b*). The object 5*a*, the object 5*c*, and one of the objects 5*b* in pair are arranged in the object unit C shown in FIG. 6(*c*). The other of the objects 5*b* in pair, the object 5*c*, and the object 5*a* are arranged in the object unit D shown in FIG. 6(*d*). The object 5*a* arranged in the object unit A shown in FIG. 6(*a*) and the pair of objects 5*b* arranged in the object unit B shown in FIG. 6(*b*) have the same or almost the same object area.

Note that the pair of objects 5*b* includes objects obtained by dividing the object 5*a*. The object 5*c* arranged in the object unit C shown in FIG. 6(*c*) has an object area ½ or almost ½ that of the object 5*a* arranged in the object unit C or the pair of objects 5*b*. The object 5*c* is arranged almost at the midpoint between the object 5*a* and one object 5*b* arranged in the object unit C. The object 5*d* arranged in the object unit D shown in FIG. 6(*d*) has an object area ½ or almost ½ that of the object 5*a* arranged in the object unit D or the pair of objects 5*b*. The object 5*d* is arranged almost at the midpoint between the object 5*a* and the other object 5*b* arranged in the object unit D.

As for the positional relationship of the objects 5*a* to 5*d* of the object units A to D shown in FIGS. 6(*a*) to 6(*d*), they can be arranged based on a ratio of "2:3:4" in the longitudinal direction of the main lines 4. In the object unit A shown in FIG. 6(*a*), the object 5*a* is arranged at a position based on a ratio of "2:2" in the longitudinal direction of the main lines 4. That is, the center of the object 5*a* is arranged at the center of the object unit A. In the object unit B shown in FIG. 6(*b*), the objects 5*b* in pair are arranged at positions based on ratios of "0:4" and "4:4" in the longitudinal direction of the main lines 4. That is, the objects 5*b* in pair are arranged at the two edges of the object unit B. Alternatively, the objects 5*b* in pair may be arranged at equal intervals from the center of the object unit B shown in FIG. 6(*b*) so as to oppose each other. In the object unit C shown in FIG. 6(*c*), the object 5*a*, the object 5*c*, and one of the objects 5*b* are arranged at positions based on a ratio of "2:3:3" in the longitudinal direction of the main lines 4. That is, the center of the object 5*a* is spaced apart from the left edge by 2, the center of the object 5*c* is spaced apart from the object 5*a* by 3, and the other of the objects 5*b* is spaced apart from the object 5*c* by 3. In the object unit D shown in FIG. 6(*d*), the object 5*a*, the object 5*c*, and the other of the objects 5*b* are arranged at positions based on a ratio of "3:3:2" in the longitudinal direction of the main lines 4. That is, the other of the objects 5*b* is arranged at the left edge, the center of the object **5*d* is spaced apart from the object 5*b* by 3, and the center of the object 5*a* is spaced apart from the object 5*d*** by 3.

Figure 7:
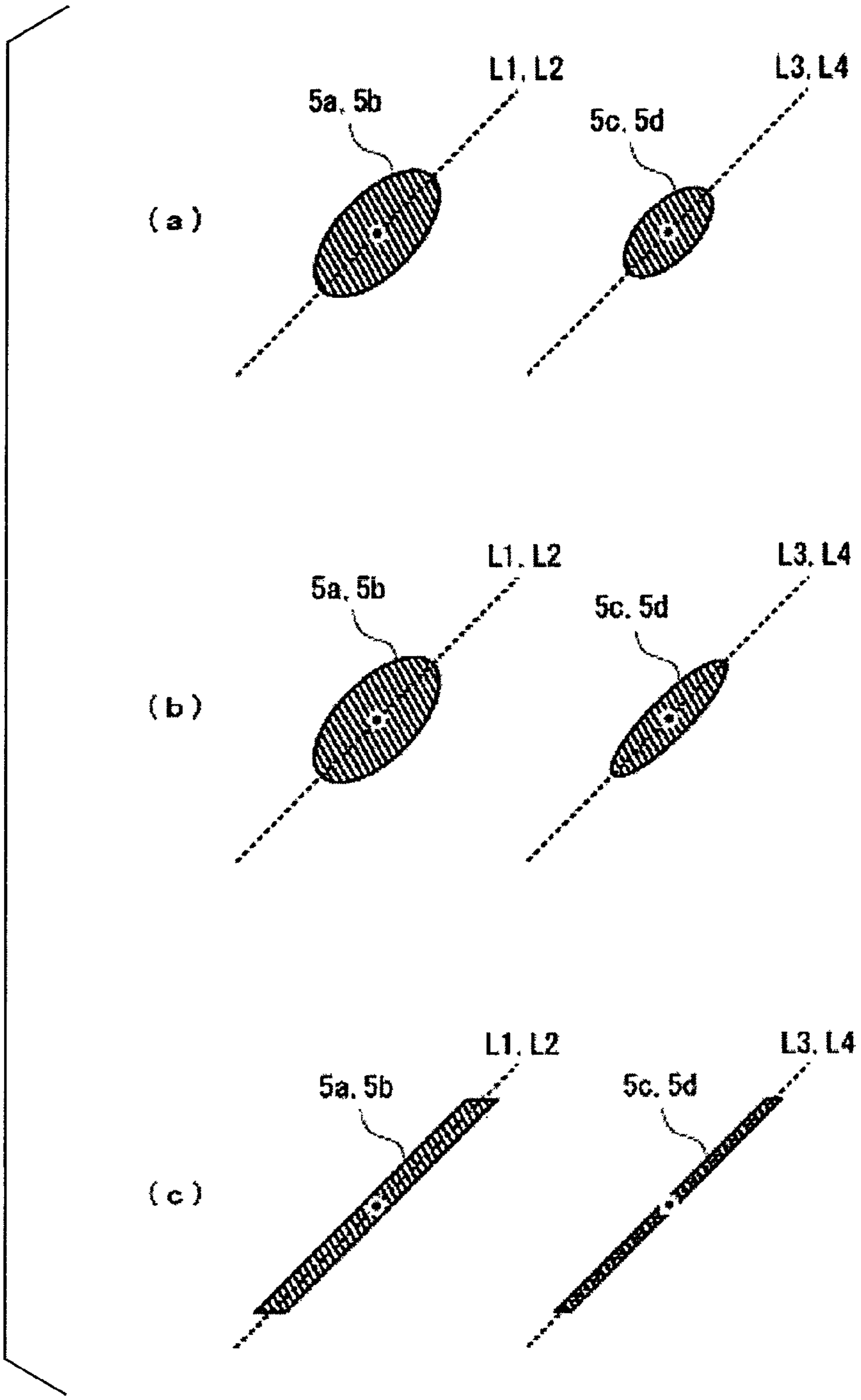
FIG. 7 shows explanatory views of various object shapes with which objects 5*c* and 5*d* have an object area ½ or almost ½ that of the objects 5*a* and 5*b;*

The objects **5*a* to 5*d* of the object units A to D shown in FIGS. 6**(*a*) to 6(*d*) need not always have the shapes shown in FIG. 6 and may have any other shapes. However, the shapes are preferably prolonged in the direction of the lines L1 and L2 or the lines L3 and L4 spaced apart by the dimension S. For example, the objects **5*a* and 5*b* and the objects 5*c* and 5*d* may have similar elliptical shapes, as shown in FIG. 7**(*a*). The objects **5*c* and 5*d* may have an elliptical shape thinner along the direction of the lines L3 and L4 than the objects 5*a* and 5*b*, as shown in FIG. 7**(*b*). The objects **5*a* and 5*b* and the objects 5*c* and 5*d* may be parallelograms having an object width ratio of 2:1 along the direction of the lines L3 and L4, as shown in FIG. 7**(*c*). That is, the shapes of the objects **5*a* to 5*d* are not particularly limited as long as the objects 5*c* and 5*d* have an object area ratio ½ or almost ½ that of the objects 5*a* and 5*b***.

Figure 8:
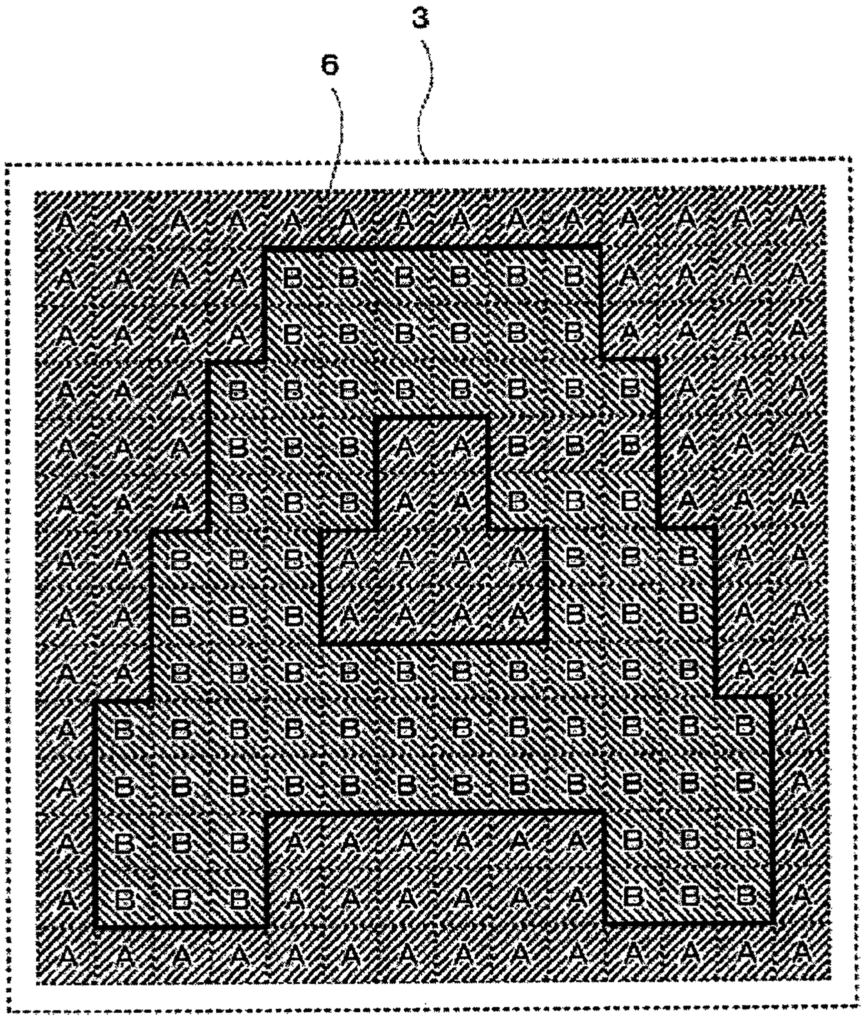
FIG. 8 is an explanatory view showing a positional relationship in which object units A in FIG. 6(*a*) and object units B in FIG. 6(*b*) are continuously periodically arranged in a matrix on the printed pattern 3 of the printed matter tightly in the vertical and horizontal directions.
Figure 9:
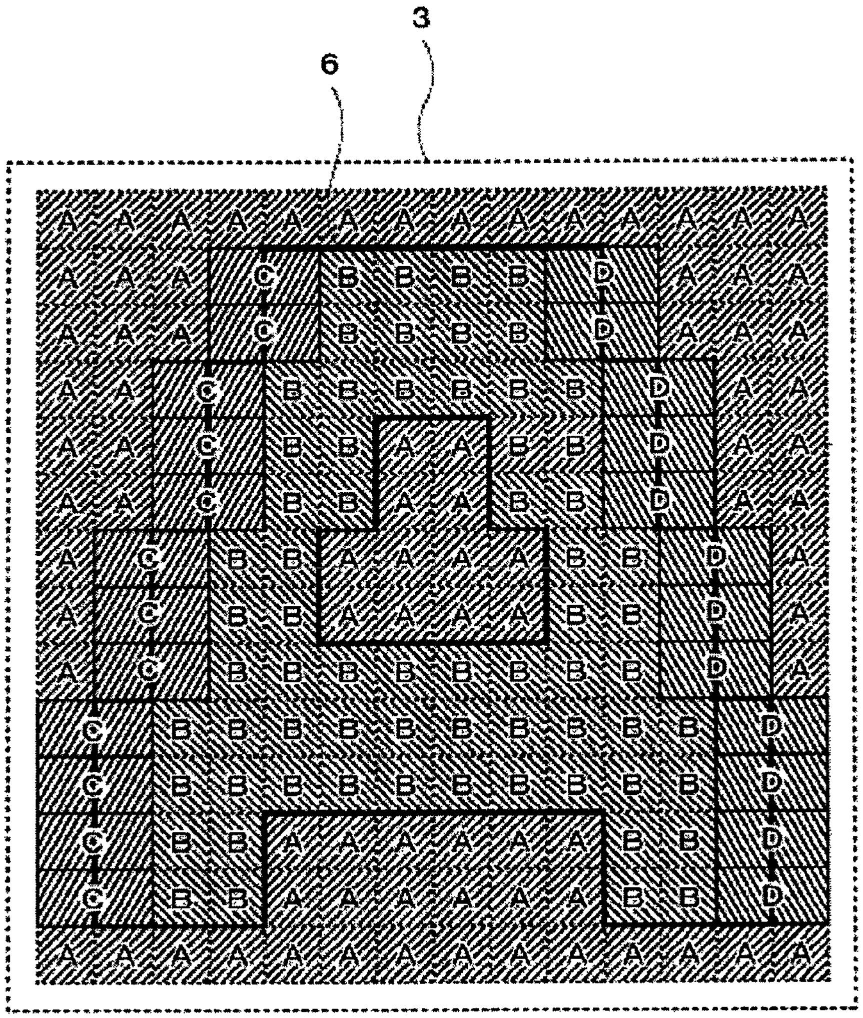
FIG. 9 is an explanatory view showing the positions of object units C and D on the printed pattern 3 based on conditions for arrangement at desired positions.

FIG. 8 is an explanatory view showing a positional relationship in which the object units A in FIG. 6(*a*) and the object units B in FIG. 6(*b*) are continuously periodically arranged in a matrix on the printed pattern 3 of the printed matter tightly in the vertical and horizontal directions. Note that the bold solid lines in FIG. 8 simply indicate the portion of the invisible image 6. In addition, the object units C shown in FIG. 6(*c*) and the object units D shown in FIG. 6(*d*) are arranged on at least part of the outline of the invisible image 6 so as to maintain the continuity of the object groups of the object units A and B. FIG. 9 is an explanatory view showing the positions of the object units C and D on the printed pattern 3 based on conditions for arrangement at desired positions. The object units C are arranged at places where the object units A on the left side and the object units B on the right side are adjacent in the horizontal direction (the longitudinal direction of the main lines 4 shown in FIG. 1). That is, the object units C are arranged on the left outline of the invisible image 6. On the other hand, the object units D are arranged at places where the object units B on the left side and the object units A on the right side are adjacent in the horizontal direction (the longitudinal direction of the main lines 4 shown in FIG. 1). That is, the object units D are arranged on the right outline of the invisible image 6.

(1) First Embodiment

An anti-counterfeit printed matter according to the first embodiment of the present invention will be described.

Figure 10:
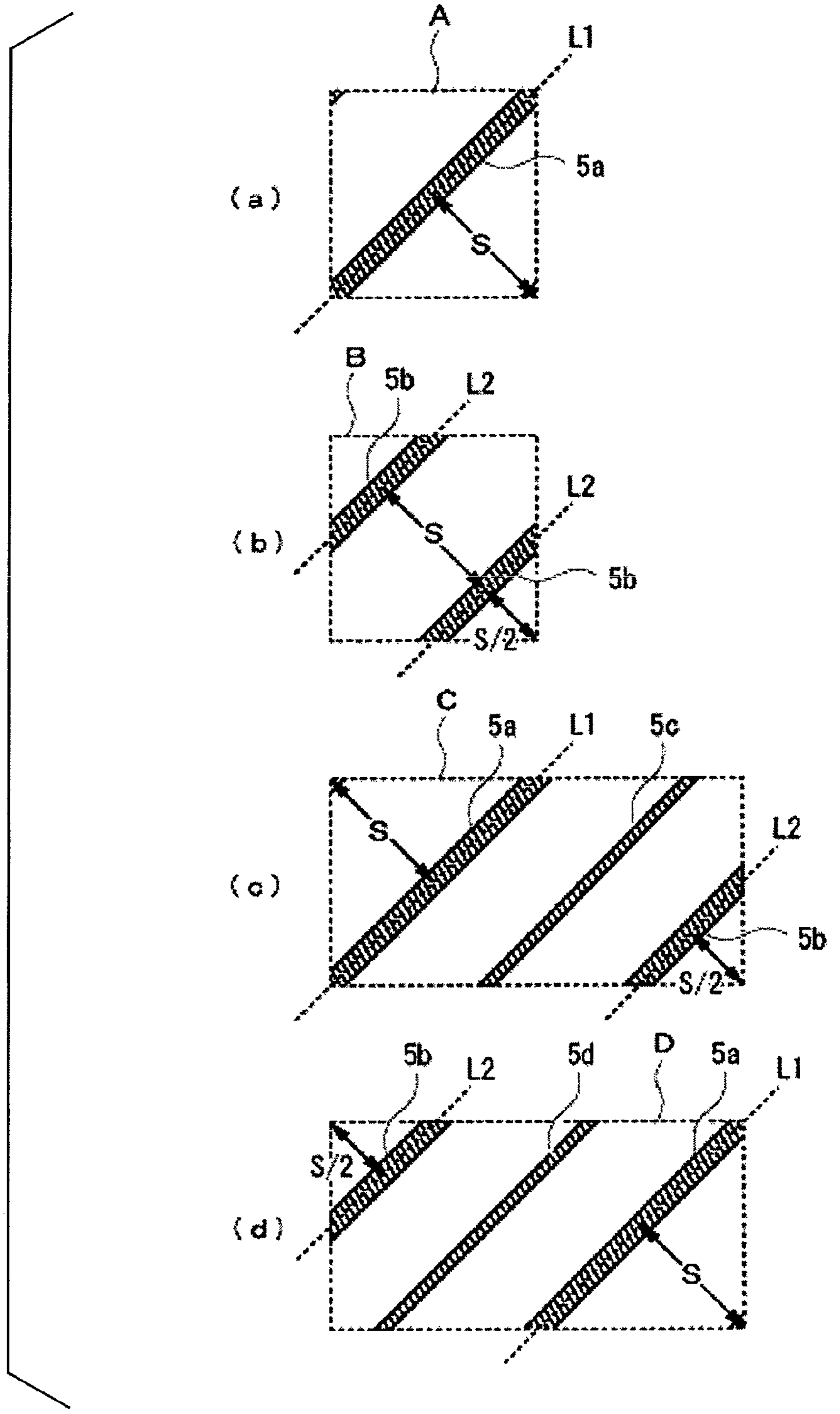
FIG. 10 shows partially enlarged views of the arrangement of objects of the printed pattern of a printed matter according to the first embodiment.

FIG. 10 shows partially enlarged views of the arrangement of objects of the printed pattern of a printed matter according to the first embodiment. A dimension S equals the pitch of the grooves of a discrimination tool 2 such as a parallel line filter or a lenticular lens shown in FIG. 2. The dimension S is 1 mm or less or 195 μm in the first embodiment. Object units A to D shown in FIGS. 10(*a*) to 10(*d*) are arranged on the surface of the printed matter in accordance with desired rules. Each of the object units shown in FIGS. 10(*a*) and 10(*b*) is a square having 276 μm long sides. Each of the object units shown in FIGS. 10(*c*) and 10(*d*) is a rectangle having 276 μm long vertical sides and 552 μm long horizontal sides. An object **5*a* arranged in the object unit A of FIG. 10**(*a*) and a pair of objects **5*b* arranged in the object unit B of FIG. 10**(*b*) have the same or almost the same object area. An object **5*c* arranged in the object unit C of FIG. 10**(*c*) has an object width ½ or almost ½ that of the object **5*a* arranged in the object unit C. That is, the object 5*c* has an object area ½ or almost ½ that of the object 5*a*. In addition, the object 5*c* is arranged almost at the midpoint between the object 5*a* and one of the objects 5*b* arranged in the object unit C. An object 5*d* arranged in the object unit D of FIG. 10**(*d*) has an object width ½ or almost ½ that of the pair of objects **5*b* arranged in the object unit D. That is, the object 5*d* has an object area ½ or almost ½ that of the pair of objects 5*b*. In addition, the object 5*d* is arranged almost at the midpoint between the object 5*a* and the other of the objects 5*b*** arranged in the object unit D.

Figure 11:
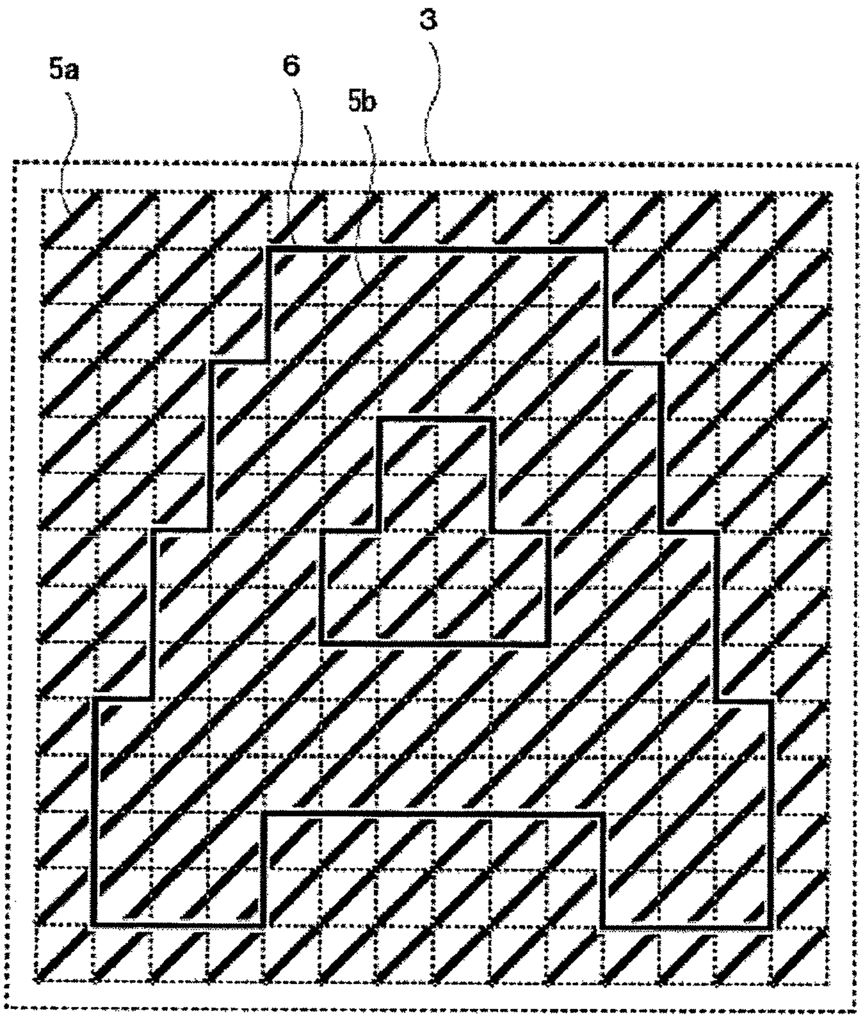
FIG. 11 is an explanatory view showing a state in which object units A in FIG. 10(*a*) and object units B in FIG. 10(*b*) are continuously, periodically, and tightly arranged in a matrix on the printed pattern 3 of the printed matter based on the arrangement in FIG. 8.

FIG. 11 shows a state in which the object units A in FIG. 10(*a*) and the object units B in FIG. 10(*b*) are continuously periodically arranged in a matrix on a printed pattern 3 of the printed matter tightly in the vertical and horizontal directions based on the arrangement in FIG. 8. As is apparent from FIG. 11, the objects **5*a* occupy the outside of the invisible image, and the pairs of objects 5*b* occupy the inside. Since the objects 5*a* and 5*b* exist, an invisible image 6 (negative or positive) that is not visually recognized under a normal visual condition is formed by only the objects 5*a*, and the invisible image 6 (positive or negative) is formed by only the objects 5*b***.

The invisible image 6 is already formed by the object arrangement in FIG. 11. However, to make the formation of the invisible image 6 more unnoticeable, the object units C shown in FIG. 10(*c*) and the object units D shown in FIG. 10(*d*) are arranged on at least part of the outline of the invisible image 6 based on the arrangement in FIG. 9. The object units C are arranged at places where the object units A on the left side and the object units B on the right side are adjacent in the horizontal direction (the longitudinal direction of main lines 4 shown in FIG. 1). On the other hand, the object units D are arranged at places where the object units B on the left side and the object units A on the right side are adjacent in the horizontal direction (the longitudinal direction of the main lines 4 shown in FIG. 1).

Figure 12:
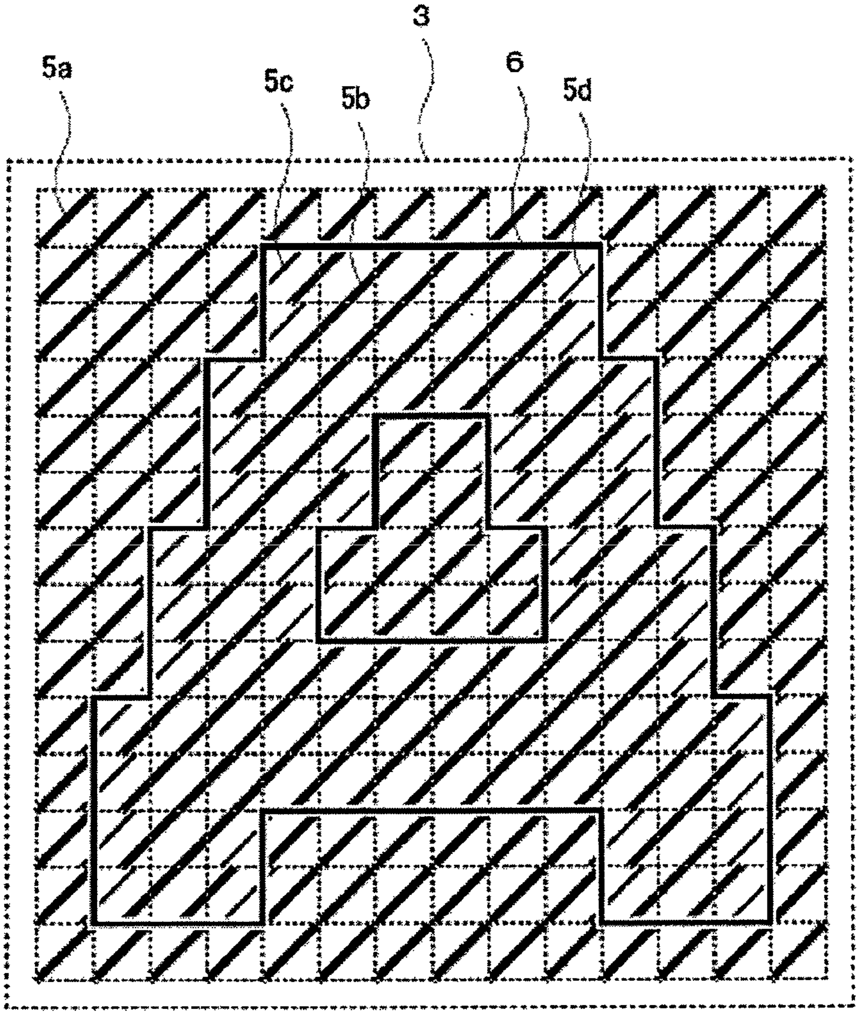
FIG. 12 is an explanatory view showing a state in which objects 5*c* provided in the object units C and objects 5*d* provided in the object units D are arranged.
Figure 13:
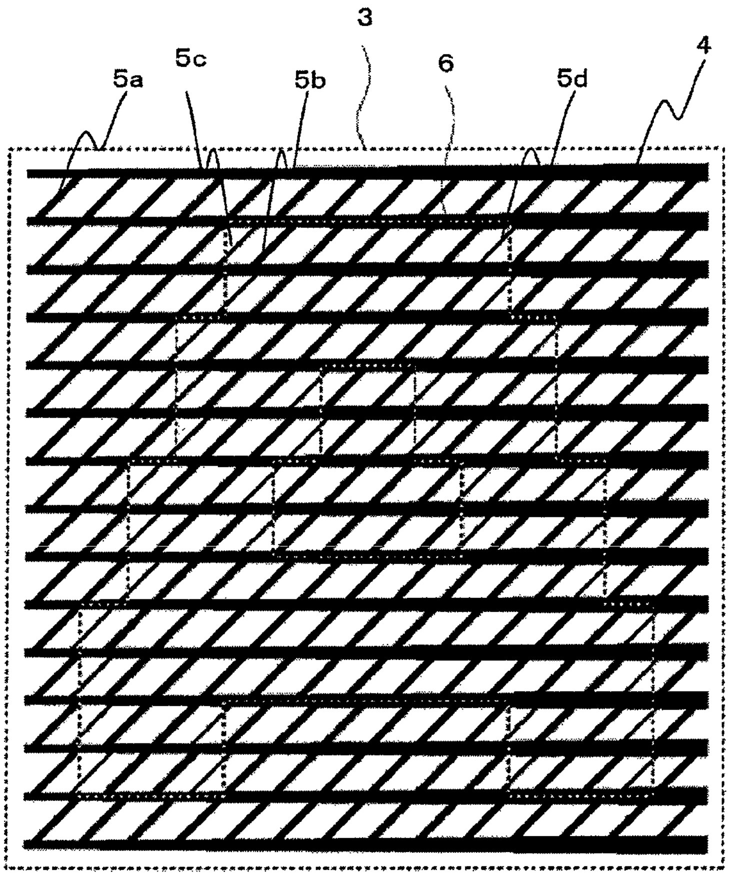
FIG. 13 is an explanatory view showing a state in which main lines 4 having tonal elements are added so that the longitudinal design continuity of the objects 5*a*, the pairs of objects 5*b*, the objects 5*c*, and the objects 5*d* arranged at 45° cannot objectively be understood upon normal visual observation.

FIG. 12 shows a state in which the objects **5*c* provided in the object units C and the objects 5*d* provided in the object units D are arranged. When the main lines 4 having tonal elements in the line tone expression method are added, as shown in FIG. 13, the longitudinal design continuity of the objects 5*a*, the pairs of objects 5*b*, the objects 5*c*, and the objects 5*d* arranged at 45° cannot objectively be understood upon normal visual observation. The existence of the intentional pattern there cannot be visually recognized, and the pattern is observed in a completely invisible state. Note that the object width of the main lines 4 need not be constant. The width can continuously change to make the main lines thicker or thinner. The main lines 4** have the camouflage effect of making the invisible image hard to visually recognize before the discrimination tool is overlaid.

In this state, the discrimination tool 2 formed from, for example, a lenticular lens is overlaid on the printed pattern 3 of a printed matter 1, as shown in FIG. 2, and the printed pattern is visually observed from the front. This allows to visualize the invisible image 6 formed on the printed pattern 3 as a visible image. Note that in the first embodiment, the length S is 340 μm, and the printed pattern 3 is printed on a coated paper sheet by offset printing. However, the length S, the base material of the printed matter, the printing method, the printing material, the printing apparatus, and the like are not particularly limited.

Upon normal visual observation, the entire printed pattern 3 is visually recognized as an arbitrary design, that is, a visible image. However, the invisible image 6 formed in the printed pattern 3 is not visually recognized. When the discrimination tool is overlaid at a predetermined position on the printed pattern, the invisible image 6 that could not be visually recognized so far becomes visible. The principles of the visual recognition effect of the invisible image 6 according to the first embodiment will be described below.

When the invisible image 6 is not visually recognized, the visible image is formed by the main lines 4 shown in FIG. 13. Sub-lines 5 shown in FIG. 1 serve as objects that assist the main lines. To form the invisible image, the sub-lines 5 are made of the objects 5*a* and 5*b*, which have a negative/positive relationship and the same or almost the same area and therefore cannot be confirmed as an image (pattern).

The lenticular lens serving as a discrimination tool is placed at a predetermined position on the printed matter so as to make the center line of each lens element coincide with the center of the object 5*a*, that is, a line L1 in FIG. 10. In this case, the objects 5*a* are magnified so that the image (pattern) constructed by the objects 5*a* can be confirmed. At this time, the main lines 4 that construct the visible image have a small area relative to the magnified objects 5*a*. When the lenticular lens is placed so as to make the center line coincide with a line L2, the objects 5*b* are magnified so that the invisible image 6 visually recognized based on the objects 5*a* becomes visible in an inverted negative/positive state.

Figure 14:
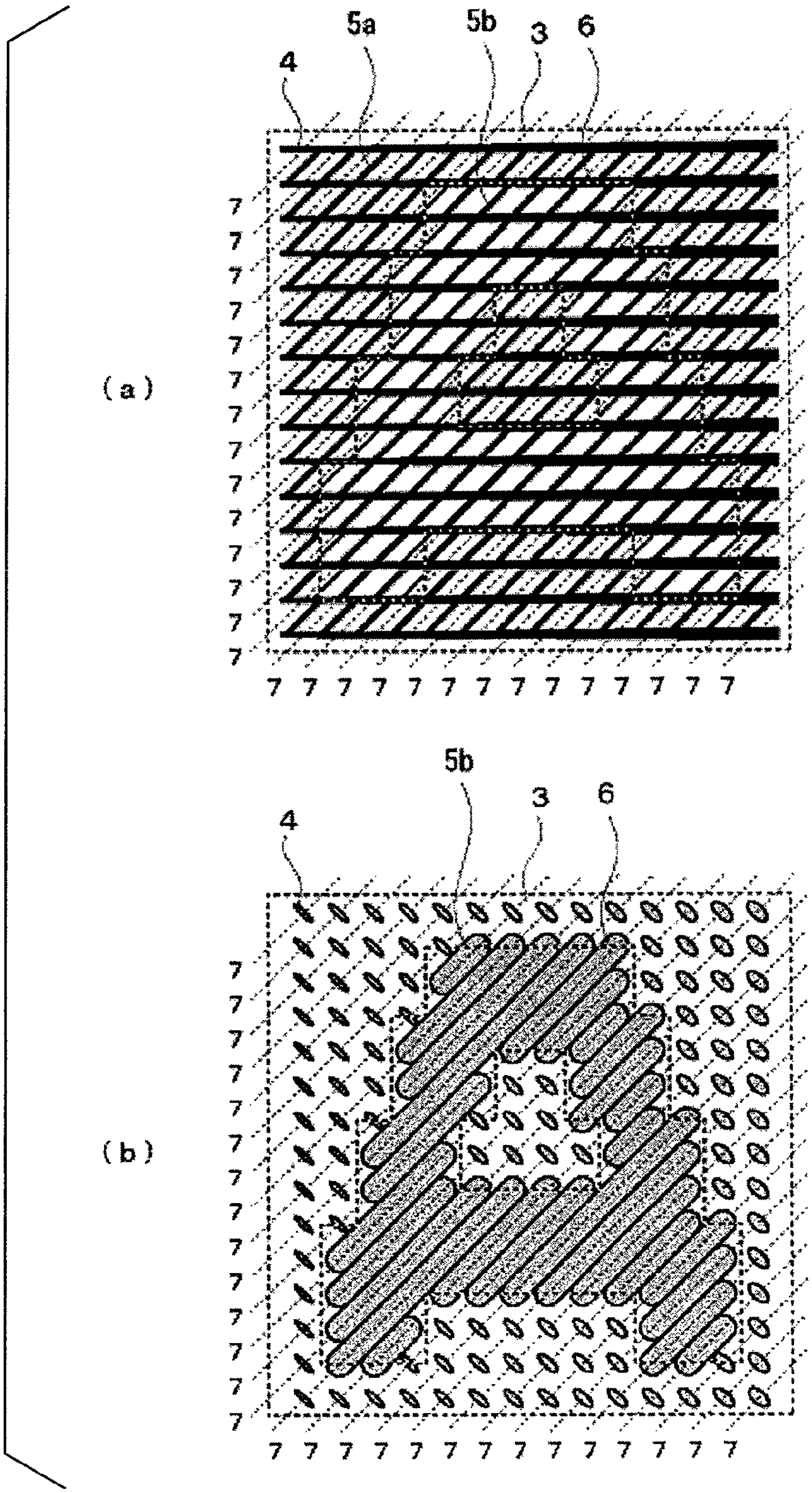
FIG. 14 shows explanatory views of a state in which visual observation from the front is done while overlaying a discrimination tool formed from a lenticular lens on the printed pattern 3 of the printed matter 1 so as to make the center line of each lens element coincide with a line L1 in FIG. 10(*a*)
Figure 15:
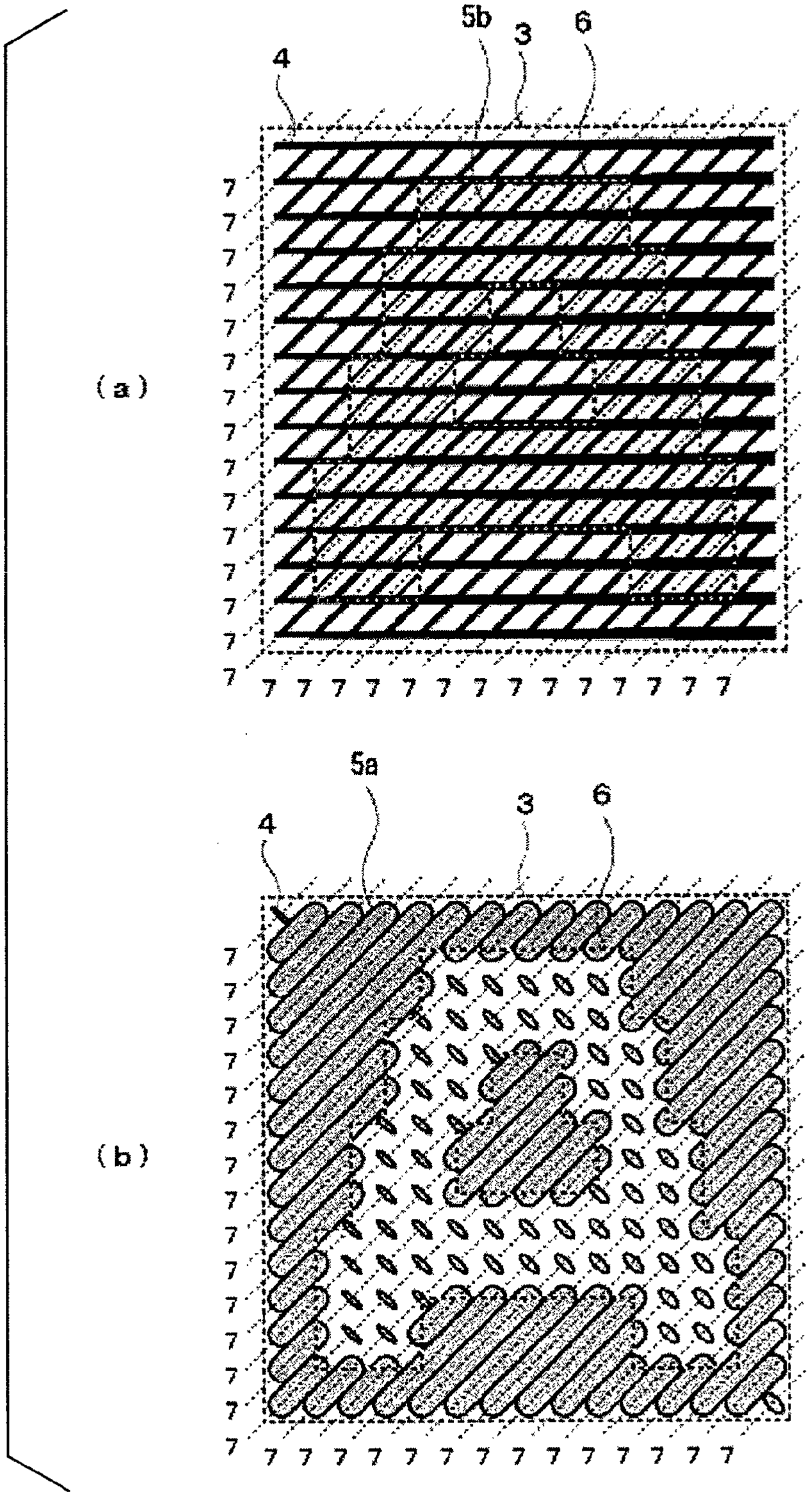
FIG. 15 shows explanatory views of a state in which the objects 5*b* located on center lines 7 are magnified by the characteristic of the lenticular lens to visualize an invisible image 6 as a positive or negative visible image.

FIG. 14 shows a state in which visual observation from the front is done while overlaying the discrimination tool 2 formed from a lenticular lens on the printed pattern 3 of the printed matter 1 at a predetermined angle and, more specifically, so as to make the center line of each lens element coincide with the line L1 in FIG. 10. When each center line 7 of the lenticular lens exists at the position shown in FIG. 14(*a*) so as to coincide with the line L1 in FIG. 10, the objects 5*a* are located on the center lines 7. Since the objects 5*a* located on the center lines 7 look magnified by the characteristics of the lenticular lens, a visible image having the graphic pattern shown in FIG. 14(*b*) is visualized upon visual observation. When each center line 7 of the lenticular lens exists at the position shown in FIG. 15(*a*) so as to coincide with the line L2 in FIG. 10, the objects 5*b* are located on the center lines 7. Since the objects 5*b* located on the center lines 7 look magnified by the characteristics of the lenticular lens, a visible image having the graphic pattern shown in FIG. 15(*b*) is visualized upon visual observation. The objects 5*a* and 5*b* have a negative/positive relationship. Hence, the invisible image 6 shown in FIG. 3(*a*) or 3(*b*) described above appears as a negative or positive visible image.

(2) Second Embodiment

Figure 16:
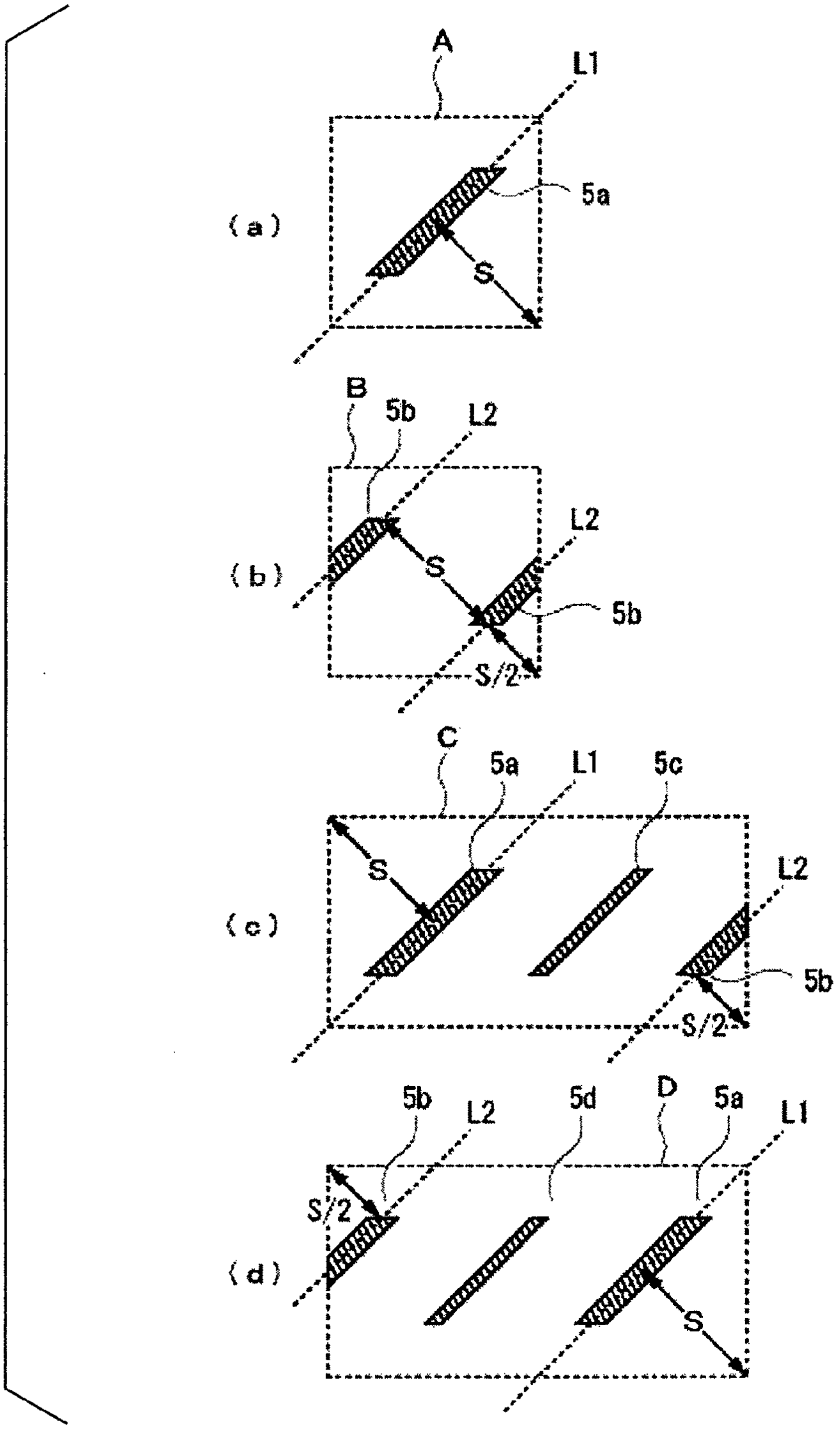
FIG. 16 shows explanatory views of a state in which each object has a linear shape and forms a rectangle or a parallelogram in the diagonal direction of the object unit A or B.
Figure 17:
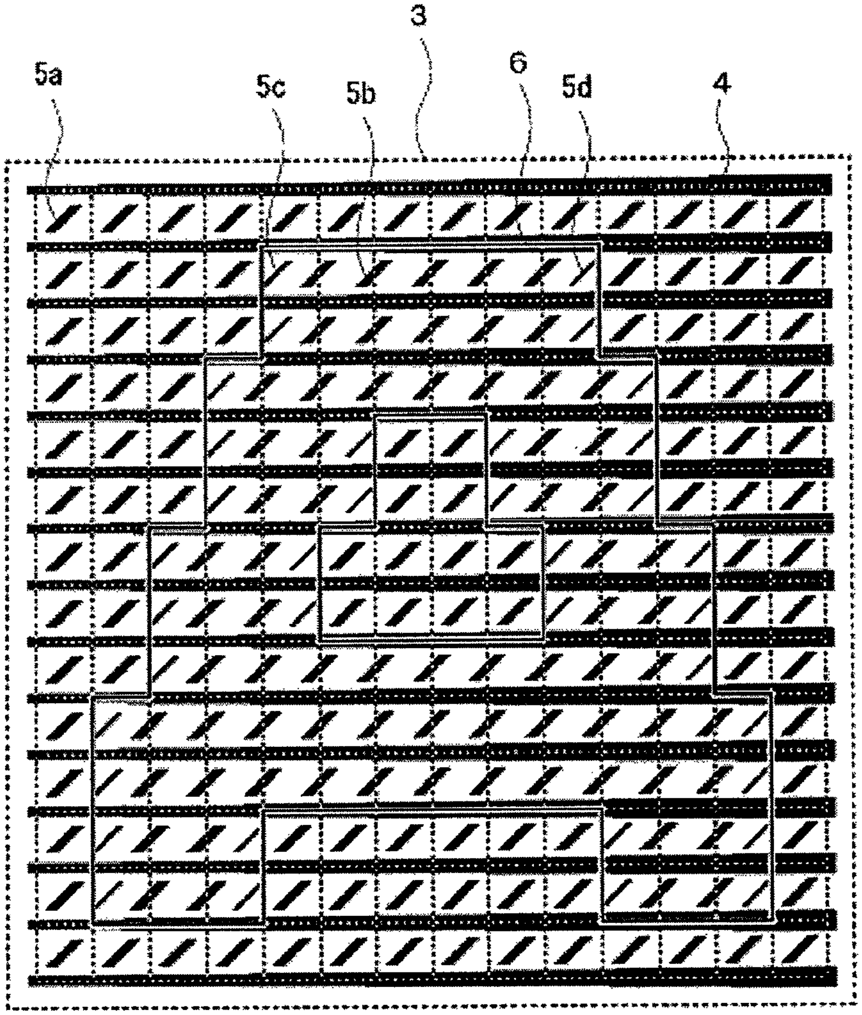
FIG. 17 is an explanatory view showing a state in which the objects 5*a*, the pairs of objects 5*b*, the objects c, and the objects d look like dotted lines in the printed pattern 3 formed using the object units A to D shown in FIGS. 16(*a*) to 16(*d*)

The objects 5*a* and the pairs of objects 5*b* of the printed matter 1 according to the first embodiment run diagonally in the object units A and B, as shown in FIG. 10. In the second embodiment, however, the object shapes are not limited to those described above. For example, the objects may be lines that form rectangles or parallelograms in the diagonal direction of an object unit A or an object unit B, as shown in FIG. 16. Each of the object units shown in FIGS. 16(*a*) and 16(*b*) is a square having 276 μm long sides. Each of the object units shown in FIGS. 16(*c*) and 16(*d*) is a rectangle having 276 jam long vertical sides and 552 μm long horizontal sides. FIG. 17 shows a printed pattern 3 formed using the object units A to D shown in FIGS. 16(*a*) to 16(*d*). As illustrated, objects 5*a*, pairs of objects 5*b*, objects 5*c*, and objects 5*d* may form dotted lines. Hence, as long as there exist main lines 4 that produce at least the continuous tone of the objects in the printed pattern 3, the objects 5*a* and 5*b* pair off in a negative/positive relationship and have the same or almost the same area to form an invisible image 6, the object 5*c* or 5*d* has an object width ½ or almost ½ that of the object 5*a* or the pair of objects 5*b*, and the main lines 4 are visually recognized as a visible image (design:pattern), the longitudinal length of the rectangle or the parallelogram is not particularly limited. Note that the area of the object 5*c* or 5*d* may be ½ or almost ½ that of the object 5*a*.

(3) Third Embodiment

Figure 18:
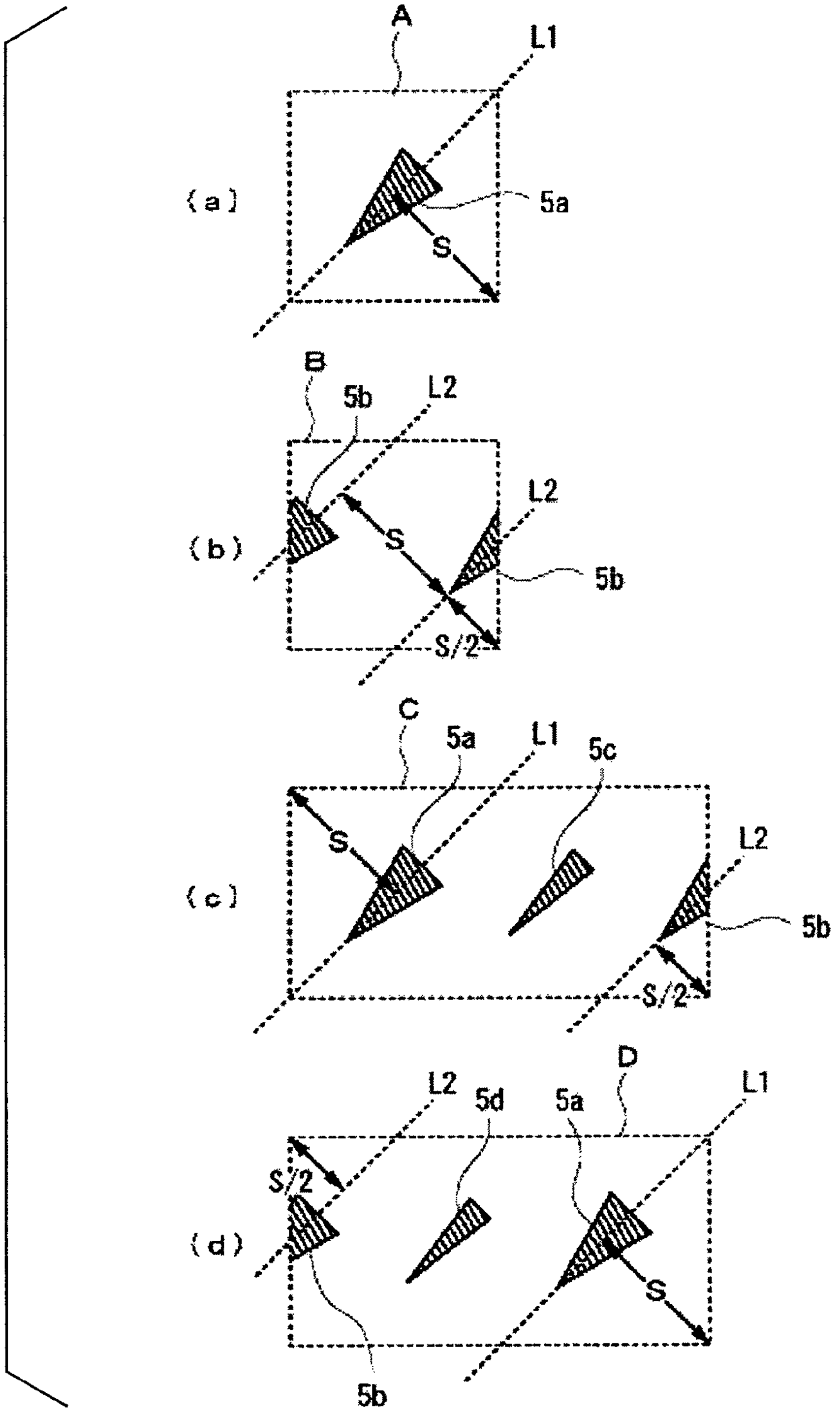
FIG. 18 shows explanatory views of a state in which each object forms a triangle in the diagonal direction of the object unit A, B, C, or D.
Figure 19:
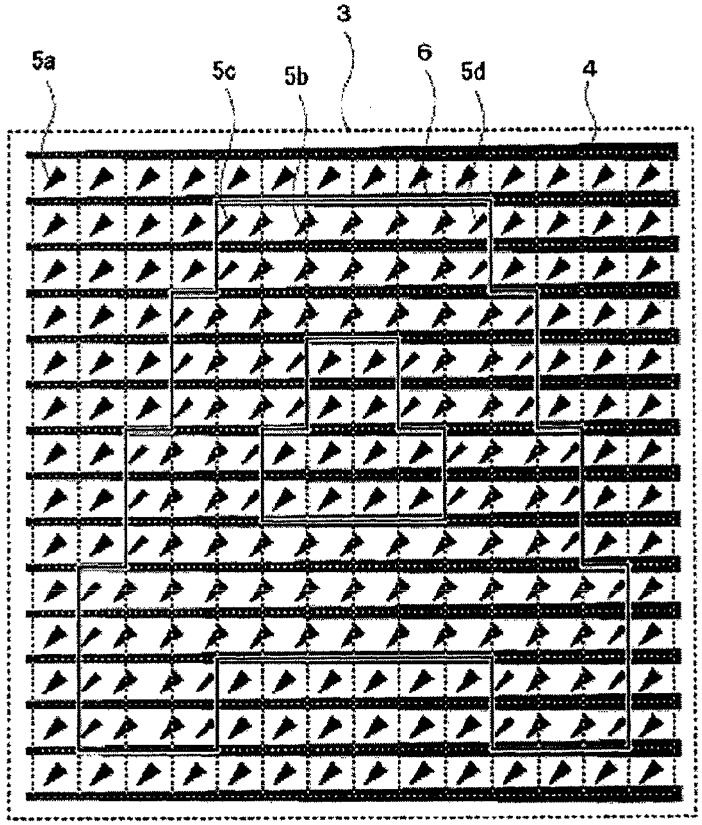
FIG. 19 is an explanatory view showing a state in which the objects 5*a*, the pairs of objects 5*b*, the objects c, and the objects d look like dotted lines in the printed pattern 3 formed using the object units A to D shown in FIGS. 18(*a*) to 18(*d*)

As shown in FIG. 18, the objects may be triangles in the diagonal direction of an object unit A or an object unit B. Each of the object units shown in FIGS. 18(*a*) and 18(*b*) is a square having 276 μm long sides. Each of the object units shown in FIGS. 18(*c*) and 18(*d*) is a rectangle having 276 μm long vertical sides and 552 μM long horizontal sides. FIG. 19 shows a printed pattern 3 formed using the object units A to D shown in FIGS. 18(*a*) to 18(*d*). As illustrated, objects 5*a*, pairs of objects 5*b*, objects 5*c*, and objects 5*d* may form dotted lines in which triangles are continuously arranged. Hence, as long as there exist main lines 4 that produce at least the continuous tone of the objects in the printed pattern 3, the objects 5*a* and the pairs of objects 5*b* pair off in a negative/positive relationship and have the same or almost the same area to form an invisible image 6, the object 5*c* or 5*d* has an object area ½ or almost ½ that of the object 5*a* or the pair of objects 5*b*, and the main lines 4 are visually recognized as a visible image (design:pattern), the object shapes are not particularly limited.

(4) Fourth Embodiment

Figure 20:
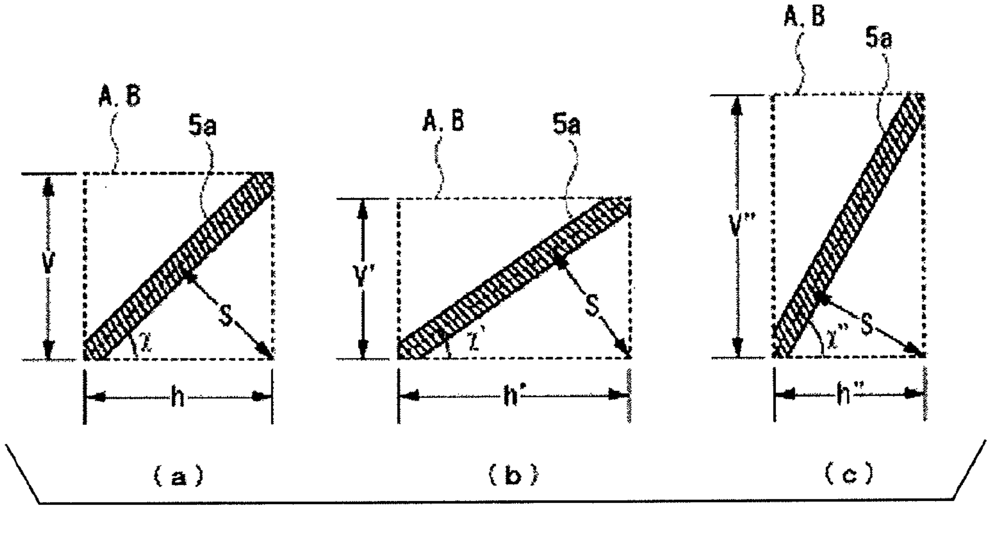
FIG. 20 shows explanatory views of a state in which the interval between the main lines that arrange the horizontal parallel lines can be adjusted arbitrarily by changing the angle of the object 5*a;*

The object units according to the above-described first to third embodiments basically have a square shape. However, the four sides of an object unit can have arbitrary lengths as long as a dimension S matches the pitch of the parallel line filter or lenticular lens of a discrimination tool 2. More specifically, when an angle $\chi$ of an object 5*a* changes, as shown in FIGS. 20(*a*) to 20(*c*), the vertical length of object units A and B is given by $v=S\cdot\sec(\chi)$, and the horizontal length is given by $h=S\cdot\sec(\chi)$. For example, the angle $\chi$ is 45° in FIG. 20(*a*). When the dimension S corresponding to the pitch of the lenticular lens is 195 μm, both the vertical length V and the horizontal length h are 276 μM. In FIG. 20(*b*), the angle $\chi'$ is 35°. When the dimension S corresponding to the pitch of the lenticular lens is 195 μm, the vertical length v' is 239 μm, and the horizontal length h' is 341 μm. In FIG. 20(*c*), the angle $\chi''$ is 60°. When the dimension S corresponding to the pitch of the lenticular lens is 195 μm, the vertical length v" is 391 μm, and the horizontal length h" is 226 μm. Note that for object units C and D, the horizontal length h doubles in FIGS. 20(*a*) to 20(*c*) in accordance with the first to third embodiments. As described above, changing the angle of the object 5*a* enables to arbitrarily adjust the interval of main lines 4 arranged as horizontal parallel lines.

Note that according to the first to fourth embodiments, since a clear visible image having a quality design and a high degree of freedom can be formed using the main lines 4, the techniques are also useful for printed matters such as securities. In addition, the invisible image 6 formed by the objects 5*a* and the pairs of objects 5*b* can easily and clearly be visualized by overlaying the discrimination tool 2 on the printed matter 1. Furthermore, even if single color printing is performed using objects of the same color in the printed matter according to the present invention, a sufficient anti-counterfeit effect can be obtained. In addition, since the plate making and printing methods and the like are not particularly limited, the cost can be reduced.

Note that according to the first to fourth embodiments, a visible image is formed by a first object group including the main lines 4 arrayed in the first direction at a predetermined pitch and a second object group including the objects 5*a*, 5*b*, 5*c*, and 5*d* arranged in the non-imaging areas among the main lines 4. The second object group is arrayed in the second direction at a predetermined angle with respect to the main lines 4. The second object group forms the negative and positive regions of the invisible image. The second object group includes the objects 5*a* serving as a plurality of second objects that form one of the negative and positive regions of the invisible image, the objects 5*b* serving as a plurality of third objects that form the other region, and the objects 5*c* and 5*d* serving as a plurality of fourth objects that relax density imbalance. The object area of the objects 5*a* serving as the second objects is the same or almost the same as that of the objects 5*b* serving as the third objects. The objects 5*c* and 5*d* serving as the fourth objects have an object area ½ or almost ½ that of the objects 5*a* serving as the second objects or the objects 5*b* serving as the third objects. The objects 5*a* serving as the second objects, the objects 5*b* serving as the third objects, and the objects 5*c* and 5*d* serving as the fourth objects are formed in a plurality of object units that are periodically arrayed. The plurality of object units include a first object unit that is the object unit A, a second object unit that is the object unit B, a third object unit that is the object unit C, and a fourth object unit that is the object unit D. The first object unit that is the object unit A and the second object unit that is the object unit B have the same size. The third object unit that is the object unit C and the fourth object unit that is the object unit D include an object unit whose size in the main line direction is twice as large as that of the first object unit that is the object unit A and the second object unit that is the object unit B. More specifically, in the object unit A, the object 5*a* is formed so as to pass through the center of the object unit A. In the object unit B, the objects 5*b* in pair are obtained by dividing the object 5*a* and formed at equal intervals from the center of the object unit B so as to oppose each other. In the object unit C, the object 5*a*, the object 5*c*, and one of the objects 5*b* in pair are sequentially formed. In the object unit D, the other of the objects 5*b* in pair, the object 5*d*, and the object 5*a* are sequentially formed. The third object unit that is the object unit C or the fourth object unit that is the object unit D is formed on at least part of the outline of the invisible image.

Note that in the anti-counterfeit printed matter of the first embodiment, the second objects that are the objects 5*a*, the third objects that are the objects 5*b*, and the fourth objects that are the objects 5*c* and 5*d* are formed as one line across the object units adjacent in the second direction.

(5) Fifth Embodiment

Figure 27:
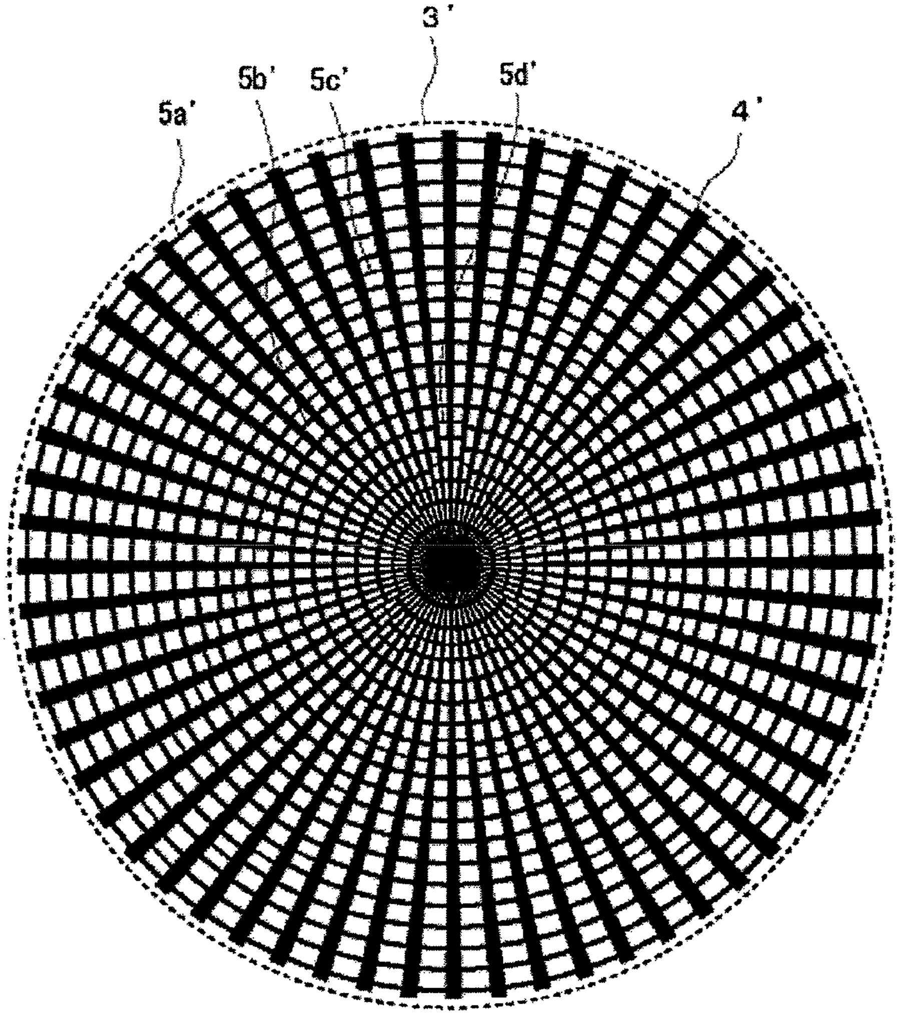
FIG. 27 is an explanatory view showing a state in which main lines 4' are added to form a visible image.

In the above-described first to fourth embodiments, since the object units formed as quadrilaterals are arranged in a matrix, the lines that construct the invisible image inevitably look like parallel straight lines. However, when main lines 4' are arranged radially, as shown in FIG. 27, objects 5*a*' and 5*b*' that construct the invisible image inevitably look like concentric lines. In the fifth embodiment of the present invention, an anti-counterfeit printed matter having an invisible image formed by an object arrangement using concentric lines will be described.

Figure 21:
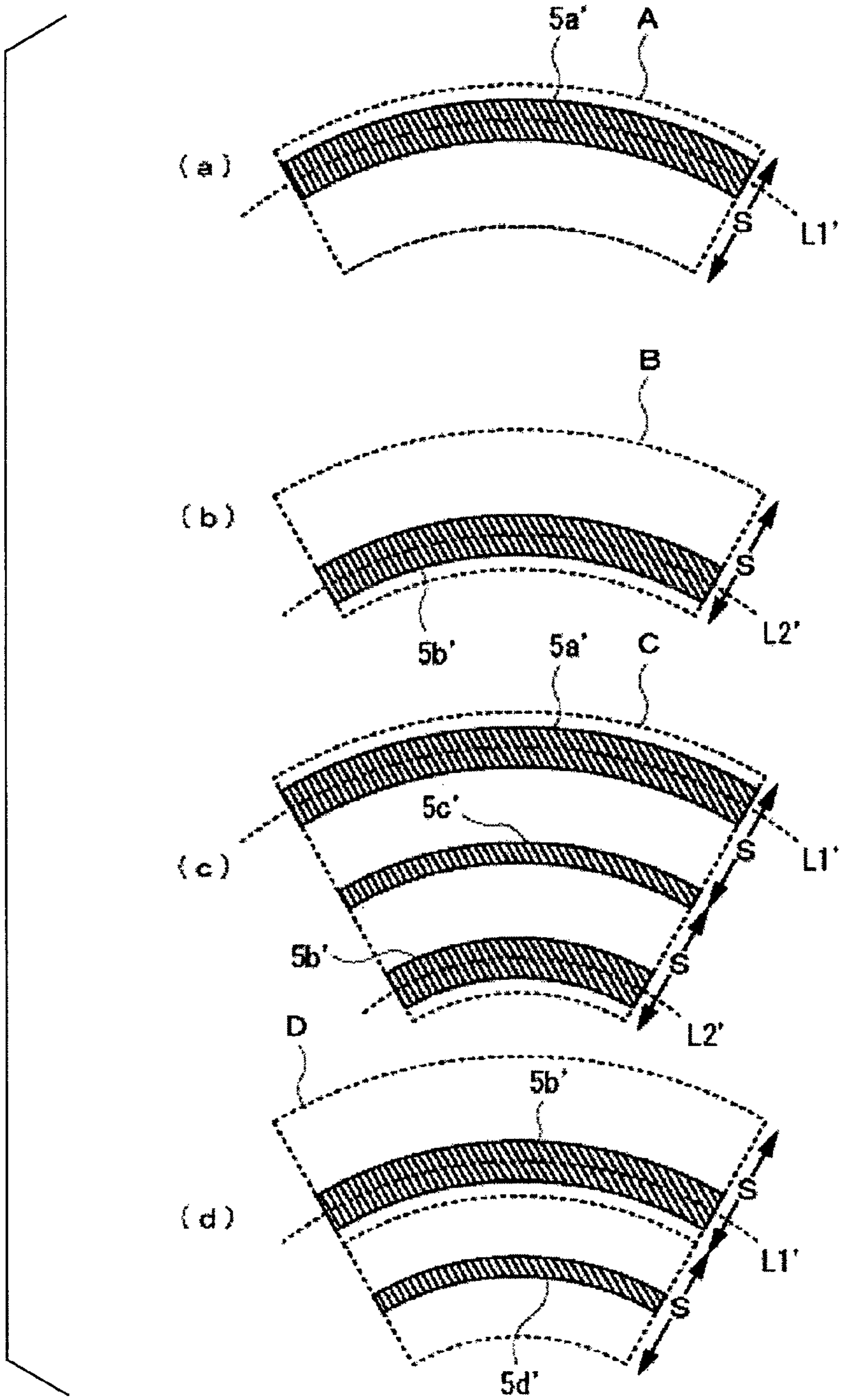
FIG. 21 shows explanatory views of object units A to D including the objects of the printed pattern of a printed matter according to the fifth embodiment.

FIG. 21 shows partially enlarged views of the object arrangement of the printed pattern of a printed matter according to the fifth embodiment. A dimension S in the normal direction of the fan-shaped region equals the pitch of the grooves of a discrimination tool 2' such as a concentric parallel line filter shown in FIG. 22. The dimension S is 1 mm or less or 195 μm in the fifth embodiment. Object units A to D shown in FIGS. 21(*a*) to 21(*d*) are arranged on the surface of the printed matter in accordance with desired rules. The length of the arc of each of the fan-shaped (arch-shaped) regions in FIGS. 21(*a*) and 21(*b*) is decided by the size of a printed pattern 3 to be described later and the division angle of the radially arranged main lines 4. Each of the object units shown in FIGS. 21(*c*) and 21(*d*) has a size twice as large as the dimension S in the normal direction of the fan-shaped region. An object 5*a*' arranged in the object unit A of FIG. 21(*a*) and an object 5*b*' arranged in the object unit B of FIG. 21(*b*) have the same or almost the same object width. An object 5*c*' arranged in the object unit C of FIG. 21(*c*) has an object width ½ or almost ½ that of the object 5*a*' arranged in the object unit C. In addition, the object 5*c*' is arranged almost at the midpoint between the object 5*a*' and the object 5*b*' arranged in the object unit C. An object 5*d*' arranged in the object unit C of FIG. 21(*d*) has an object width ½ or almost ½ that of the object 5*b*' arranged in the object unit D. In addition, the object 5*d*' is arranged almost at the midpoint between the object 5*b*' arranged in the object unit D and the object 5*a*' of the object unit A or C adjacently arranged.

Figure 23:
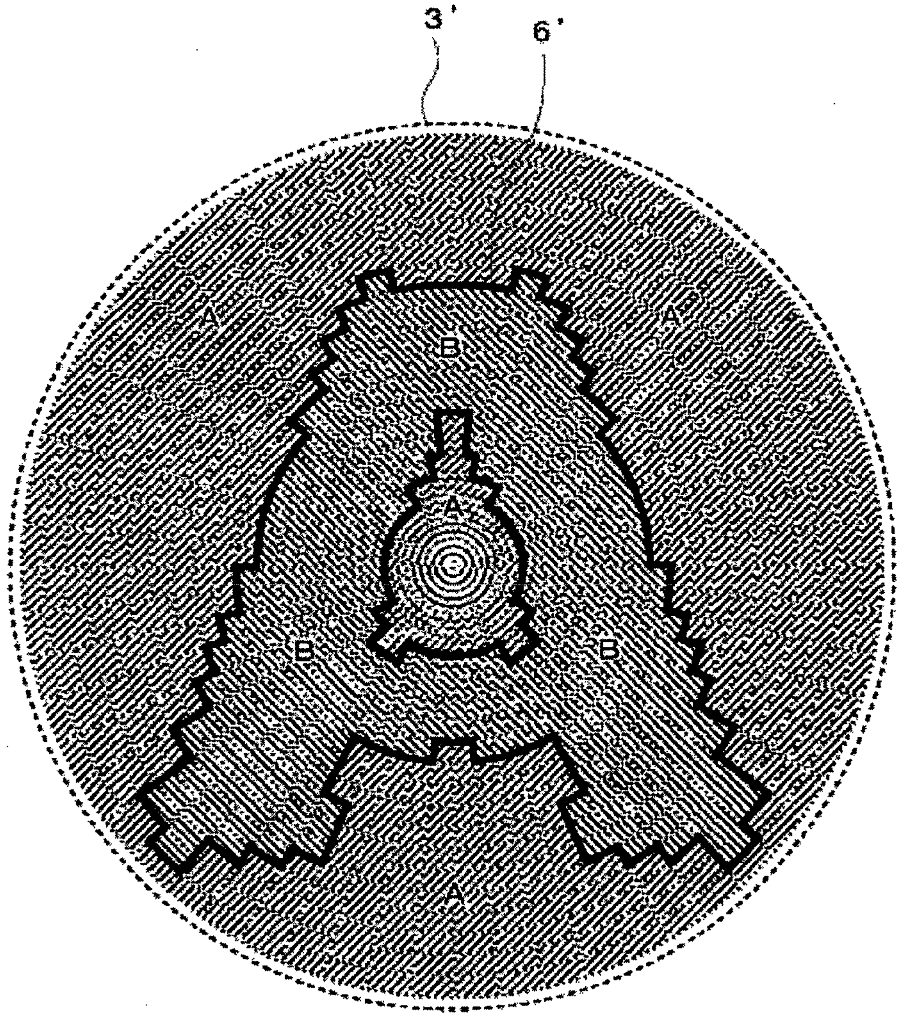
FIG. 23 is an explanatory view showing a state in which the object units A in FIG. 21(*a*) and the object units B in FIG. 21(*b*) are continuously, periodically, and tightly arranged in a matrix on a printed pattern 3' of the printed matter.
Figure 24:
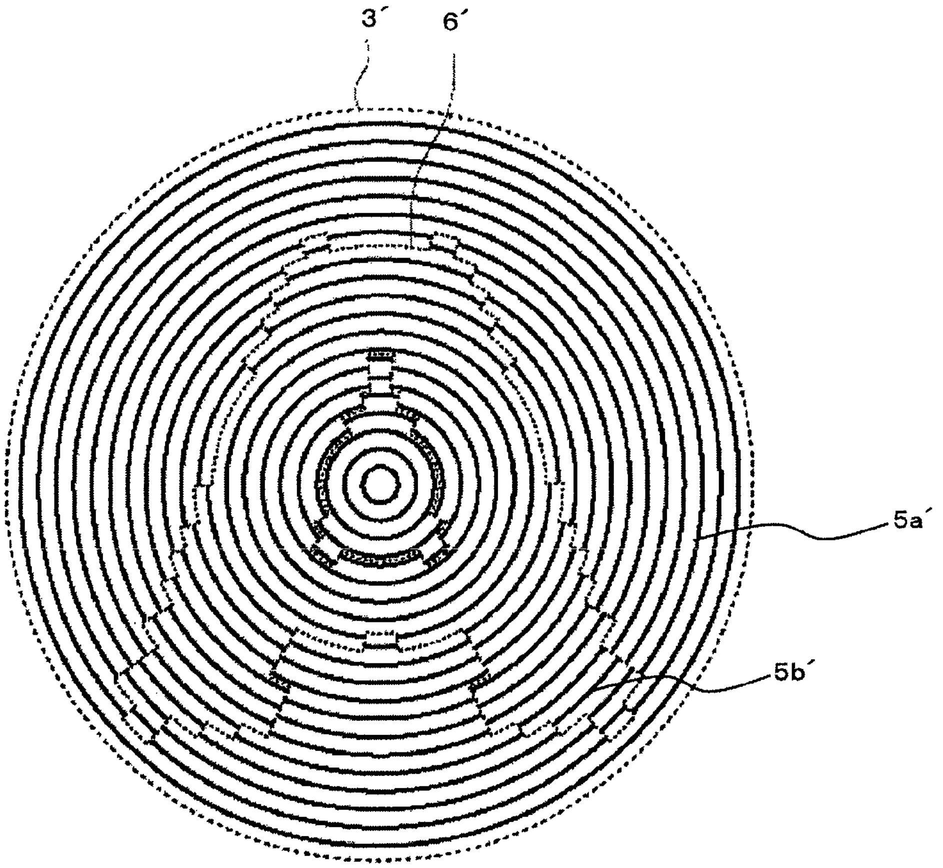
FIG. 24 is an explanatory view showing a state in which objects 5*a*' and 5*b*' are arranged based on the arrangement in FIG. 23.

FIG. 23 is an explanatory view showing a positional relationship in which the object units A in FIG. 21(*a*) and the object units B in FIG. 21(*b*) are continuously periodically arranged in a matrix on a printed pattern 3' of the printed matter tightly in the vertical and horizontal directions. Note that the bold solid lines in FIG. 23 simply indicate the portion of an invisible image 6'. FIG. 24 shows a state in which the objects 5*a*' and 5*b*' are arranged based on the arrangement in FIG. 23. As is apparent, the objects 5*a*' occupy the outside of the invisible image, and the objects 5' occupy the inside. Since the objects 5*a*' and 5*b*' exist, the invisible image 6' (negative or positive) that is not visually recognized under a normal visual condition is formed by only the objects 5*a*', and the invisible image 6 (positive or negative) is formed by only the objects 5*b*'.

Figure 25:
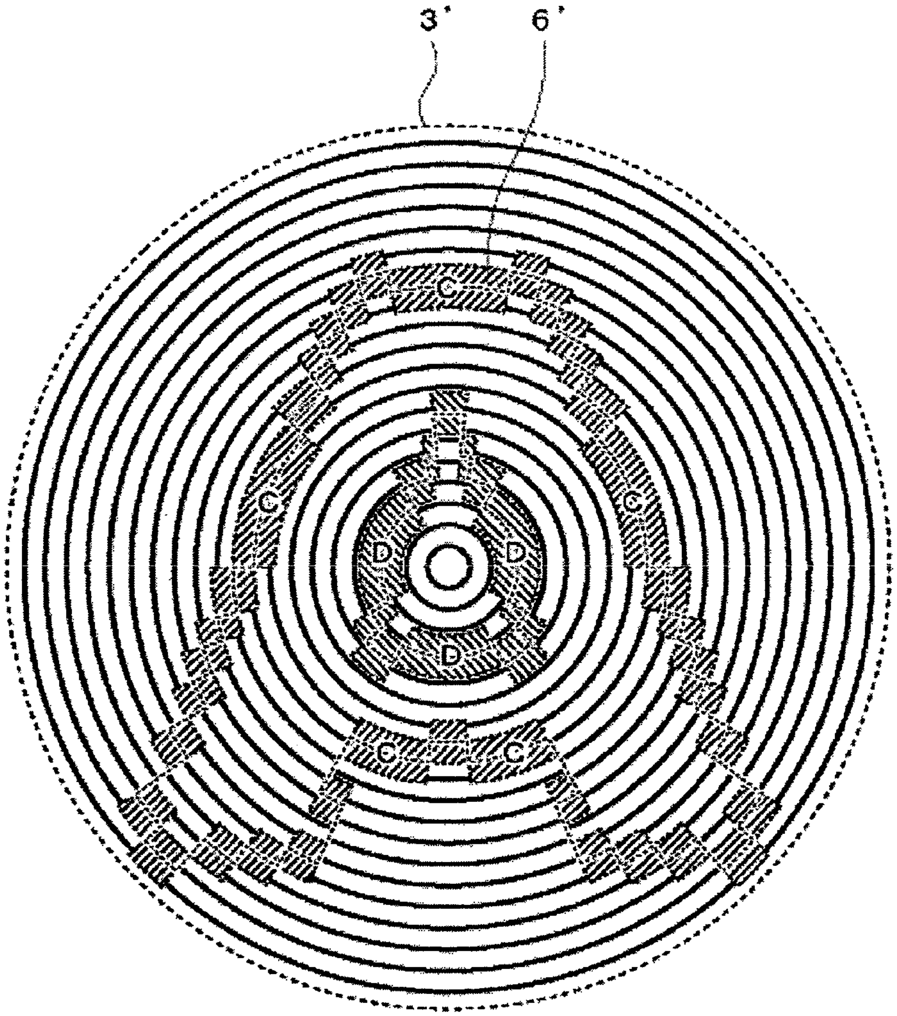
FIG. 25 is an explanatory view showing the positions of the object units C and D on the printed pattern 3' based on conditions for arrangement at desired positions.

The invisible image 6' is already formed by the object arrangement in FIG. 24. However, to make the formation of the invisible image 6' more unnoticeable, the object units C shown in FIG. 21(*c*) and the object units D shown in FIG. 21(*d*) are arranged at desired positions. The object units C are arranged at places where the object units A outside and the object units B inside are adjacent in the radial direction (the longitudinal direction of the main lines 4' shown in FIG. 27). On the other hand, the object units D are arranged at places where the object units B outside and the object units A inside are adjacent in the radial direction (the longitudinal direction of the main lines 4' shown in FIG. 27). FIG. 25 is an explanatory view showing the positions of the object units C and D on the printed pattern 3' based on conditions for arrangement at desired positions.

Figure 26:
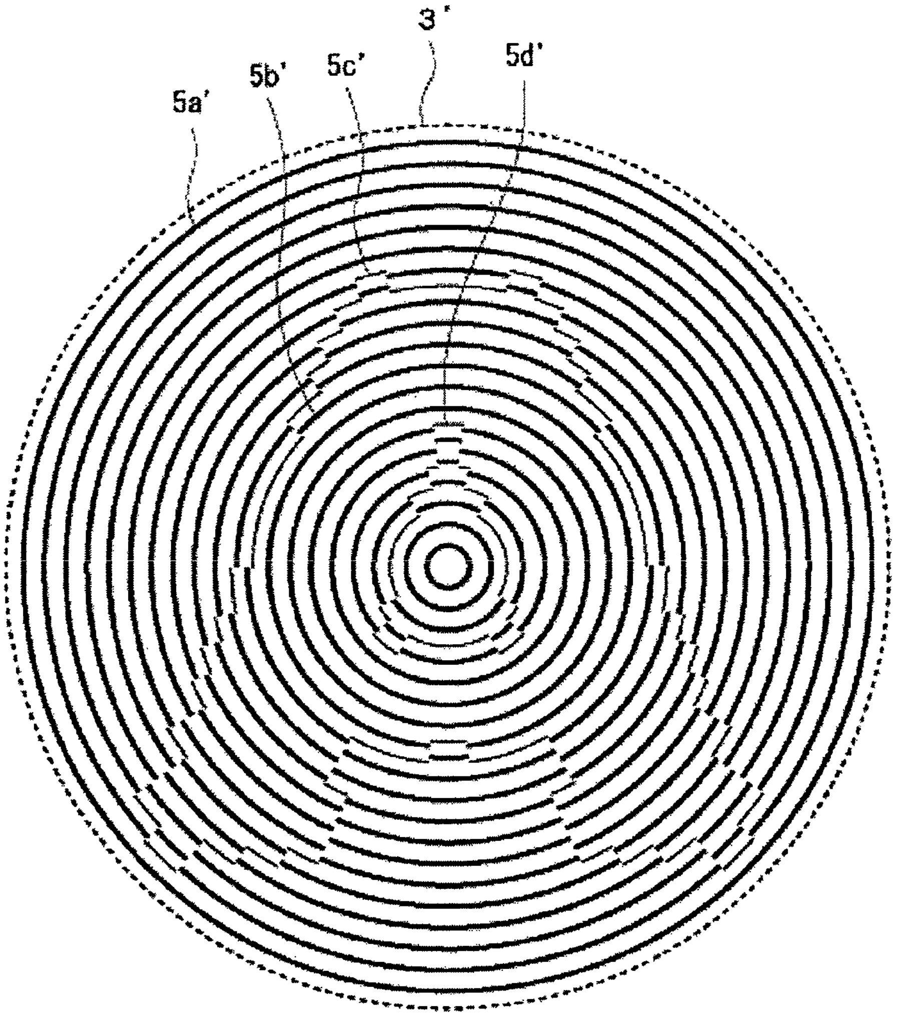
FIG. 26 is an explanatory view showing a state in which objects 5*c*' provided in the object units C and objects 5*d*' provided in the object units D are arranged based on the arrangement in FIG. 25.

FIG. 26 shows a state in which the objects 5*c*' provided in the object units C and the objects 5*d*' provided in the object units D are arranged based on the arrangement in FIG. 25. When the main lines 4' having tonal elements in the line tone expression method and radially running from the center are added, as shown in FIG. 27, the longitudinal design continuity of the objects 5*a*', 5*b*', 5*c*', and 5*d*' arranged concentrically cannot objectively be understood upon normal visual observation. The existence of the intentional pattern there cannot be visually recognized, and the pattern is observed in a completely invisible state.

Figure 22:
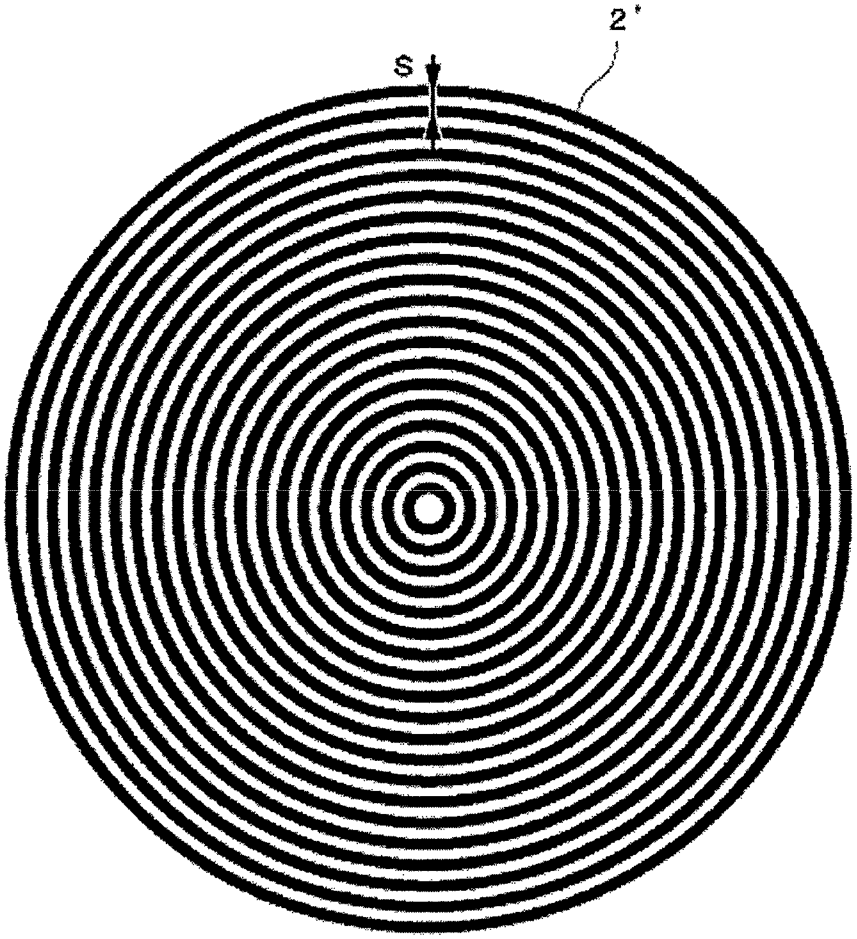
FIG. 22 is an explanatory view showing a discrimination tool 2' such as a concentric parallel line filter.

In this state, the discrimination tool 2' formed from, for example, a concentric parallel line filter is overlaid on the printed pattern 3' of a printed matter 1', as shown in FIG. 22, and the printed pattern is visually observed from the front. This allows to visualize the invisible image 6' formed on the printed pattern 3' as a visible image. Note that in the fifth embodiment, the length S is 195 μm, and the printed pattern 3' is printed on a coated paper sheet by offset printing. However, the length S, the base material of the printed matter, the printing method, the printing material, the printing apparatus, and the like are not particularly limited.

Upon normal visual observation, the entire printed pattern 3' is visually recognized as an arbitrary design, that is, a visible image. However, the invisible image 6' formed in the printed pattern 3' is not visually recognized. When the discrimination tool is overlaid at a predetermined position on the printed pattern, the invisible image 6' that could not be visually recognized so far becomes visible. The principles of the visual recognition effect of the invisible image 6 according to the fifth embodiment will be described below.

When the invisible image 6' is not visually recognized, the visible image is formed by the main lines 4' shown in FIG. 27. Sub-lines 5 shown in FIG. 1 serve as objects that assist the main lines. To form the invisible image, the sub-lines 5' are made of the objects 5*a*' and 5*b*', which have a negative/positive relationship and the same or almost the same area and therefore cannot be confirmed as an image (pattern).

The concentric parallel line filter serving as a discrimination tool is placed at a predetermined position on the printed matter so as to make the center line of each lens element coincide with the center of the object 5*a*', that is, a line L1' in FIG. 21. In this case, the objects 5*a*' are magnified so that the image (pattern) constructed by the objects 5*a*' can be confirmed. At this time, the main lines 4' that construct the visible image have a small area relative to the magnified objects 5*a*'. When the concentric parallel line filter is placed so as to make the center line coincide with a line L2', the objects 5*b*' are magnified so that the invisible image 6' visually recognized based on the objects 5*a*' becomes visible in an inverted negative/positive state.

Figure 28:
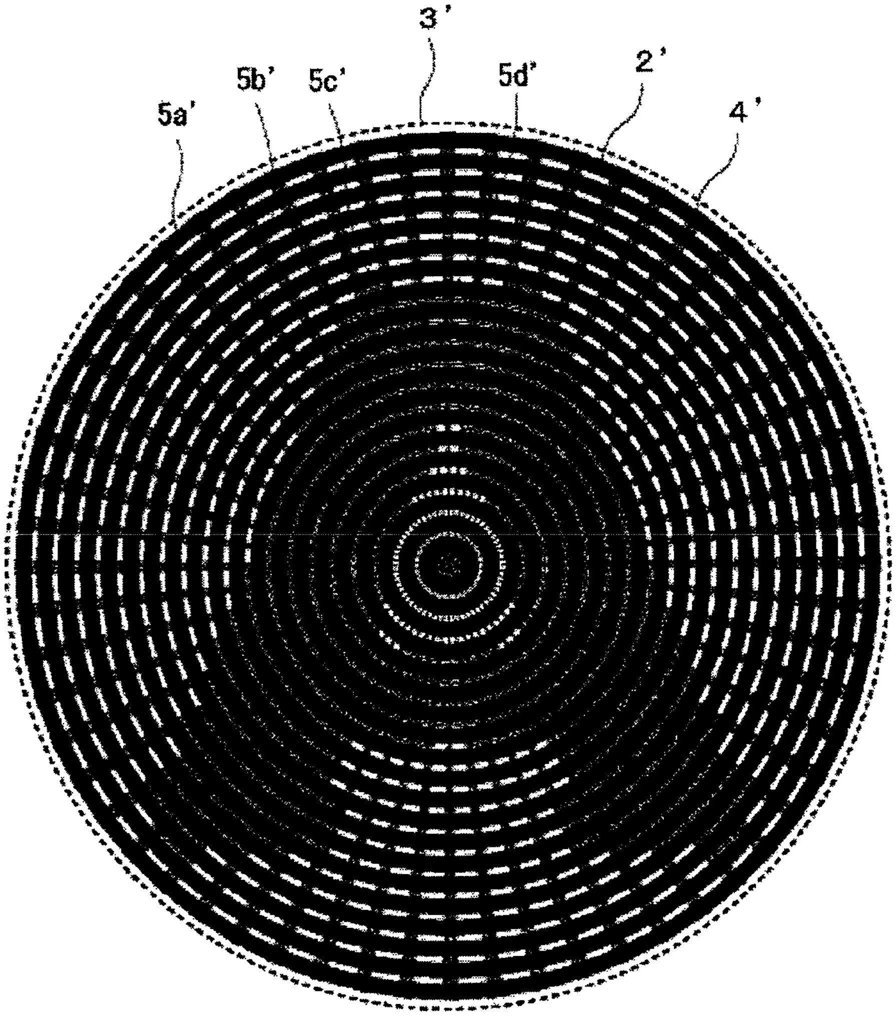
FIG. 28 is an explanatory view showing a state in which visual observation from the front is done while overlaying the discrimination tool 2' formed from a concentric parallel line filter on the printed pattern 3' of the printed matter 1 so as to make the center line of each lens element coincide with a line L1 in FIG. 21.
Figure 29:
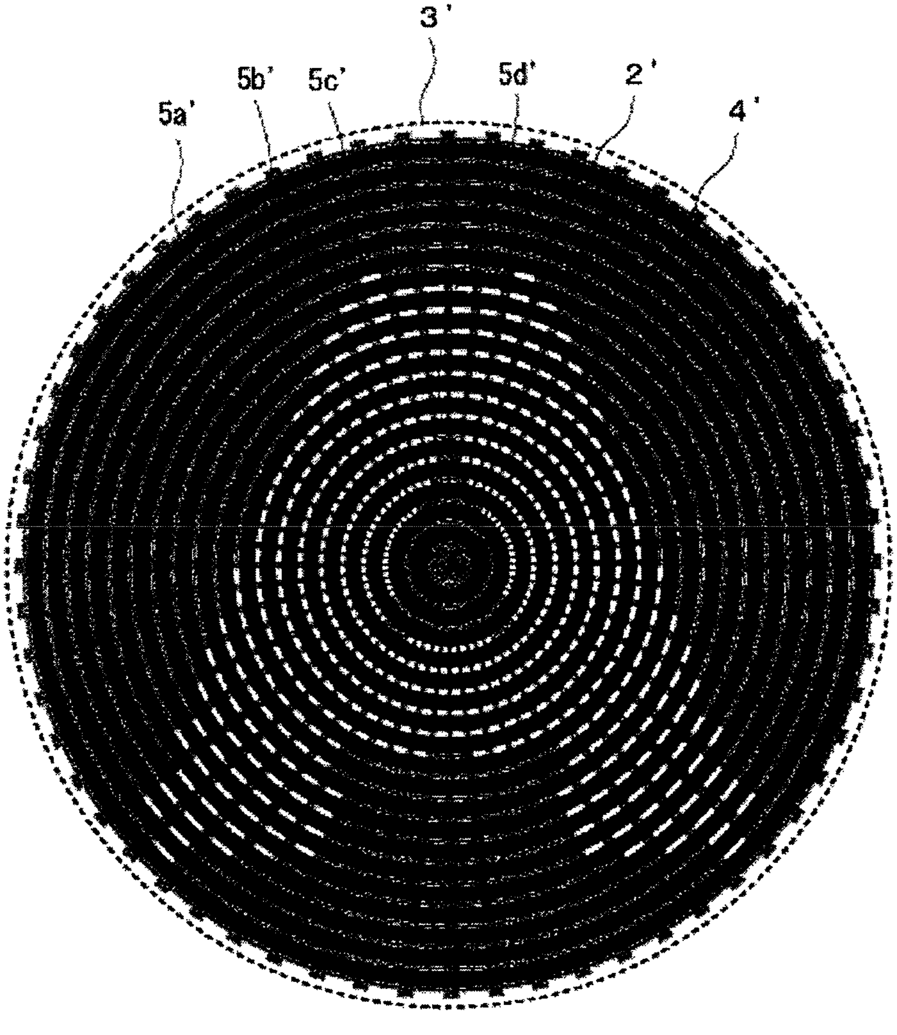
FIG. 29 is an explanatory view showing a state in which the objects 5*b*' located on center lines 7 are magnified by the characteristic of the concentric parallel line filter so that the visible image is visually recognized in an inverted negative/positive state.

More specifically, FIG. 28 shows a state in which visual observation from the front is done while overlaying the discrimination tool 2' formed from a concentric parallel line filter on the printed pattern 3' of the printed matter 1 so as to make the center line of each lens element coincide with the line L1 in FIG. 21. When each center line 7 of the concentric parallel line filter exists at a position so as to coincide with the line L1' in FIG. 21, the objects 5*a*' are located on the center lines 7. Since the objects 5*a*' located on the center lines 7 look magnified by the characteristics of the concentric parallel line filter, a visible image having the graphic pattern shown in FIG. 28 is visualized upon visual observation. When each center line 7 of the concentric parallel line filter exists at the position shown in FIG. 29 so as to coincide with the line L2' in FIG. 21, the objects 5*b*' are located on the center lines 7. Since the objects 5*b*' located on the center lines 7 look magnified by the characteristics of the concentric parallel line filter, a visible image having the graphic pattern shown in FIG. 29 is visualized upon visual observation. The objects 5*a*' and 5*b*' have a negative/positive relationship.

A visible image is formed by a first object group including the main lines 4' formed radially from the center and a second object group including the objects 5*a*', 5*b*', 5*c*', and 5*d*' arranged in the non-imaging areas among the main lines 4'. The objects of the second object group are arrayed concentrically from the center at a predetermined pitch. The second object group forms the negative and positive regions of the invisible image. The second object group includes the objects 5*a*' serving as a plurality of second objects that form one of the negative and positive regions of the invisible image, the objects 5*b*' serving as a plurality of third objects that form the other region, and the objects 5*c*' and 5*d*' serving as a plurality of fourth objects that relax density imbalance. The object area of the objects 5*a*' serving as the second objects is the same or almost the same as that of the objects 5*b*' serving as the third objects. The objects 5*c*' and 5*d*' serving as the fourth objects have an object area ½ or almost ½ that of the objects 5*a*' serving as the second objects or the objects 5*b*' serving as the third objects. The objects 5*a*' serving as the second objects, the objects 5*b*' serving as the third objects, and the objects 5*c*' and 5*d*' serving as the fourth objects are formed in a plurality of arch-shaped object units that are periodically arrayed. The plurality of arch-shaped object units include a first object unit that is the object unit A, a second object unit that is the object unit B, a third object unit that is the object unit C, and a fourth object unit that is the object unit D. The first object unit that is the object unit A and the second object unit that is the object unit B have the same size. The third object unit that is the object unit C and the fourth object unit that is the object unit D include an object unit having a size larger than that of the first object unit that is the object unit A and the second object unit that is the object unit B and a shape elongated toward the center in the concentric direction with respect to the first object unit that is the object unit A and the second object unit that is the object unit B. In the object unit A, the object 5*a*' is formed in the concentric direction at a predetermined position. In the object unit B, the object 5*b*' is formed in the concentric direction at a position shifted from the formation position of the object 5*a*' by a ½ or almost ½ pitch. In the object unit C, the object 5*a*', 5*c*', 5*b*' are sequentially formed. In the object unit D, the objects 5*b*' and 5*d*' are sequentially formed. The third object unit that is the object unit C or the fourth object unit that is the object unit D is formed on at least part of the outline of the invisible image.

The printing method of the anti-counterfeit printed matters according to the above-described first to fifth embodiments is not limited. Printing using a printing method capable of forming projecting objects makes the objects of the printed matter tactile in themselves. The projecting objects preferably have an object height of about 10 to 100 μm. The preferable printing method is preferably intaglio printing, screen printing, or gravure printing. The best printing method is the intaglio printing method. This method is therefore applicable to the portraits, landscapes, and the like on various securities such as banknotes, postage stamps, and revenue stamps. Note that the units described in this specification are not formed on an actual printed matter but only serve as a means to explain the positional relationship of the objects 5*a*, 5*b*, 5*c*, and 5*d*.

Figure 30:
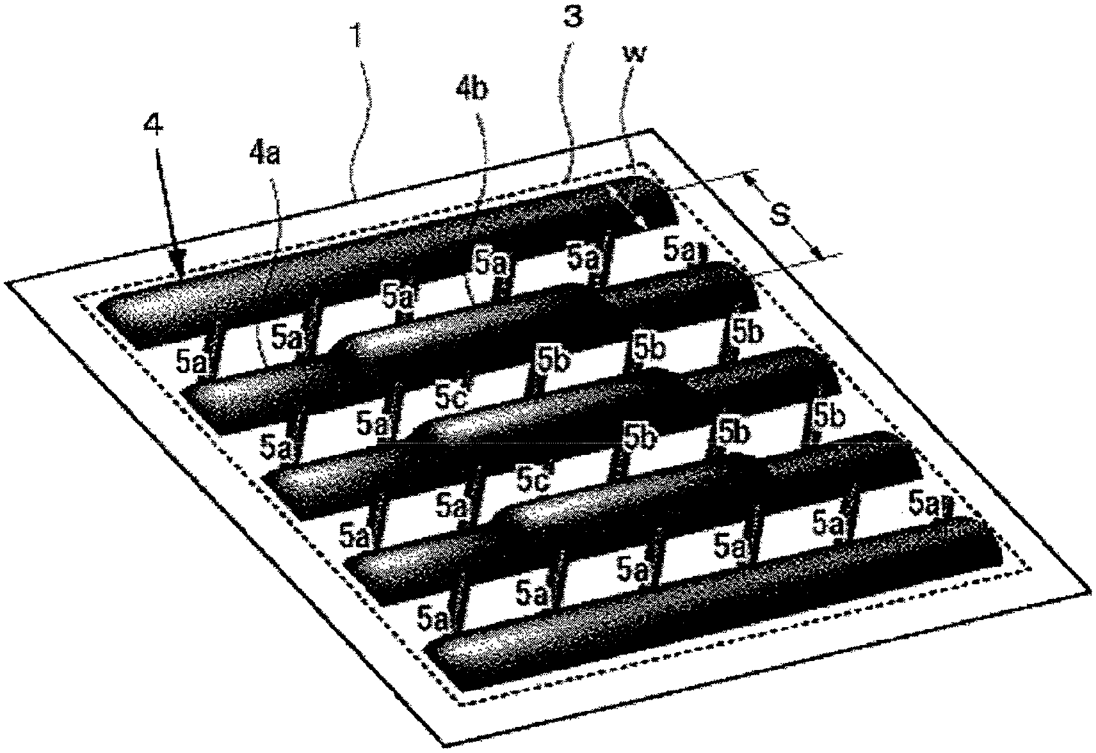
FIG. 30 is a partial perspective view conceptually showing the 3D structure of objects configured to add a first invisible image and a second invisible image.
Figure 31:
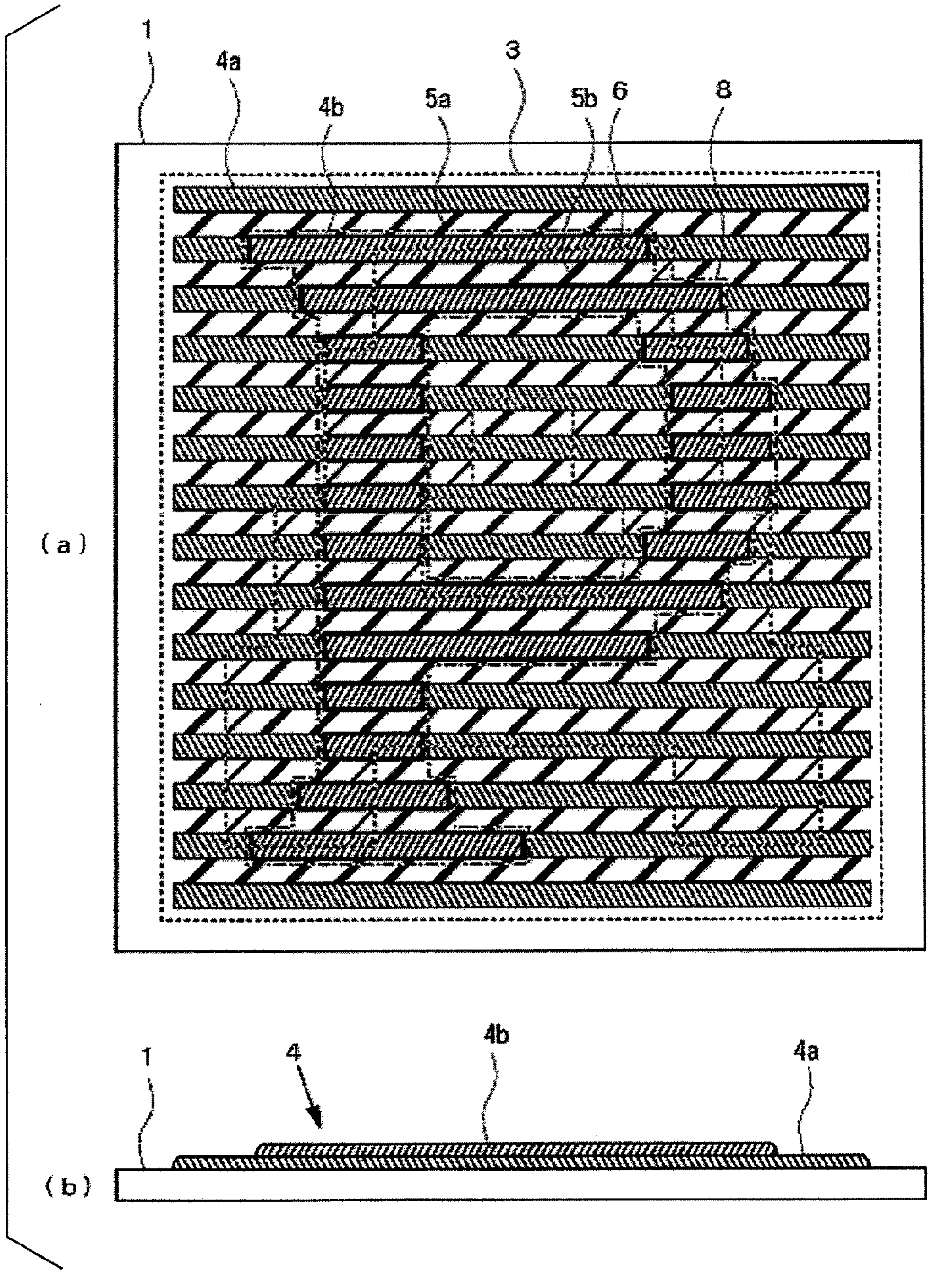
FIG. 31 shows a plan view of a printed matter 1 observed right from above and a front view of the projection height difference between a low object portion 4*a* and a high object portion 4*b;*

A printed matter will be described next, which has an invisible image to be visually recognized by observing the printed matter at an arbitrary angle other than 90° without using the discrimination tool 2 according to the above-described embodiments. FIG. 30 is a partial perspective view conceptually showing the 3D structure of objects configured to add a first invisible image 8 and the second invisible image 6 featured in the present invention. As shown in FIG. 30, the printed pattern 3 is formed on the printed matter 1. The printed pattern 3 includes the plurality of main lines 4 having an object width w and arranged at an equal interval, and the objects 5*a* to 5*d* formed in the non-imaging areas among the main lines 4. The printed pattern also includes low object portions 4*a* and high object portions 4*b* having different projection heights from the printing surface of the printed matter 1. More specifically, when the printed matter 1 is observed right from above, as shown in the plan view of FIG. 31(*a*), the observer does not recognize the projection heights of the low object portions 4*a* and the high object portions 4*b*. Actually, the low object portions 4*a* and the high object portions 4*b* have different projection heights, as shown in the front view of FIG. 31(*b*). That is, the low object portions 4*a* form the background pattern, whereas the high object portions 4*b* form a region serving as the first invisible image 8.

Figure 32:
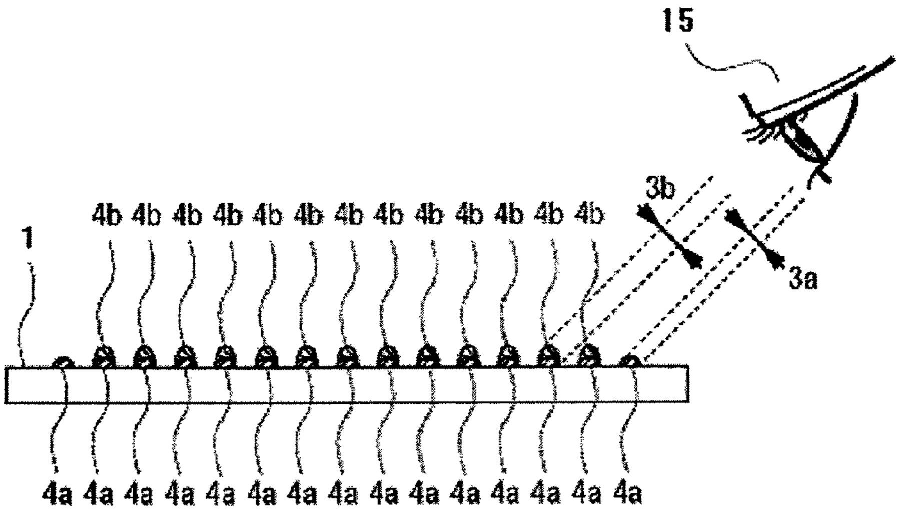
FIG. 32 is a side view of the printed matter 1 that looks in different ways because of the heights of the low object portions 4*a* and the high object portions 4*b;*
Figure 33:
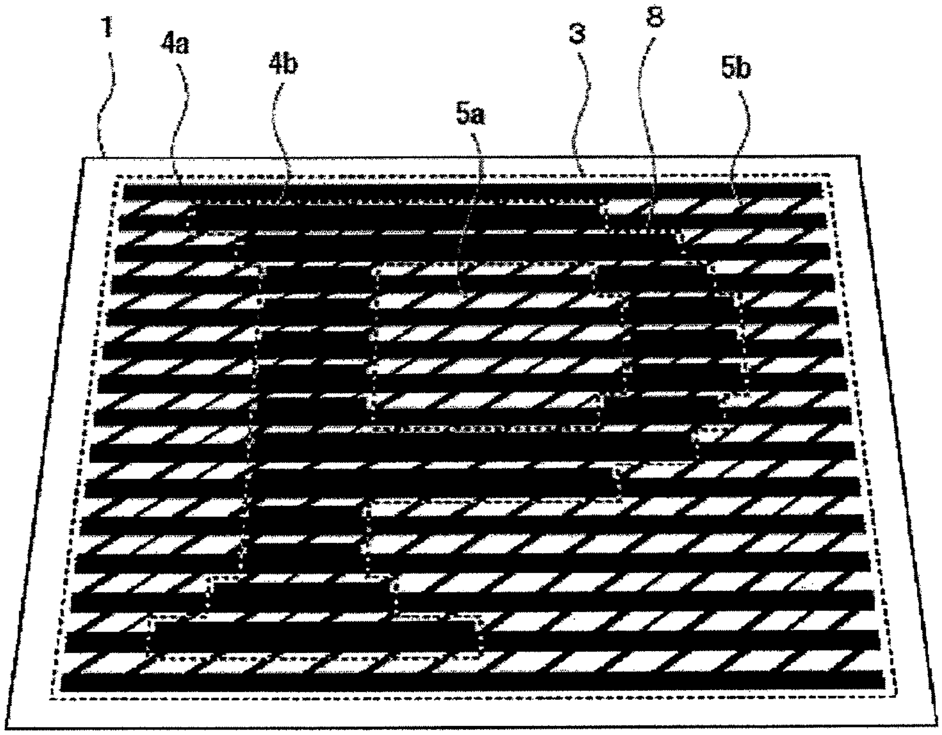
FIG. 33 is a perspective view showing a state in which the high object portions 4*b* are observed in a density higher than that of the low object portions 4*a;*

FIG. 32 is a side view of the printed matter 1 shown in FIG. 30. When the observer observes the printed matter at a visual angle 15 that is an arbitrary angle other than 90° with respect to the base material, as shown in FIG. 32, the printed matter looks in different ways because of the heights of the low object portions 4*a* and the high object portions 4*b*. A visually recognized length 3*b* of the high object portion 4*b* looks longer than a visually recognized length 3*a* of the low object portion 4*a*. That is, since the visually recognized length 3*b* of the high object portion 4*b* looks longer than the visually recognized length 3*a* of the low object portion 4*a* on the printed pattern 3, the high object portions 4*b* are observed in a density higher than that of the low object portions 4*a*, as shown in the perspective view of FIG. 33. Hence, the first invisible image 8 in the region formed by the high object portions 4*b* appears as a visible image upon observation from off-center. Note that the object pitch and the heights of the low object portions 4*a* and the high object portions 4*b* of the printed pattern 3 are not particularly limited. However, it is preferable that the object width w of the low object portions 4*a* and the high object portions 4*b* is about 200 to 600 μm, the object pitch is about 300 to 800 μm, the projection height of the low object portions 4*a* is about 10 to 30 μm, and the projection height of the high object portions 4*b* is about 20 to 60 μM. The projection height difference between the low object portions 4*a* and the high object portions 4*b* is not particularly limited but is preferably about 10 to 50 μm.

Figure 34:
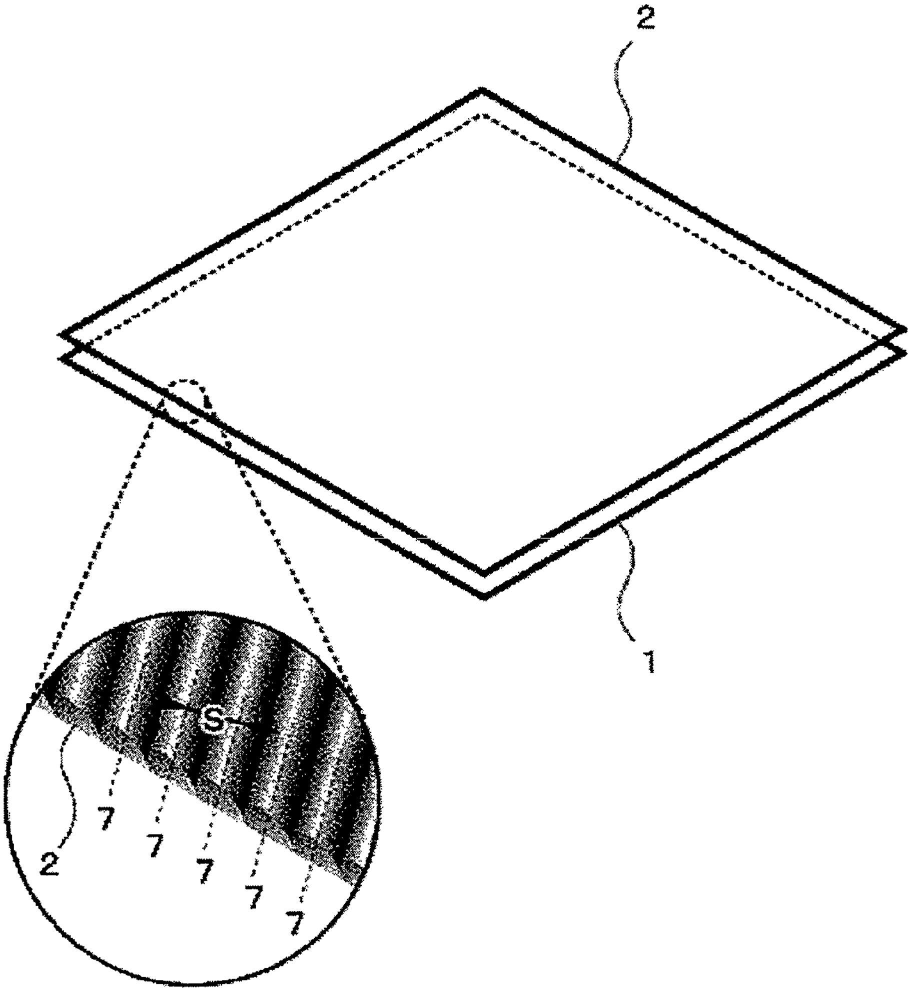
FIG. 34 is a view showing a state in which a discrimination tool 2 formed from a lenticular lens or a parallel line filter constructed by forming a plurality of lines along one direction as parallel lines on a transparent filter is overlaid on a printed matter 1.
Figure 58:
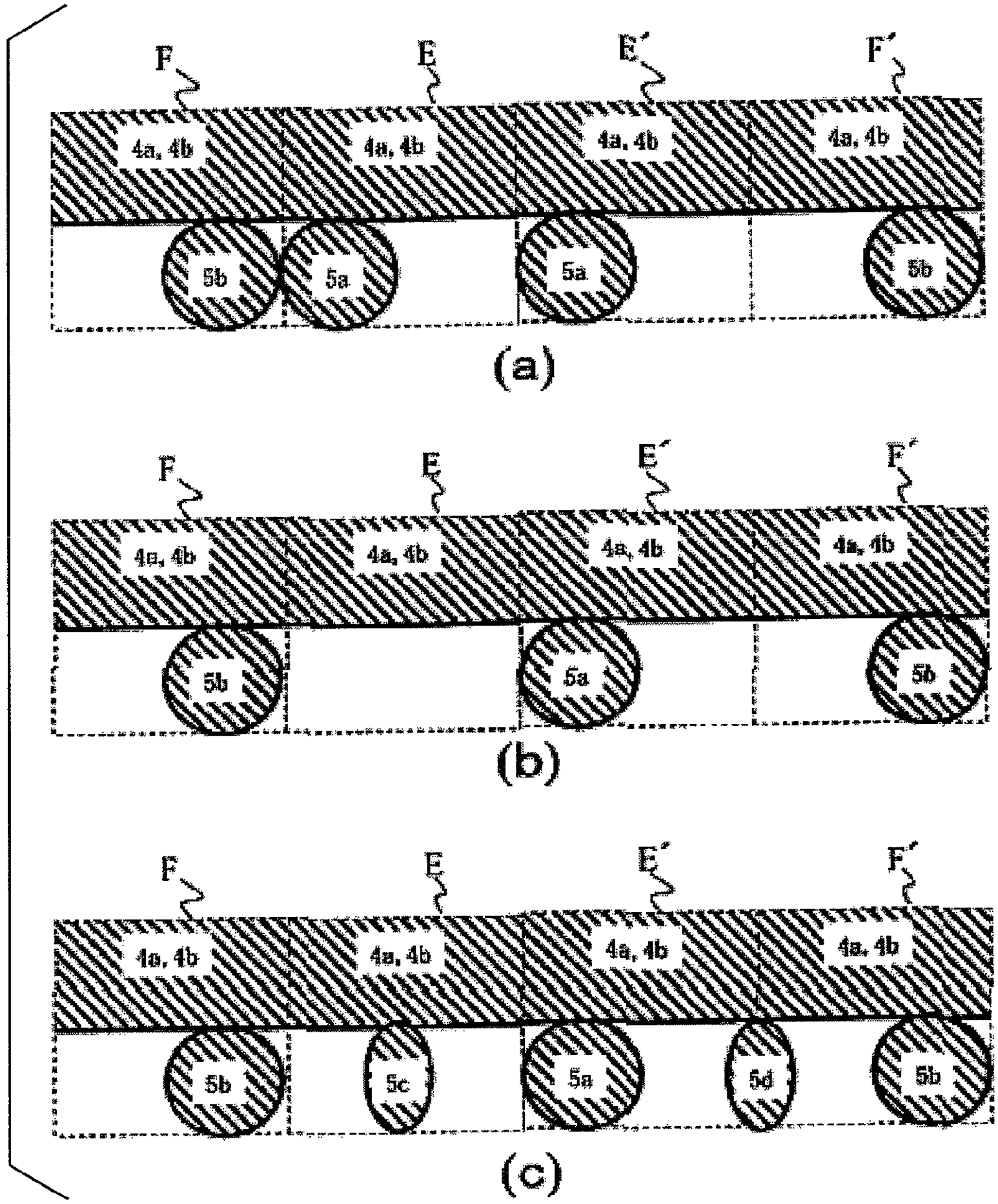
FIG. 58 shows explanatory views of a state in which objects 5*a* are deleted and objects 5*c* and 5*d* are added in fifth object units (E) configured to relax density imbalance.

It is also possible to easily visualize the invisible image to determine the authenticity by overlaying the discrimination tool 2 on the printed matter 1, as shown in FIG. 34. When visually observing the printed pattern 3 of the printed matter 1 under a normal visual condition, an object pattern is visually recognized without any change. When the lenticular lens, the parallel line filter having lines formed along one direction, or the like provided in the discrimination tool 2 is overlaid on the printed matter 1 at a predetermined angle, the second invisible image 6 formed by arranging the objects 5*a* and 5*b* is visualized as a negative or positive visible image. When visually observing under a visual condition, density imbalance occurs because of the arrangement of the objects 5*a* and 5*b*. In this case, objects are added or deleted, as shown in FIG. 58. As for object deletion, when an object unit E is arranged on the right side of an object unit F, as shown in FIG. 58(*a*), the pattern is visually recognized in a high density because the objects 5*b* and 5*a* are arranged adjacently. At this time, the object 5*a* of the object unit E is deleted, as shown in FIG. 58(*b*) (the object 5*b* may be deleted). When the object 5*a* of the object unit E is deleted, the pattern is visually recognized in a low density because the object unit E has neither the object 5*a* nor the object 5*b*, as shown in FIG. 58(*c*). Hence, the object 5*c* having an object area ratio ½ or almost ½ that of the object 5*a* or 5*b* is added at the midpoint between the object b of the object unit F adjacent to the object unit E and the object 5*a* of an object unit E'. Similarly, when an object unit F' is arranged on the right side of the object unit E', the pattern is visually recognized in a low density because of the absence of an object at the boundary between the object units. Hence, the object 5*d* having an object area ratio ½ or almost ½ that of the object 5*a* or 5*b* is added at the midpoint between the object 5*a* of the object unit E' and the object 5*b* of the object unit F'. This allows to relax the density imbalance in the entire printed matter.

Figure 35:
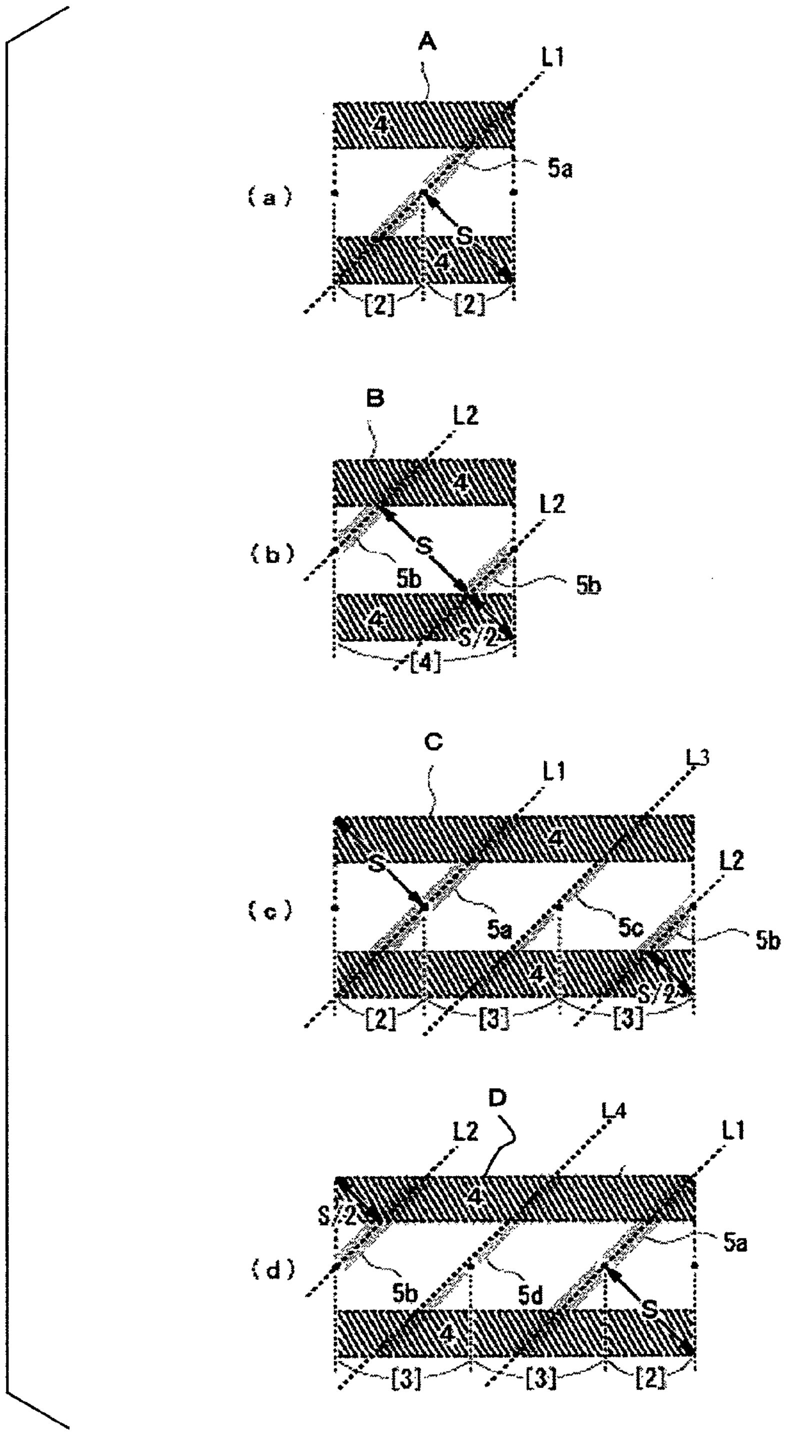
FIG. 35 shows partially enlarged explanatory views of an example of a basic object arrangement configured to visualize a second invisible image via a discrimination tool.

FIG. 35 shows partially enlarged explanatory views of the basic object arrangement after the above-described processing of relaxing the density imbalance. In the present invention, the object units include the four object units A to D shown in FIGS. 35(*a*) to 35(*d*). In the object units A to D, object groups including the objects 5*a* to 5*d* are formed in a desired arrangement. Lines L1 to L4 run along the direction of the grooves of the discrimination tool 2 shown in FIG. 34. In FIG. 35, the angle is, for example, 45°, and the dimension S equals the pitch of the grooves of the discrimination tool 2. The object units A to D shown in FIGS. 35(*a*) to 35(*d*) are arranged on the surface of the printed matter in accordance with desired rules. The size of the object units C and D is twice as large as that of the object units A and B in the longitudinal direction of the objects 4. The object 5*a* is arranged in the object unit A shown in FIG. 35(*a*). The pair of objects 5*b* is arranged in the object unit B shown in FIG. 35(*b*). The object 5*a*, the object 5*c*, and one of the objects 5*b* in pair are arranged in the object unit C shown in FIG. 35(*c*). The other of the objects 5*b* in pair, the object 5*d*, and the object 5*a* are arranged in the object unit D shown in FIG. 35(*d*). The object 5*a* arranged in the object unit A shown in FIG. 35(*a*) and the pair of objects 5*b* arranged in the object unit B shown in FIG. 35(*b*) have the same or almost the same object area. Note that the pair of objects 5*b* includes objects obtained by dividing the object 5*a*. The object 5*c* arranged in the object unit C shown in FIG. 35(*c*) has an object area ½ or almost ½ that of the object 5*a* arranged in the object unit C or the pair of objects 5*b*. The object 5*c* is arranged almost at the midpoint between the object 5*a* and one object 5*b* arranged in the object unit C. The object 5*d* arranged in the object unit D shown in FIG. 35(*d*) has an object area ½ or almost ½ that of the object 5*a* arranged in the object unit D or the pair of objects 5*b*. The object 5*d* is arranged almost at the midpoint between the object 5*a* and the other object 5*b* arranged in the object unit D.

As for the positional relationship of the objects 5*a* to 5*d* of the object units A to D shown in FIGS. 35(*a*) to 35(*d*), they can be arranged based on a ratio of "2:3:4" in the longitudinal direction of the objects 4. In the object unit A shown in FIG. 35(*a*), the object 5*a* is arranged at a position based on a ratio of "2:2" in the longitudinal direction of the objects 4. That is, the center of the object 5*a* is arranged at the center of the object unit A. In the object unit B shown in FIG. 35(*b*), the objects 5*b* in pair are arranged at positions based on ratios of "0:4" and "4:4" in the longitudinal direction of the objects 4. That is, the objects 5*b* in pair are arranged at the two edges of the object unit B. Alternatively, the objects 5*b* in pair may be arranged at equal intervals from the center of the object unit B shown in FIG. 35(*b*) so as to oppose each other. In the object unit C shown in FIG. 35(*c*), the object 5*a*, the object 5*c*, and one of the objects 5*b* are arranged at positions based on a ratio of "2:3:3" in the longitudinal direction of the objects 4. That is, the center of the object 5*a* is spaced apart from the left edge by 2, the center of the object 5*c* is spaced apart from the object 5*a* by 3, and the other of the objects 5*b* is spaced apart from the object 5*c* by 3. In the object unit D shown in FIG. 35(*d*), the object 5*a*, the object 5*c*, and the other of the objects 5*b* are arranged at positions based on a ratio of "3:3:2" in the longitudinal direction of the objects 4. That is, the other of the objects 5*b* is arranged at the left edge, the center of the object 5*d* is spaced apart from the object 5*b* by 3, and the center of the object 5*a* is spaced apart from the object 5*d* by 3.

The objects 5*a* to 5*d* of the object units A to D shown in FIGS. 35(*a*) to 35(*d*) need not always have the shapes shown in FIG. 35 and may have any other shapes. For example, the objects 5*a* and 5*b* and the objects 5*c* and 5*d* may have similar elliptical shapes. The objects 5*c* and 5*d* may have an elliptical shape thinner along the direction of the lines L3 and L4 than the objects 5*a* and 5*b*. The objects 5*a* and 5*b* and the objects 5*c* and 5*d* may be parallelograms having an object width ratio of 2:1 along the direction of the lines L3 and L4. That is, the shapes of the objects 5*a* to 5*d* are not particularly limited as long as the objects 5*c* and 5*d* have an object area ratio ½ or almost ½ that of the objects 5*a* and 5*b*. However, as represented by FIG. 35, the objects are preferably elongated in the direction of the lines L1 and L2 or the lines L3 and L4 spaced apart by the dimension S.

Figure 36:
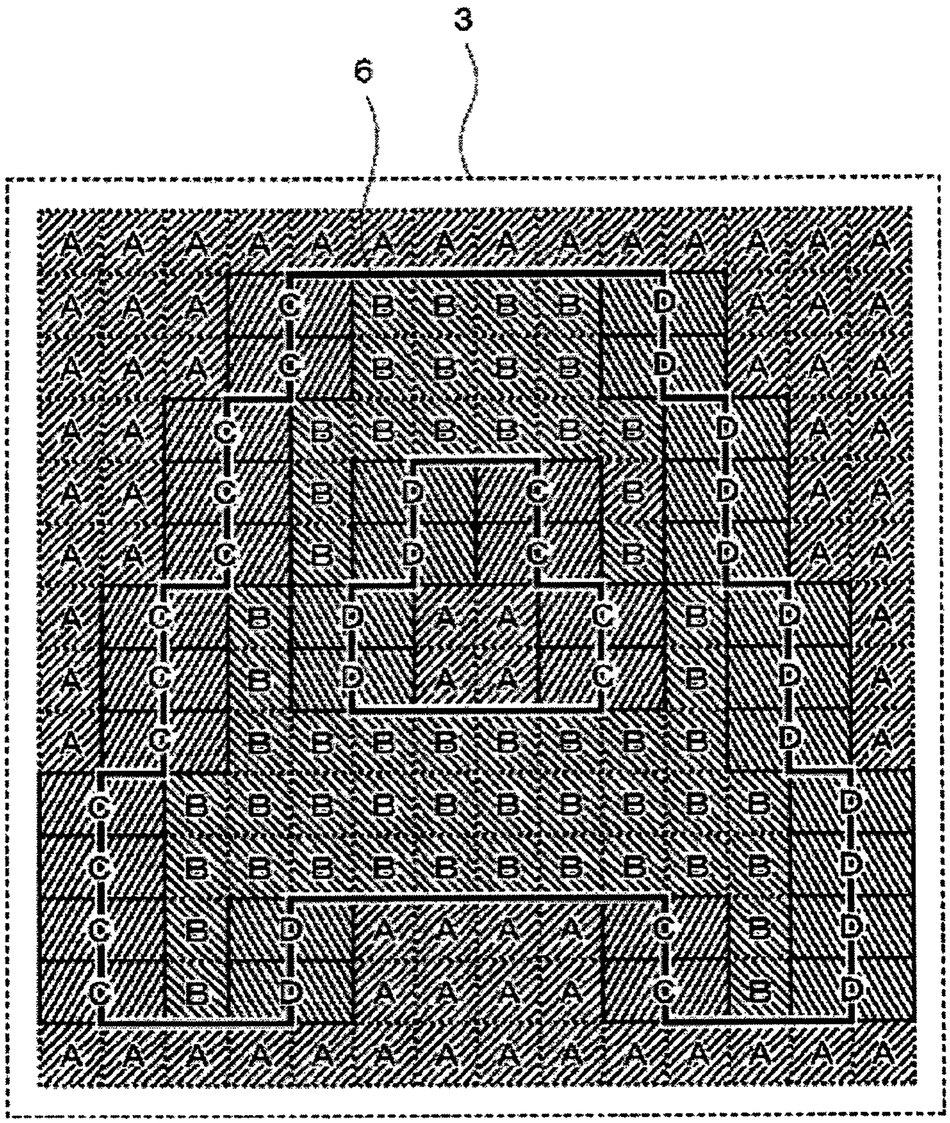
FIG. 36 is an explanatory view showing a positional relationship in which object units A in FIG. 35(*a*), object units B in FIG. 35(*b*), object units C in FIG. 35(*c*), and object units D in FIG. 35(*d*) are continuously periodically arranged in a matrix on a printed pattern 3 of a printed matter tightly in the vertical and horizontal directions.

FIG. 36 is an explanatory view showing a positional relationship in which the object units A in FIG. 35(*a*) and the object units B in FIG. 35(*b*) are continuously periodically arranged in a matrix on the printed pattern 3 of the printed matter tightly in the vertical and horizontal directions. Note that the bold solid lines in FIG. 36 simply indicate the portion of the second invisible image 6. In addition, the object units C shown in FIG. 35(*c*) and the object units D shown in FIG. 35(*d*) are arranged on at least part of the outline of the second invisible image 6 so as to maintain the continuity of the object groups of the object units A and B. The object units C are arranged at places where the object units A on the left side and the object units B on the right side are adjacent in the horizontal direction (the longitudinal direction of the objects 4 when all units are arranged). That is, the object units C are arranged on the left outline of the second invisible image 6. On the other hand, the object units D are arranged at places where the object units B on the left side and the object units A on the right side are adjacent in the horizontal direction (the longitudinal direction of the objects 4 shown in FIG. 1). That is, the object units D are arranged on the right outline of the second invisible image 6.

In this state, the discrimination tool 2 formed from, for example, a lenticular lens is overlaid on the printed pattern 3 of the printed matter 1, as shown in FIG. 34, and the printed pattern is visually observed from the front. This allows to visualize the second invisible image 6 formed on the printed pattern 3 as a visible image.

Upon normal visual observation, the entire printed pattern 3 is visually recognized as an arbitrary design, that is, a visible image. However, the second invisible image 6 formed in the printed pattern 3 is not visually recognized. When the discrimination tool is overlaid at a predetermined position on the printed pattern, the second invisible image 6 that could not be visually recognized so far becomes visible. The principles of the visual recognition effect of the second invisible image 6 according to the first embodiment will be described below.

Figure 37:
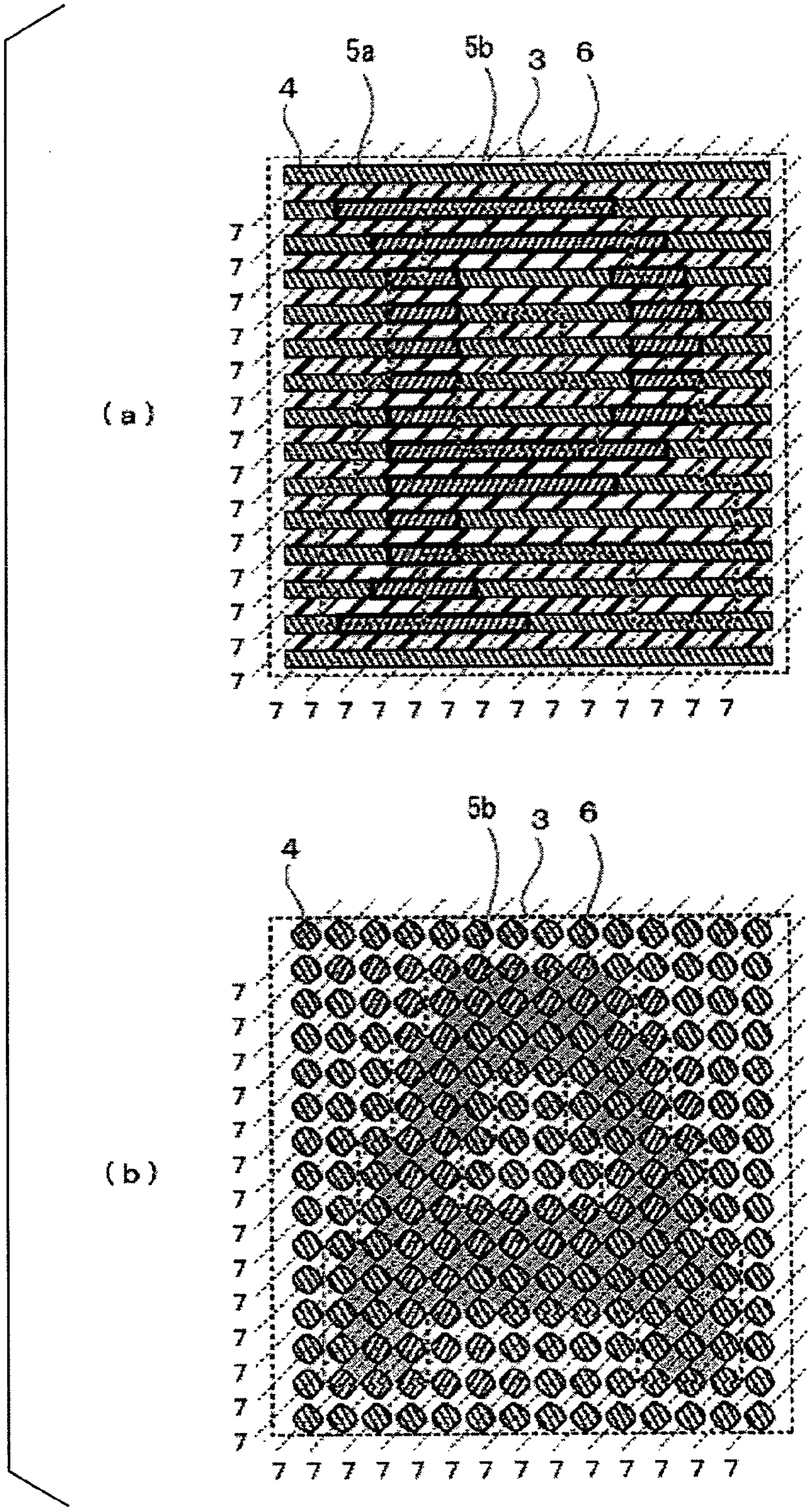
FIG. 37 shows views of a state in which visual observation from the front is done while overlaying a discrimination tool formed from a lenticular lens on the printed pattern 3 of the printed matter 1.
Figure 38:
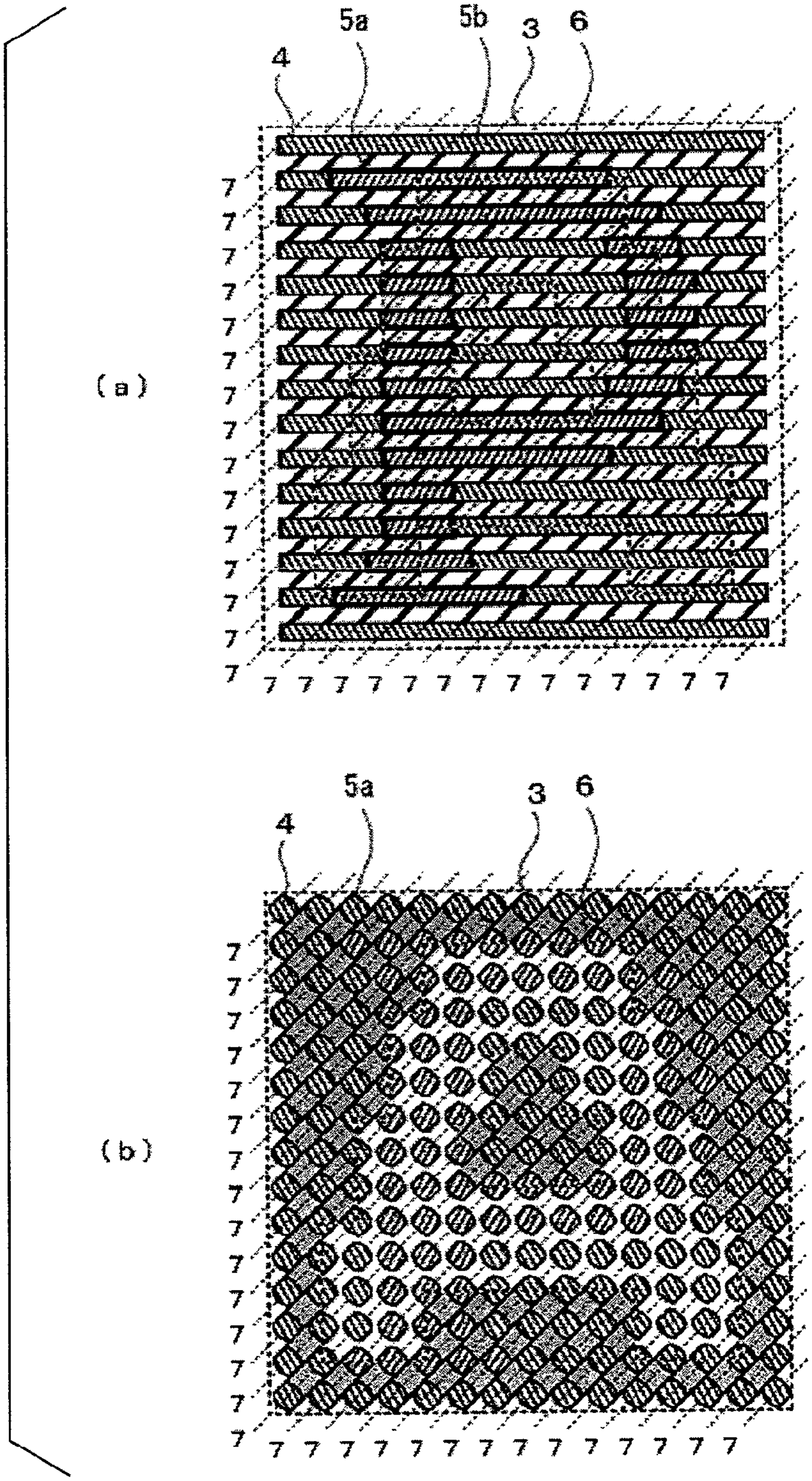
FIG. 38 shows views of a state in which visual observation from the front is done while overlaying a discrimination tool formed from a lenticular lens on the printed pattern 3 of the printed matter 1.

FIGS. 37 and 38 show a state in which visual observation from the front is done while overlaying the discrimination tool 2 formed from a lenticular lens on the printed pattern 3 of the printed matter 1 at a predetermined angle and, more specifically, so as to make the center line of each lens element coincide with the line L1 in FIG. 35. When each center line 7 of the lenticular lens exists at the position shown in FIG. 37(*a*) so as to coincide with the line L1 in FIG. 35, the objects 5*a* are located on the center lines 7. Since the objects 5*a* located on the center lines 7 look magnified by the characteristics of the lenticular lens, a visible image having the graphic pattern shown in FIG. 37(*b*) is visualized upon visual observation. When each center line 7 of the lenticular lens exists at the position shown in FIG. 38(*a*) so as to coincide with the line L2 in FIG. 35, the objects 5*b* are located on the center lines 7. Since the objects 5*b* located on the center lines 7 look magnified by the characteristics of the lenticular lens, a visible image having the graphic pattern shown in FIG. 38(*b*) is visualized upon visual observation. The objects 5*a* and 5*b* have a negative/positive relationship. Hence, the second invisible image 6 appears as a negative or positive visible image.

Figure 53:
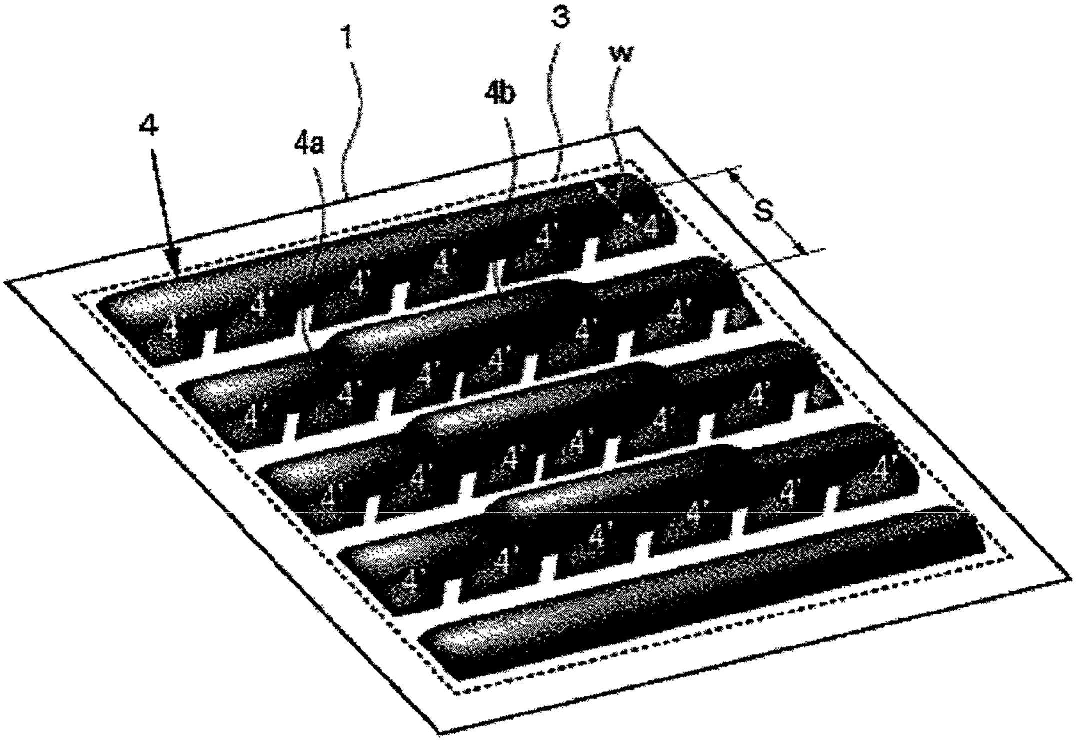
FIG. 53 is a partial perspective view conceptually showing the 3D structure of objects configured to add a first invisible image and a second invisible image.
Figure 54:
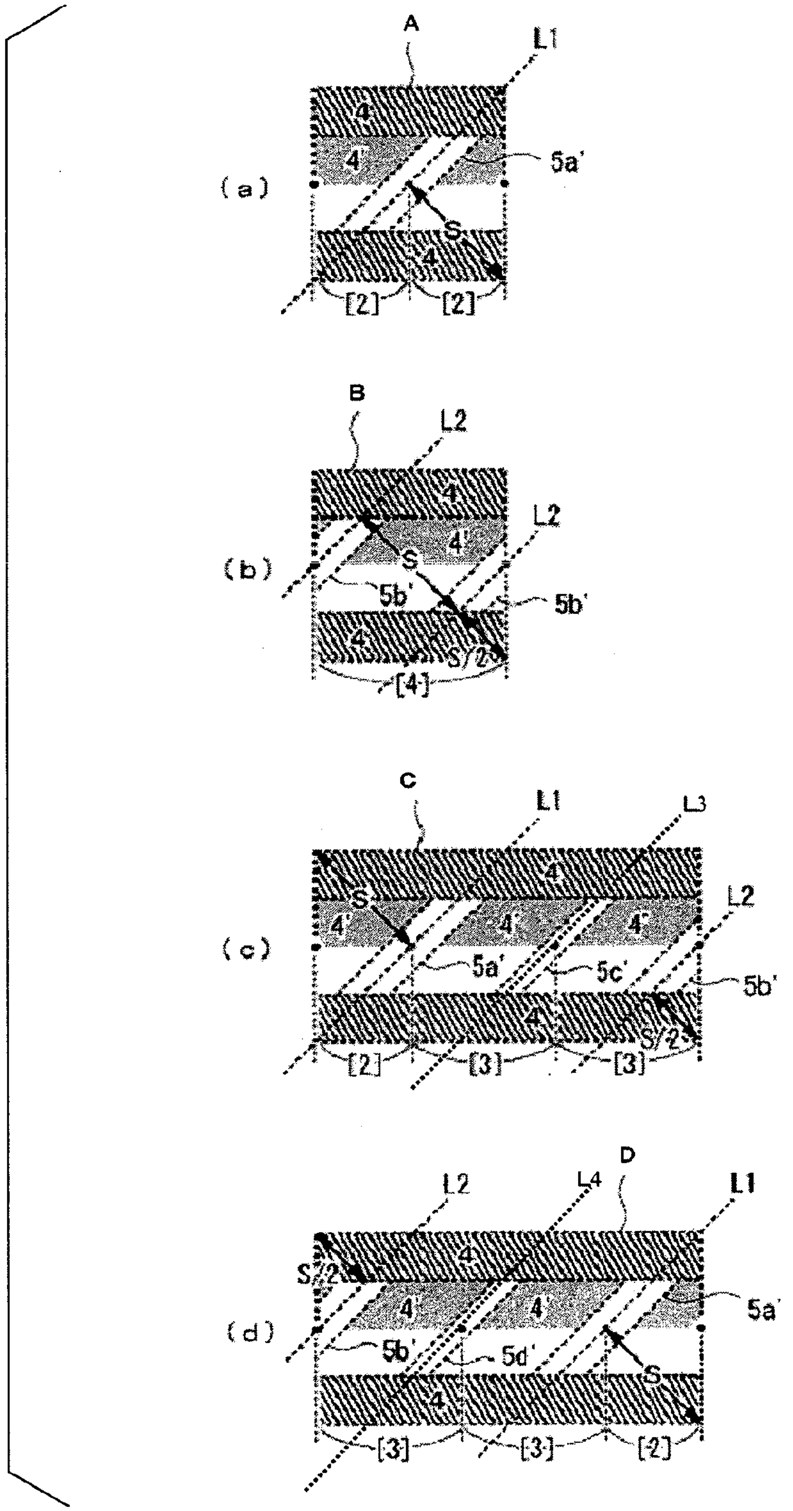
FIG. 54 shows partially enlarged explanatory views of an example of a basic object arrangement configured to visualize a second invisible image via a discrimination tool.

Alternatively, for example, the objects that form the second invisible image 6 in FIGS. 30 to 35 may have shapes like objects 4' that are in contact with the first objects 4 shown in the perspective view of FIG. 53. The objects 5*a* to 5*d* shown in FIG. 30 are colored objects. In FIG. 53, however, the portions corresponding to the objects 5*a* to 5*d* are uncolored hollow portions of the objects 4'. More specifically, as shown in the partial enlarged view of the basic object arrangement configured to visualize the second invisible image 6 via the discrimination tool 2 in FIG. 34, In the present invention, the object units include the four object units A to D shown in FIGS. 54(*a*) to 54(*d*). In the object units A to D, object groups including hollow portions 5*a*' to 5*d*' in the objects 4' in contact with the objects 4 are formed in a desired arrangement. Lines L1 to L4 run along the direction of the grooves of the discrimination tool 2 shown in FIG. 34. In FIG. 54, the angle is, for example, 45°, and the dimension S equals the pitch of the grooves of the discrimination tool 2. The object units A to D shown in FIGS. 54(*a*) to 54(*d*) are arranged on the surface of the printed matter in accordance with desired rules. The size of the object units C and D is twice as large as that of the object units A and B in the longitudinal direction of the objects 4. The hollow portion 5*a*' is arranged in the object unit A shown in FIG. 54(*a*). The pair of hollow portions 5*b*' is arranged in the object unit B shown in FIG. 54(*b*). The hollow portion 5*a*', the hollow portion 5*c*', and one of the hollow portions 5*b*' in pair are arranged in the object unit C shown in FIG. 54(*c*). The other of the hollow portions 5*b*' in pair, the hollow portion 5*d*', and the hollow portion 5*a*' are arranged in the object unit D shown in FIG. 54(*d*). The hollow portion 5*a*' arranged in the object unit A shown in FIG. 54(*a*) and the pair of hollow portions 5*b*' arranged in the object unit B shown in FIG. 54(*b*) have the same or almost the same space area. Note that the pair of hollow portions 5*b*' includes spaces obtained by dividing the hollow portion 5*a*'. The hollow portion 5*c*' arranged in the object unit C shown in FIG. 54(*c*) has a space area ½ or almost ½ that of the hollow portion 5*a*' arranged in the object unit C or the pair of hollow portions 5*b*'. The hollow portion 5*c*' is arranged almost at the midpoint between the hollow portion 5*a*' and one hollow portion 5*b*' arranged in the object unit C. The hollow portion 5*d*' arranged in the object unit D shown in FIG. 54(*d*) has a space area ½ or almost ½ that of the hollow portion 5*a*' arranged in the object unit D or the pair of hollow portions 5*b*'. The hollow portion 5*d*' is arranged almost at the midpoint between the hollow portion 5*a*' and the other hollow portion 5*b*' arranged in the object unit D.

As for the positional relationship of the hollow portions 5*a*' to 5*d*' of the object units A to D shown in FIGS. 54(*a*) to 54(*d*), they can be arranged based on a ratio of "2:3:4" in the longitudinal direction of the objects 4. In the object unit A shown in FIG. 54(*a*), the hollow portion 5*a*' is arranged at a position based on a ratio of "2:2" in the longitudinal direction of the objects 4. That is, the center of the hollow portion 5*a*' is arranged at the center of the object unit A. In the object unit B shown in FIG. 54(*b*), the hollow portions 5*b*' in pair are arranged at positions based on ratios of "0:4" and "4:4" in the longitudinal direction of the objects 4. That is, the hollow portions 5*b*' in pair are arranged at the two edges of the object unit B. Alternatively, the hollow portions 5*b*' in pair may be arranged at equal intervals from the center of the object unit B shown in FIG. 54(*b*) so as to oppose each other. In the object unit C shown in FIG. 54(*c*), the hollow portion 5*a*', the hollow portion 5*c*', and one of the hollow portions 5*b*' are arranged at positions based on a ratio of "2:3:3" in the longitudinal direction of the objects 4. That is, the center of the hollow portion 5*a*' is spaced apart from the left edge by 2, the center of the hollow portion 5*c*' is spaced apart from the hollow portion 5*a*' by 3, and the other of the hollow portions 5*b*' is spaced apart from the hollow portion 5*c*' by 3. In the object unit D shown in FIG. 54(*d*), the hollow portion 5*a*', the hollow portion 5*c*', and the other of the hollow portions 5*b*' are arranged at positions based on a ratio of "3:3:2" in the longitudinal direction of the objects 4. That is, the other of the hollow portions 5*b*' is arranged at the left edge, the center of the hollow portion 5*c*' is spaced apart from the hollow portion 5*b*' by 3, and the center of the hollow portion 5*a*' is spaced apart from the hollow portion 5*d*' by 3. The hollow portions 5*a*' to 5*d*' of the object units A to D shown in FIGS. 54(*a*) to 54(*d*) need not always have the shapes shown in FIG. 54 and may have any other shapes. For example, the hollow portions 5*a*' and 5*b*' and the hollow portions 5*c*' and 5*d*' may have similar elliptical shapes. The hollow portions 5*c*' and 5*d*' may have an elliptical shape thinner along the direction of the lines L3 and L4 than the hollow portions 5*a*' and 5*b*'. The hollow portions 5*a*' and 5*b*' and the hollow portions 5*c*' and 5*d*' may be parallelograms having an object width ratio of 2:1 along the direction of the lines L3 and L4. That is, the shapes of the hollow portions 5*a*' to 5*d*' are not particularly limited as long as the hollow portions 5*c*' and 5*d*' have an object area ratio ½ or almost ½ that of the hollow portions 5*a*' and 5*b*'. However, as represented by FIG. 54, the hollow portions are preferably elongated in the direction of the lines L1 and L2 or the lines L3 and L4 spaced apart by the dimension S.

Figure 55:
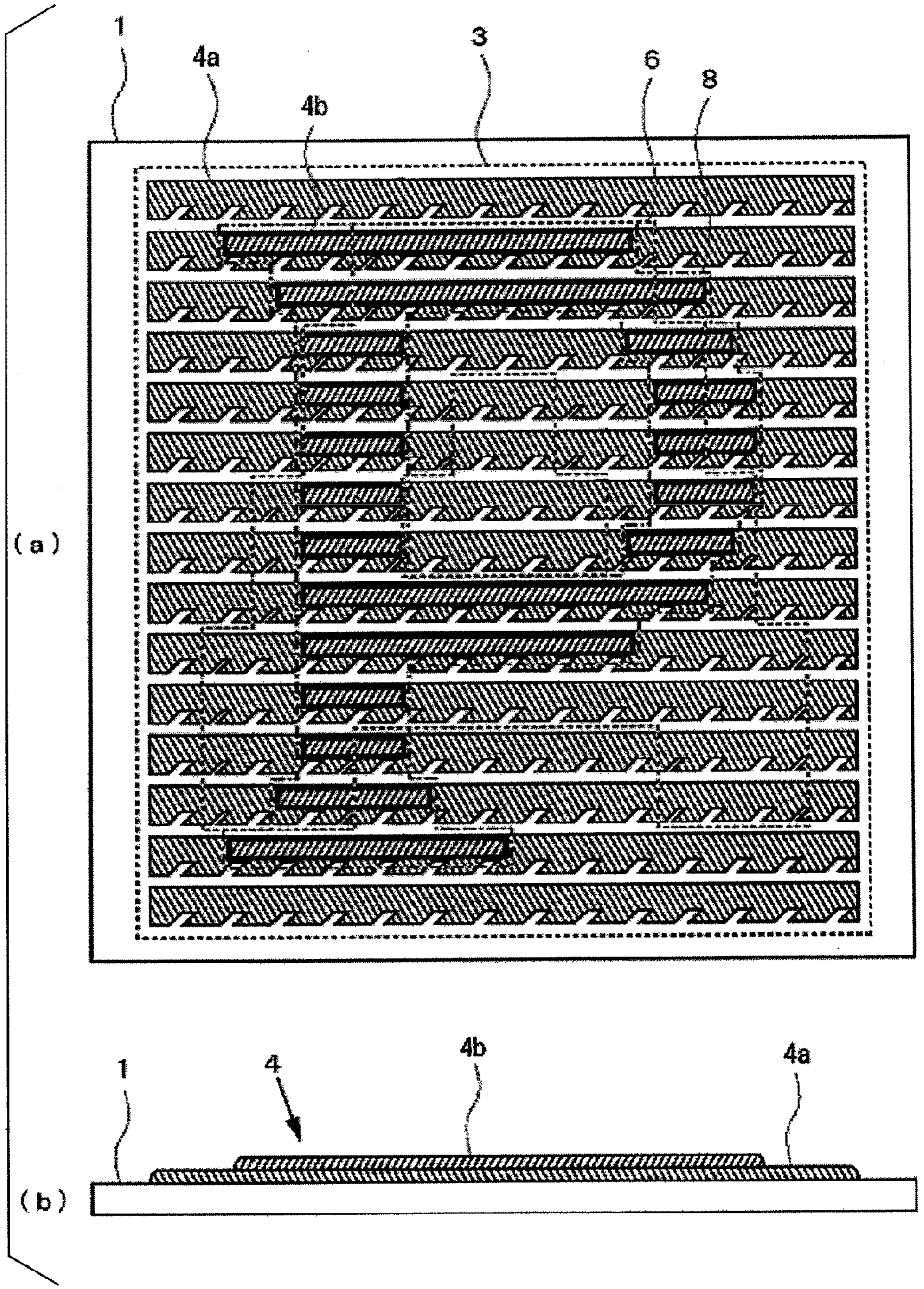
FIG. 55 shows explanatory views of a state in which objects 4 include low object portions 4*a* and high object portions 4*b;*

When the object units A to D shown in FIG. 54 are continuously periodically arranged in a matrix on the printed matter tightly in the vertical and horizontal directions, as shown in FIG. 55, the printed pattern 3 as shown in FIG. 55 is obtained. FIG. 55 shows explanatory views of a state in which the objects 4 include the low object portions 4*a* and the high object portions 4*b*. When the printed matter 1 is observed right from above, as shown in the plan view of FIG. 55(*a*), the observer does not recognize the projection heights of the low object portions 4*a* and the high object portions 4*b*. Actually, the low object portions 4*a* and the high object portions 4*b* have different projection heights, as shown in the front view of FIG. 55(*b*). That is, the low object portions 4*a* form the background pattern, whereas the high object portions 4*b* form a region serving as the first invisible image 8. Hence, the first invisible image 8 in the region formed by the high object portions 4*b* appears as a visible image upon observation from off-center.

Figure 56:
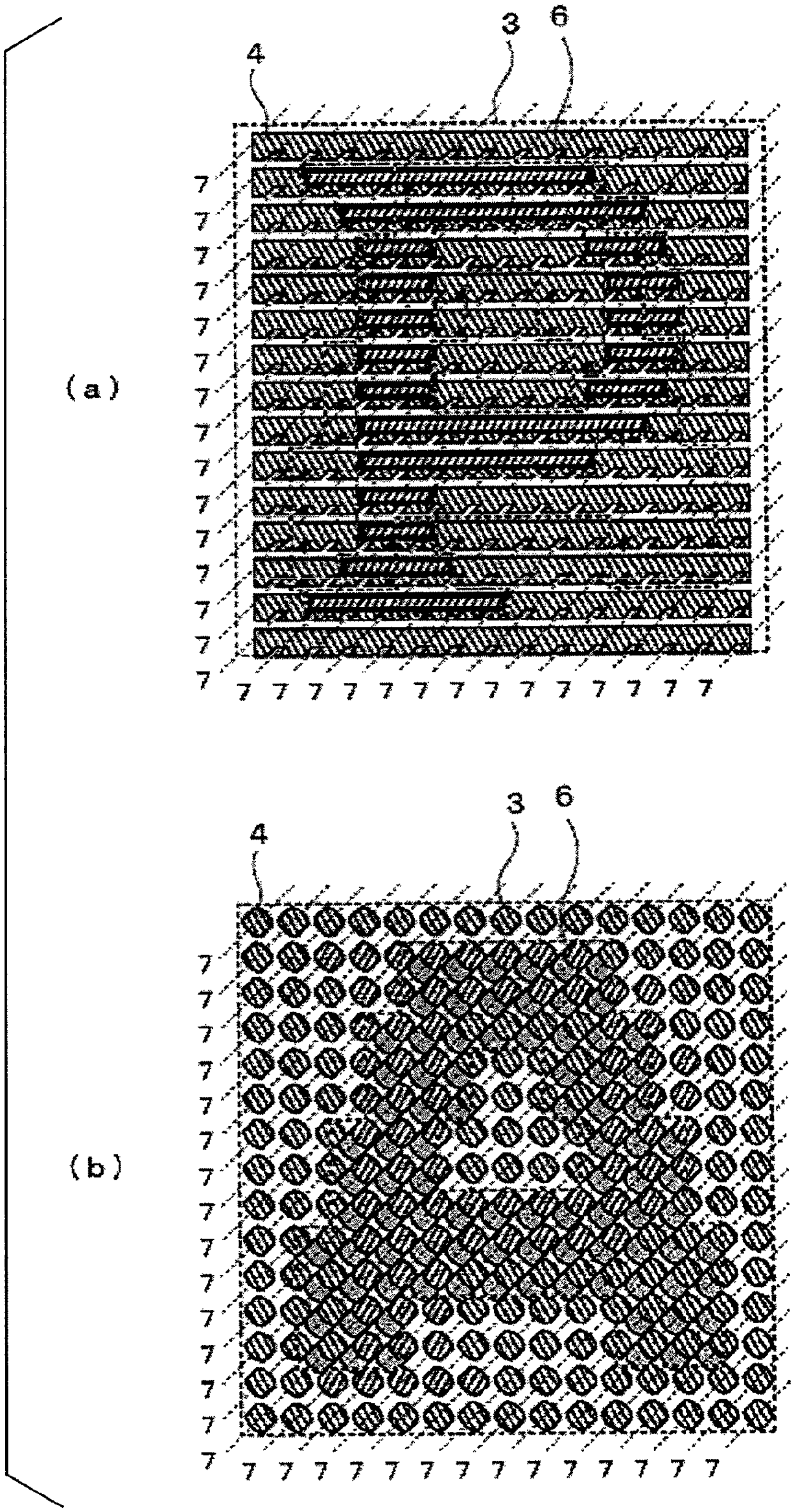
FIG. 56 shows views of a state in which visual observation from the front is done while overlaying a discrimination tool formed from a lenticular lens on the printed pattern 3 of a printed matter.
Figure 57:
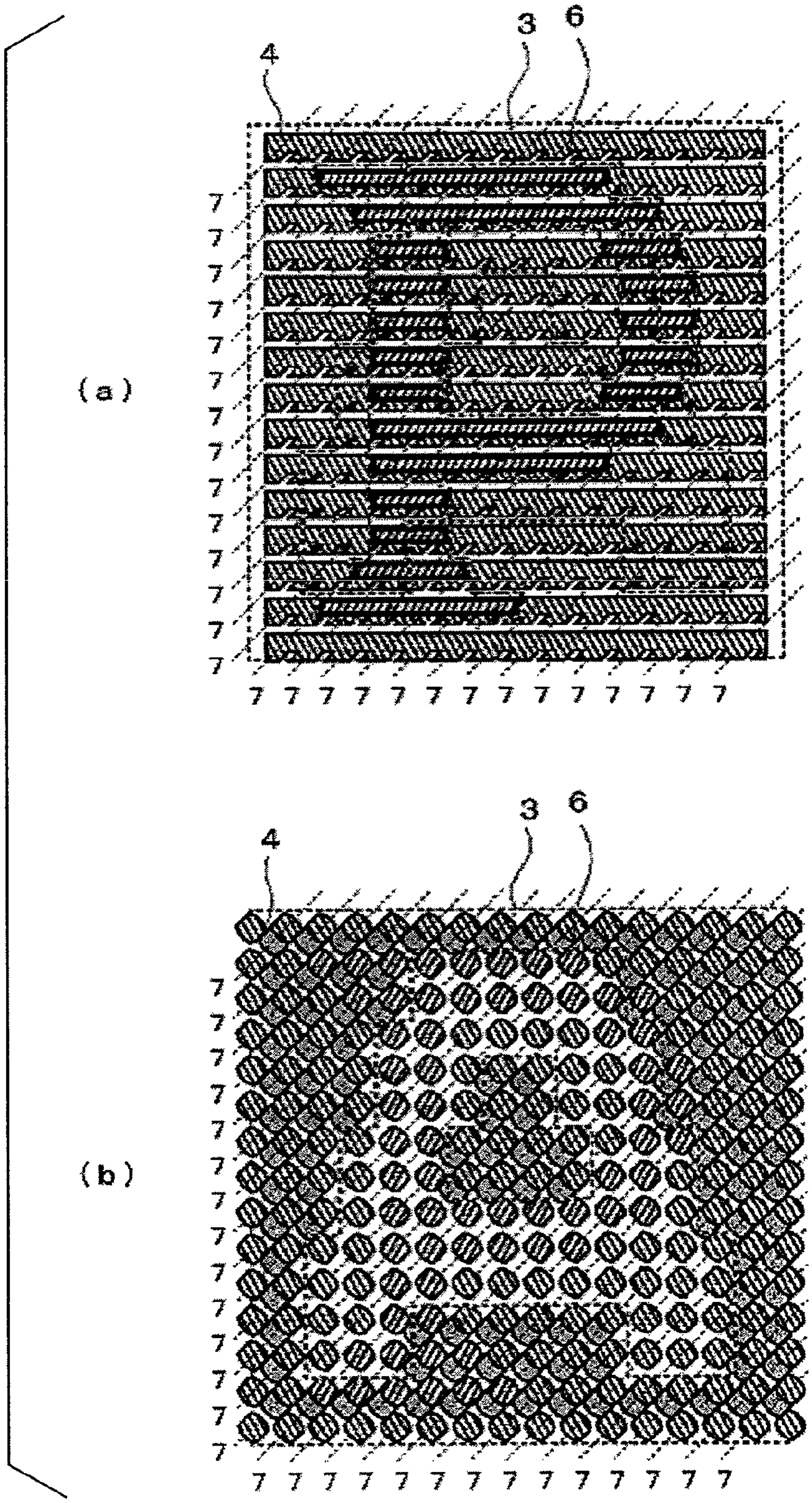
FIG. 57 shows views of a state in which visual observation from the front is done while overlaying a discrimination tool formed from a lenticular lens on the printed pattern 3 of a printed matter.

FIGS. 56 and 57 show a state in which visual observation from the front is done while overlaying the discrimination tool 2 formed from a lenticular lens on the printed pattern 3 of the printed matter 1 at a predetermined angle and, more specifically, so as to make the center line of each lens element coincide with the line L1 in FIG. 54. When each center line 7 of the lenticular lens exists at the position shown in FIG. 56(*a*) so as to coincide with the line L1 in FIG. 54, a visible image having the graphic pattern shown in FIG. 56(*b*) is visualized upon visual observation. When each center line 7 of the lenticular lens exists at the position shown in FIG. 57(*a*) so as to coincide with the line L2 in FIG. 54, a visible image having the graphic pattern shown in FIG. 57(*b*) is visualized upon visual observation. The hollow portions 5*a*' and 5*b*' have a negative/positive relationship. Hence, the second invisible image 6 appears as a negative or positive visible image.

Note that in the best mode for carrying out the present invention, the dimension S is 340 μm, and the printed pattern 3 is printed on a coated paper sheet by offset printing. However, the dimension S is not particularly limited, and the printing medium used for the printed matter 1 can be of any type such as quality paper or coated paper. The plate making and printing method for transferring the printed pattern 3 to the printing medium can also be of any type such as intaglio printing or screen printing if the method can make the material project from the printing surface.

Anti-counterfeit printed matters according to the sixth to ninth embodiments of the present invention will now be described with reference to the accompanying drawings. However, the present invention is not limited to the sixth to ninth embodiments to be described below and also incorporates various other embodiments within the technical scope defined in the appended claims.

(6) Sixth Embodiment

Figure 39:
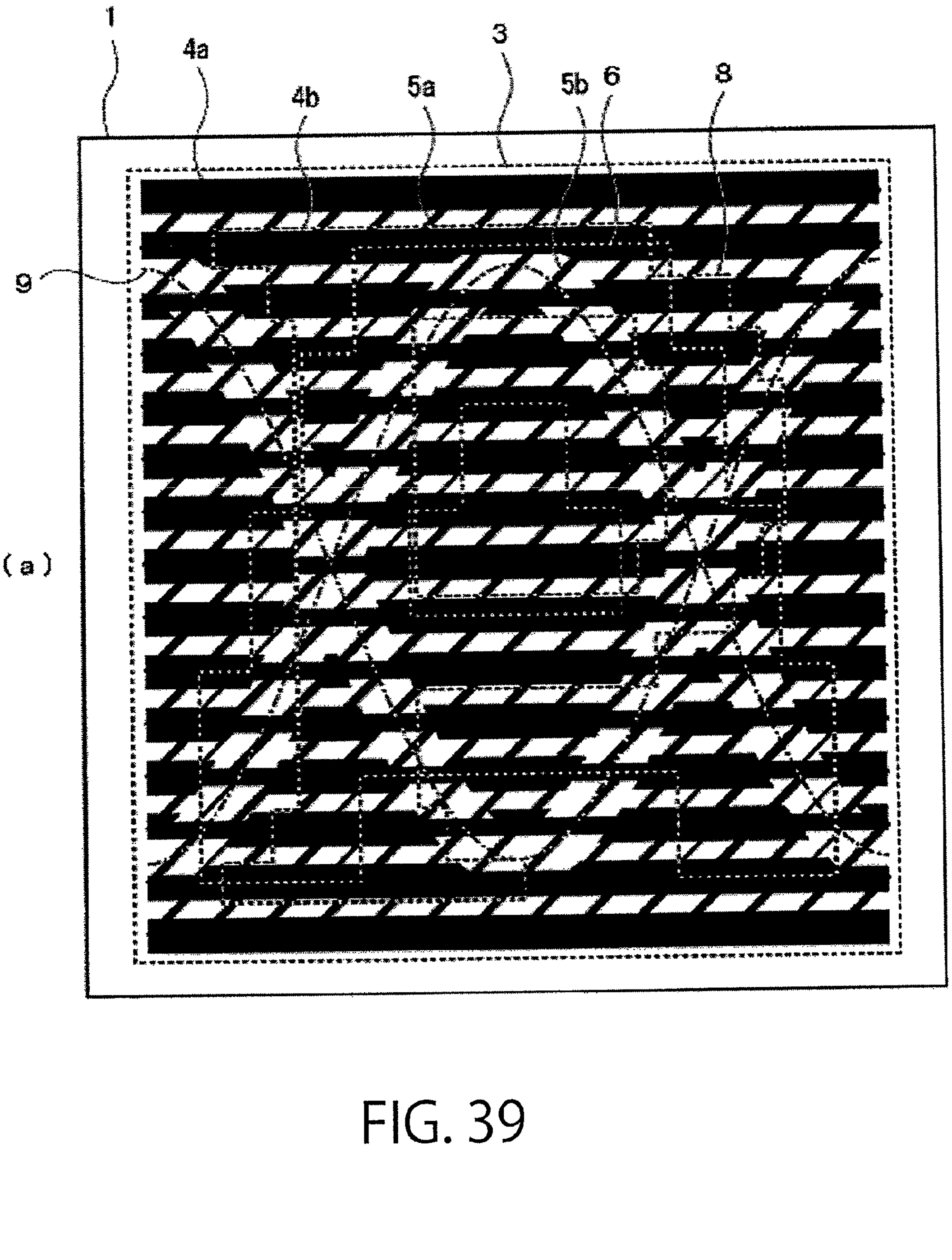
FIG. 39 is a view showing a state in which objects 4 are thinner in a pattern 9 having an arbitrary shape.
Figure 59:
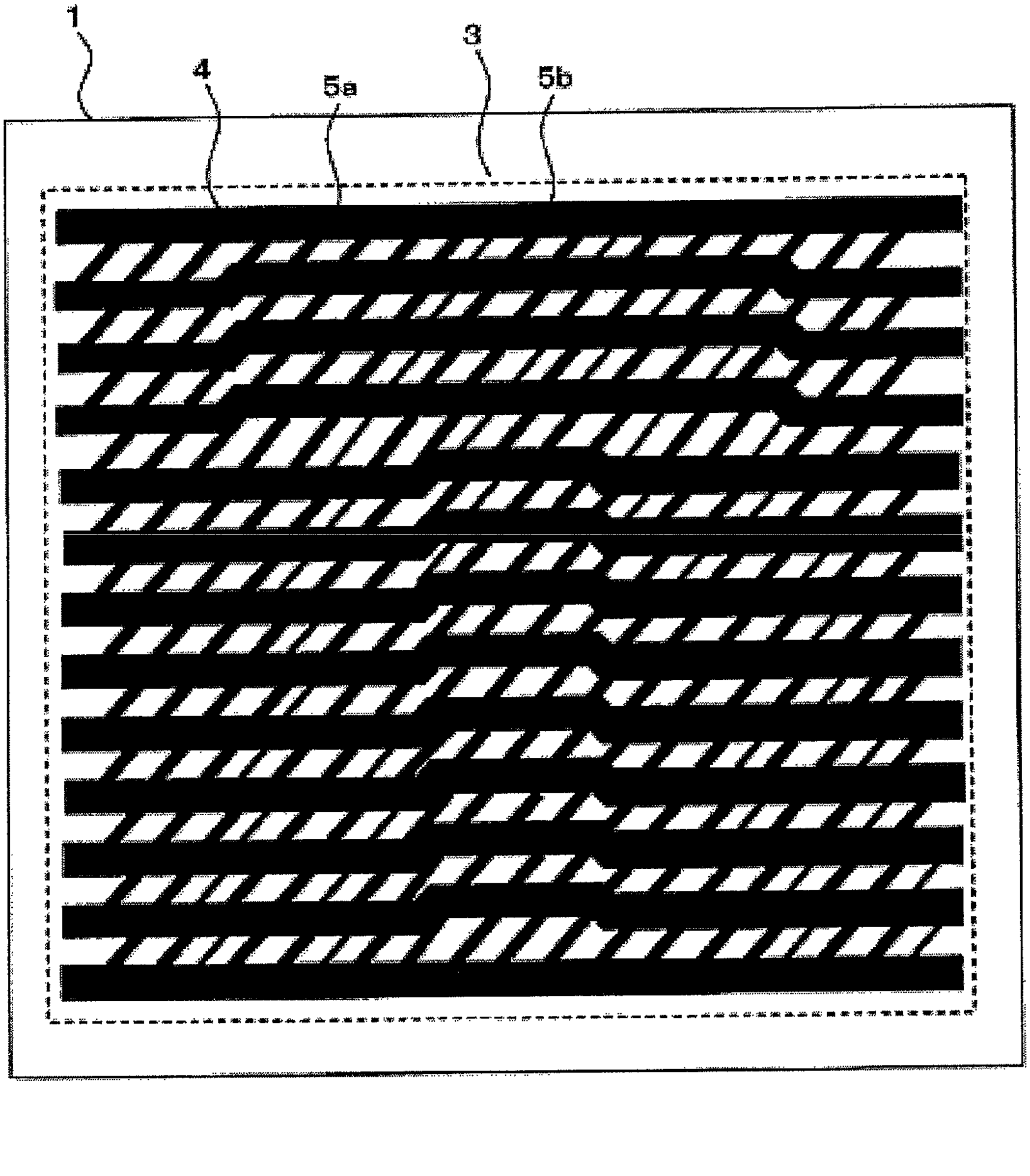
FIG. 59 is a view showing a state in which a pattern T is formed by making first objects in relief.
Figure 60:
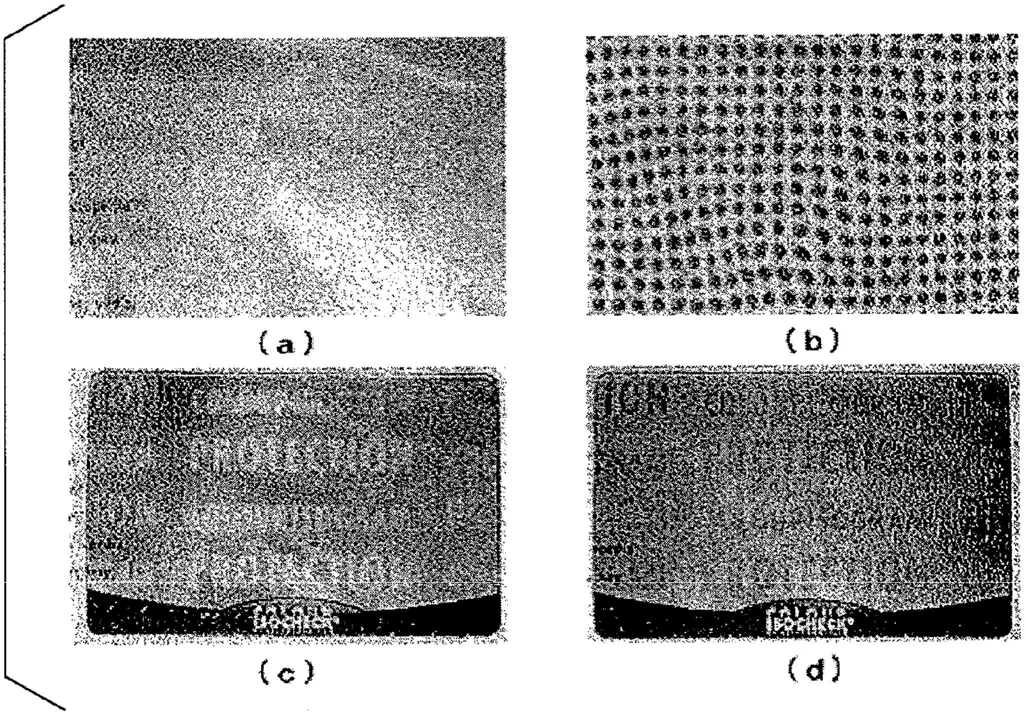
FIG. 60 shows views of an example of an authenticity determination method abroad using dot phase modulation.
Figure 61:
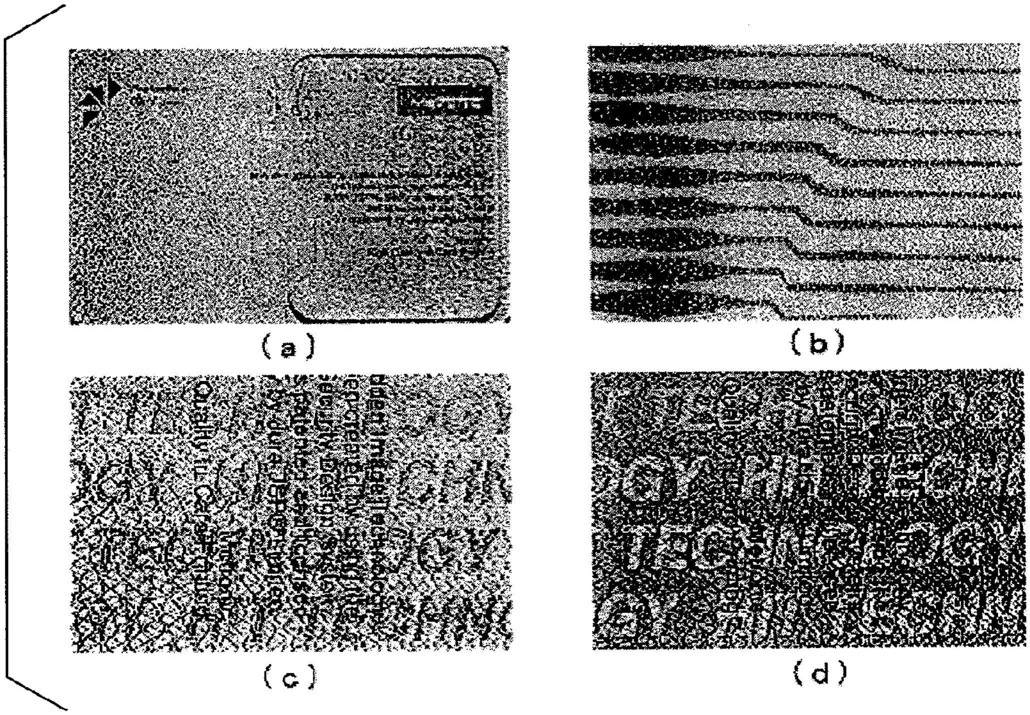
FIG. 61 shows views of an example of an authenticity determination method abroad using line phase modulation.

In the first embodiment, an additional design effect is imparted to the above-described objects 4. As shown in FIG. 39, the basic object arrangement is the same as that in FIG. 31. A smaller object width is set for the objects 4 so that the object area ratio per unit length of the portion where a pattern 9 having an arbitrary shape is formed changes upon observing the objects 4 from the front. This allows to visually recognize the pattern 9 having an arbitrary shape as a visible image. Alternatively, making the objects 4 in relief also enables to form a pattern having an arbitrary shape, as shown in FIG. 59.

Figure 40:
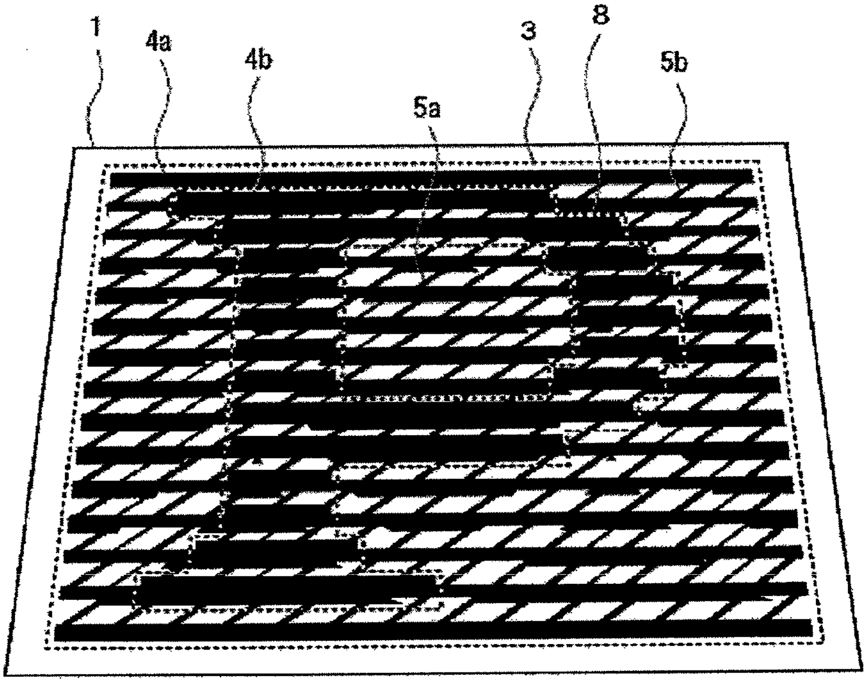
FIG. 40 is a perspective view showing a state in which high object portions 4*b* are observed in a density higher than that of low object portions 4*a;*

In addition, the objects 4 form a first invisible image 8 by low object portions 4*a* and high object portions 4*b* having different projection heights from the printing surface of a printed matter 1. When the observer observes the printed matter at a visual angle 15 that is an arbitrary angle other than 90° with respect to the base material as shown in FIG. 32, a visually recognized length 3*b* of the high object portion 4*b* looks longer than a visually recognized length 3*a* of the low object portion 4*a*. That is, since the visually recognized length 3*b* of the high object portion 4*b* looks longer than the visually recognized length 3*a* of the low object portion 4*a* on a printed pattern 3, the high object portions 4*b* are observed in a density higher than that of the low object portions 4*a*, as shown in the perspective view of FIG. 40. Hence, the first invisible image 8 in the region formed by the high object portions 4*b* appears as a visible image upon observation from off-center. However, proper adjustment is necessary because the larger the change in the object width of the objects 4 is, the poorer the visibility of the first invisible image 8 is.

(7) Seventh Embodiment

Figure 41:
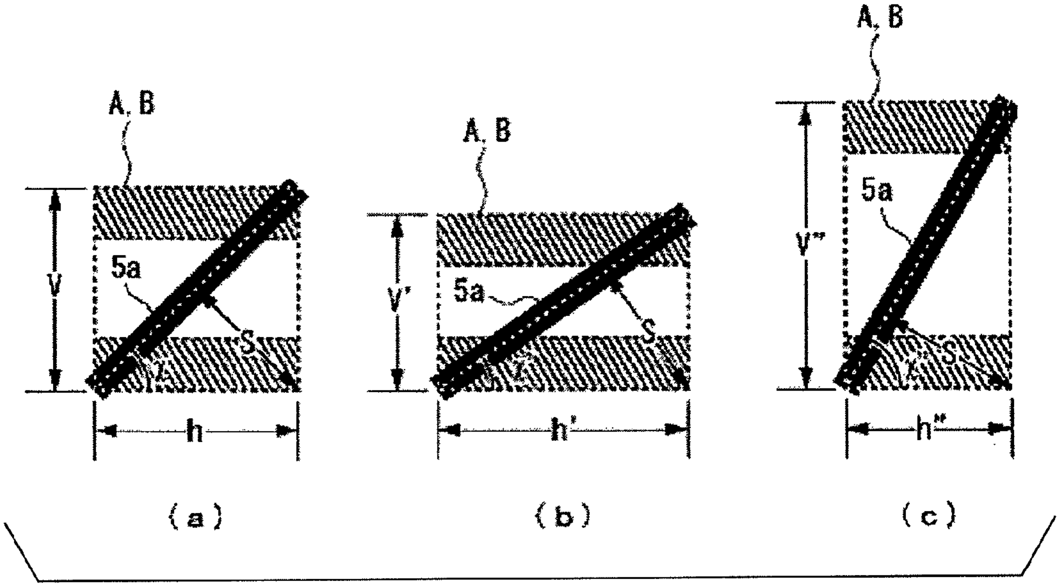
FIG. 41 shows explanatory views of a state in which the vertical length of the object unit can be adjusted by changing the angle of an object 5*a;*
Figure 42:
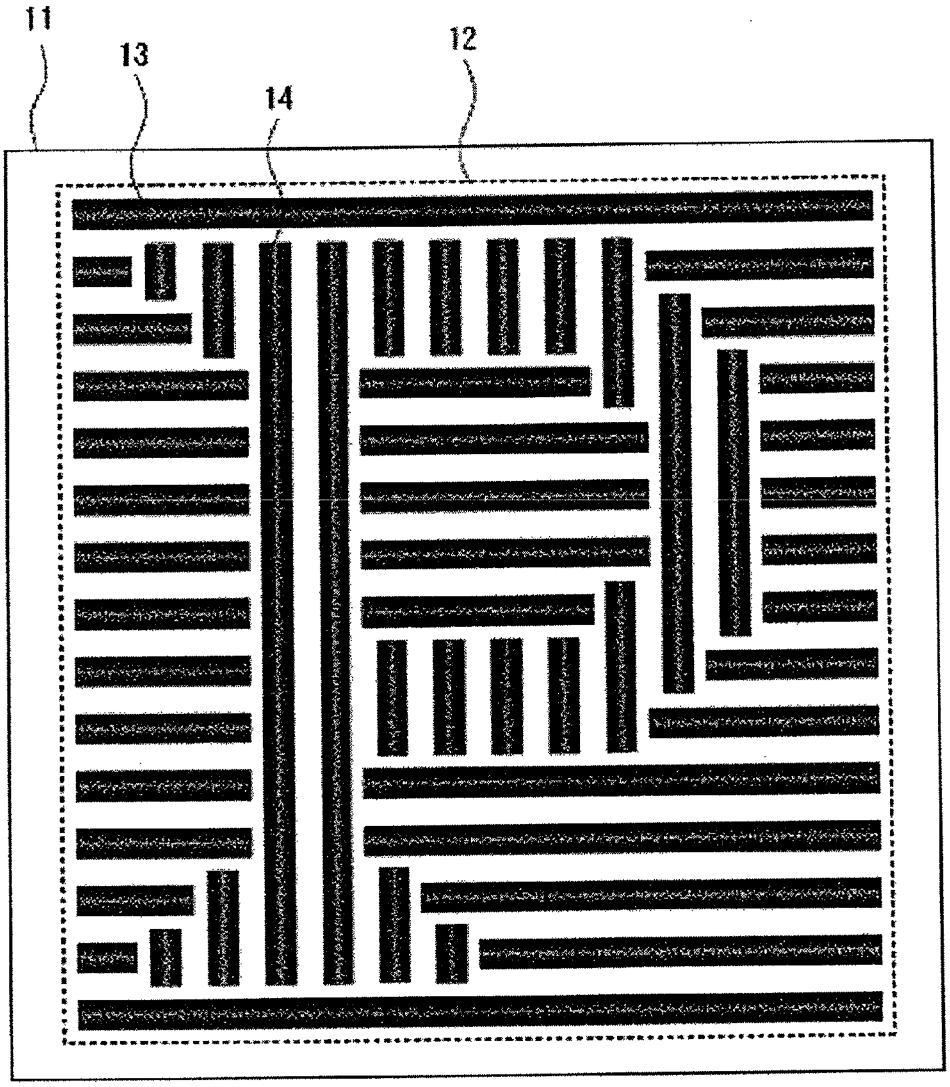
FIG. 42 is an explanatory view showing a state in which a printed surface according to a conventional anti-counterfeit technique called latent image intaglio is observed from the front.
Figure 43:
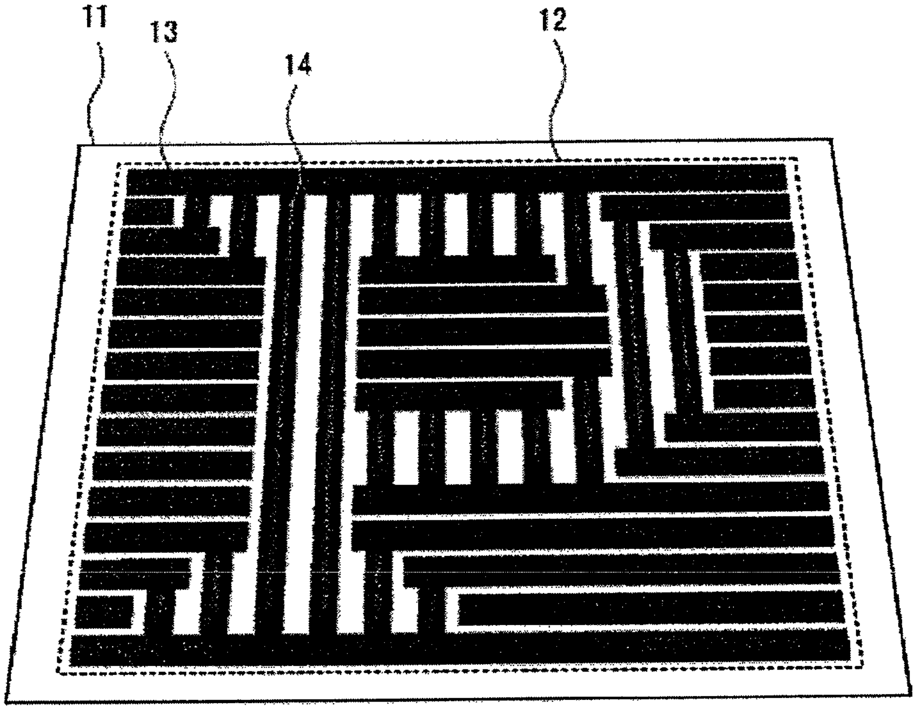
FIG. 43 is a perspective view showing a state in which the printed surface according to the conventional anti-counterfeit technique called latent image intaglio is observed from off-center.

The object unit of the above-described sixth embodiment basically has a square shape. However, the four sides of the object unit can have arbitrary lengths as long as a dimension S matches the pitch of the parallel line filter or lenticular lens of a discrimination tool 2. More specifically, when an angle $\chi$ of an object 5*a* changes, as shown in FIGS. 41(*a*) to 41(*c*), the vertical length of the object unit is given by $v=S\cdot\sec(\chi)$, and the horizontal length is given by $h=S\cdot\sec(\chi)$. For example, the angle $\chi$ is 45° in FIG. 41(*a*). When the dimension S corresponding to the pitch of the lenticular lens is 195 μm, both the vertical length V and the horizontal length h are 276 μm. In FIG. 41(*b*), the angle $\chi'$ is 35°. When the dimension S corresponding to the pitch of the lenticular lens is 195 μm, the vertical length v' is 239 μm, and the horizontal length h' is 341 μm. In FIG. 41(*c*), the angle $\chi''$ is 60°. When the dimension S corresponding to the pitch of the lenticular lens is 195 μm, the vertical length v" is 391 μm, and the horizontal length h" is 226 μm. Note that for object units C and D shown in FIGS. 35(*c*) and 35(*d*), the horizontal length h doubles in FIGS. 41(*a*) to 41(*c*) in accordance with the sixth to ninth embodiments. As described above, changing the angle of the object 5*a* enables to arbitrarily adjust the vertical length of the object unit, that is, the interval S of objects 4 arranged as horizontal parallel lines on a printed pattern 3 shown in FIG. 30. This also allows to adjust, as needed, an object width w of the objects 4 and the relationship in the visually recognized length between a low object portion 4*a* and a high object portion 4*b* on the printed pattern 3, as shown in the perspective view of FIG. 33. It is therefore possible to ensure the optimum visibility of a first invisible image 8.

Note that according to the sixth or seventh embodiment, since a clear visible image having a quality design and a high degree of freedom can be formed using the objects 4, the technique is also useful for printed matters such as securities. In addition, the first invisible image 8 in the region formed by the high object portions 4*b* of the objects 4 appears as a visible image upon observation from off-center. Furthermore, a second invisible image 6 formed by the objects 5*a* and pairs of objects 5*b* can easily and clearly be visualized by overlaying the discrimination tool 2 on the printed matter 1.

(8) Eighth Embodiment

Figure 44:
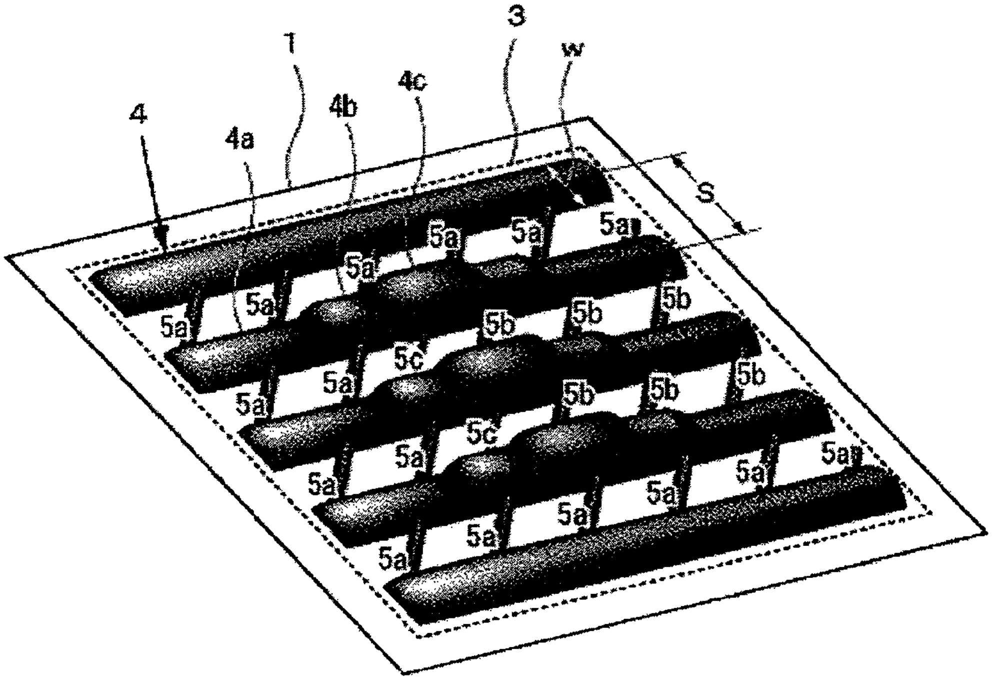
FIG. 44 is a partial perspective view conceptually showing the 3D structure of objects configured to add a first invisible image and a second invisible image made of first high object portions 4*b* and second high object portions 4*c* that have different heights.

In the above-described sixth and seventh embodiments, the objects 4 include the low object portions 4*a* and the high object portions 4*b* in two height levels. The number of height levels of the objects 4 is not limited to two, and a myriad of continuous height levels may be set. FIG. 44 is a partial perspective view conceptually showing the 3D structure of objects configured to add a first invisible image 8 and a second invisible image 6 featured in the eighth embodiment. As shown in FIG. 44, a printed pattern 3 is formed on a printed matter 1. The printed pattern 3 includes a plurality of objects 4 having an equal object width w and arranged at an equal interval, and objects 5*a* to 5*d* whose object widths have a ratio of "2:1". The printed pattern also includes low object portions 4*a*, first high object portions 4*b*, and second high object portions 4*c* having different projection heights from the printing surface of the printed matter 1. The relationship in the projection height between the first high object portions 4*b* and the second high object portions 4*c* is given by first high object portion 4*b*<second high object portion 4*c*.

Figure 45:
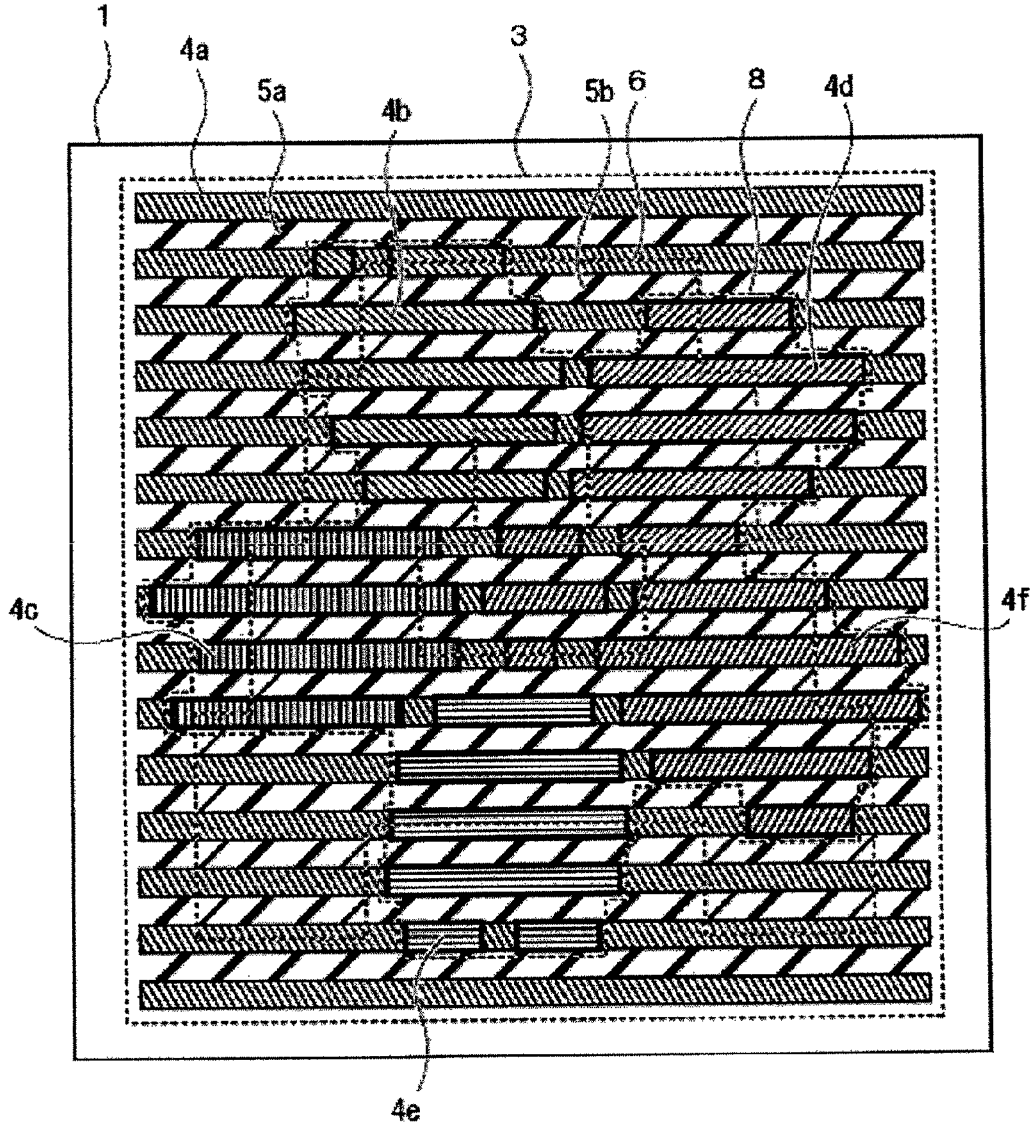
FIG. 45 is a plan view showing a state in which a printed matter 1 formed from objects 4 including low object portions 4*a* and first high object portions 4*b* to fifth high object portions 4*f* in different height levels is observed right from above.

FIG. 45 is a plan view showing a state in which a printed matter 1 is observed right from above. The objects 4 include the low object portions 4*a* and the first high object portions 4*b* to fifth high object portions 4*f* in different height levels. The low object portions 4*a* form the background pattern, whereas the first high object portions 4*b* to the fifth high object portions 4*f* having different heights form a region serving as the first invisible image 8. The relationship in the projection height between the first high object portions 4*b* to the fifth high object portions 4*f* is given by first high object portion 4*b*<second high object portion 4*c*<third high object portion 4*d*<fourth high object portion 4*e*<fifth high object portion 4*f*.

Figure 46:
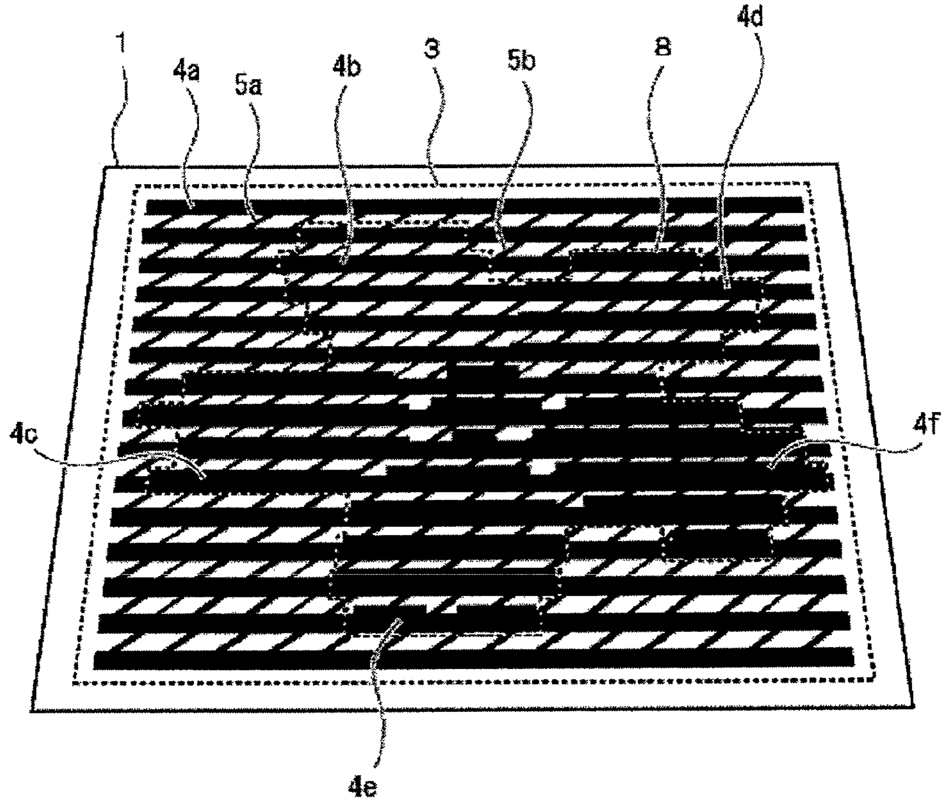
FIG. 46 is a perspective view showing a state in which a first invisible image 8 having a shade is visualized in a region including the first high object portions 4*b* to the fifth high object portions 4*f* by observing from off-center.
Figure 47:
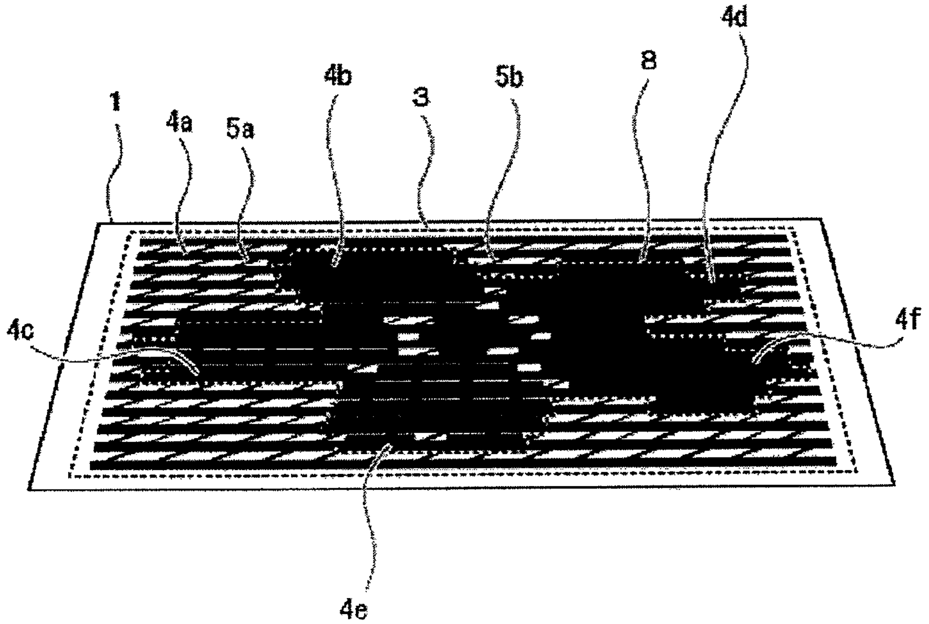
FIG. 47 is a perspective view showing a state in which the first invisible image 8 is visualized in the region including the first high object portions 4*b* to the fifth high object portions 4*f* by observing from off-center.

When the observer observes the printed matter 1 at a visual angle 15 that is an arbitrary angle, the printed matter looks in different ways because of the heights of the low object portions 4*a* and the high object portions 4*b*, as shown in FIG. 32 described above. However, since the printed matter 1 according to the eighth embodiment has the low object portions 4*a* and the first high object portions 4*b* to the fifth high object portions 4*f* having different heights, a visually recognized length 3*b* shown in FIG. 32 looks longer in the fifth high object portions 4*f* than in the first high object portions 4*b*. That is, since the visually recognized length 3*b* of the high object portion 4*b* looks longer than a visually recognized length 3*a* of the low object portion 4*a* in the printed pattern 3, the high object portions 4*b* are observed in a density higher than that of the low object portions 4*a*, as shown in the perspective view of FIG. 46. Hence, in the region formed from the first high object portions 4*b* to the fifth high object portions 4*f*, the first invisible image 8 partially appears as a visible image having a shade upon observation from off-center. When the observer observes the printed matter at the smaller visual angle 15, the first invisible image 8 completely appears as a visible image in the region formed from the first high object portions 4*b* to the fifth high object portions 4*f*, as shown in FIG. 47.

Note that in the eighth embodiment, the first high object portions 4*b* to the fifth high object portions 4*f* are formed in five height levels. However, the number of height levels is not particularly limited. The first invisible image 8 can also be expressed like a continuous tone image by increasing the number of height levels.

(9) Ninth Embodiment

Figure 48:
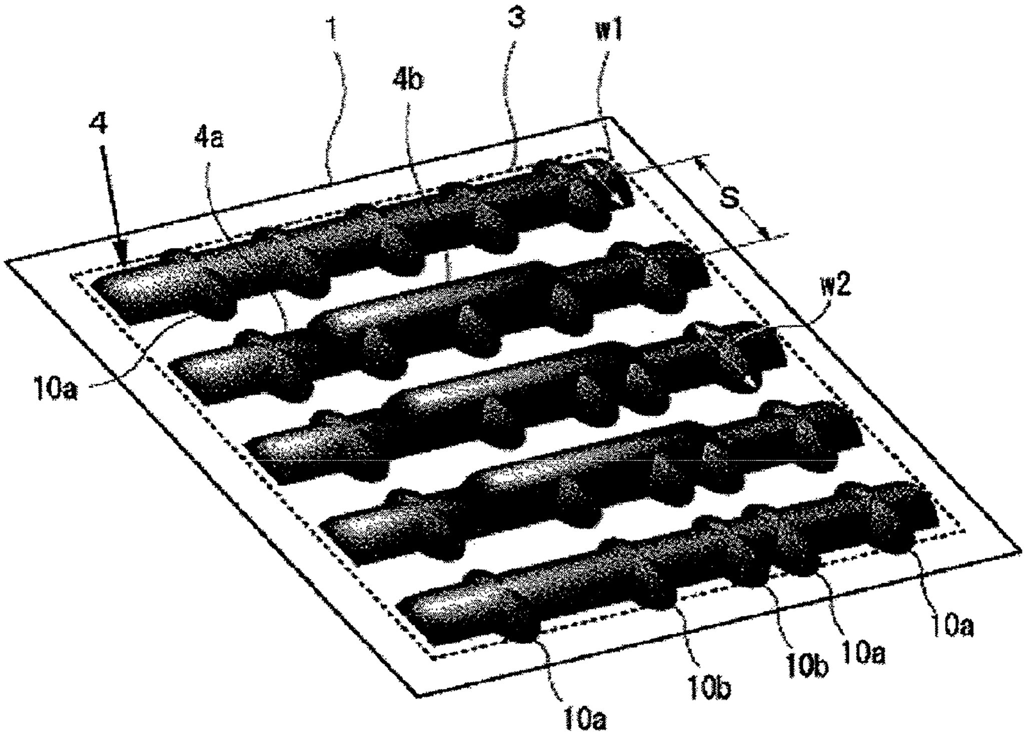
FIG. 48 is a partial perspective view conceptually showing the 3D structure of objects configured to add a first invisible image and a second invisible image.

In the sixth to eighth embodiments, the first invisible image and the second invisible image separately act in the objects 4 and the objects 5*a* to 5*d*. However, the first invisible image and the second invisible image may be included in the objects 4. FIG. 48 is a partial perspective view conceptually showing the 3D structure of objects configured to add a first invisible image 8 and a second invisible image 6. As shown in FIG. 48, a printed pattern 3 is formed on a printed matter 1. The printed pattern 3 includes a plurality of objects 4 having an equal object width w1 and arranged at an equal interval. The objects 4 include low object portions 4*a* and high object portions 4*b* that have different projection heights from the printing surface of the printed matter 1 so as to form the portion of the first invisible image, and object portions 10*a* and 10*b* that have an object width w2 and are arranged in contact with the objects 4 in a direction perpendicular to the longitudinal direction of the objects 4 so as to form the portion of the second invisible image.

Figure 49:
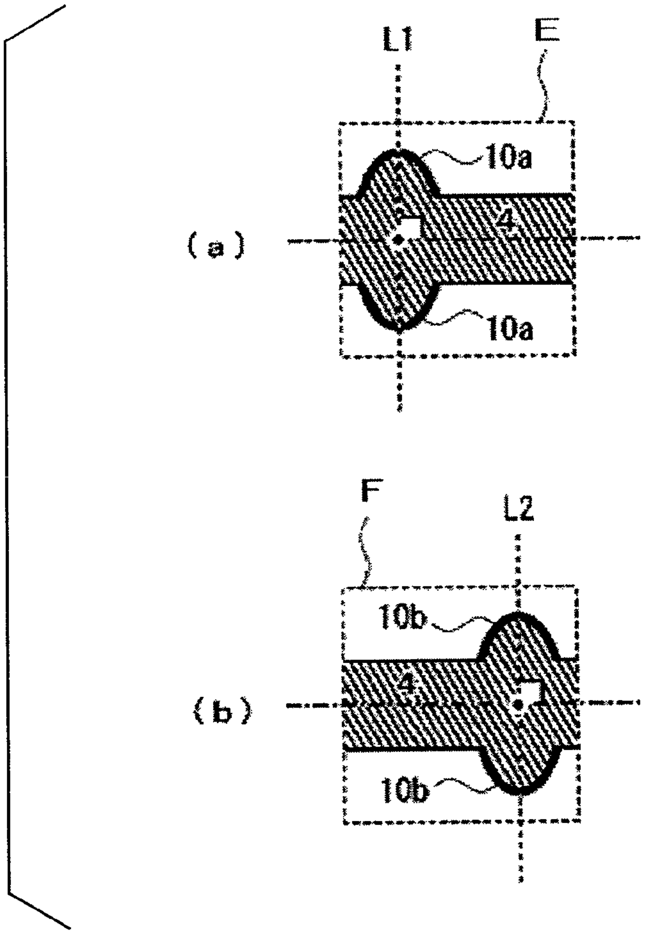
FIG. 49 shows partially enlarged explanatory views of a basic object arrangement configured to visualize a second invisible image via a discrimination tool.

FIG. 49 shows partially enlarged explanatory views of a basic object arrangement configured to visualize the second invisible image 6 via a discrimination tool 2. In the present invention, the object units include two object units E and F shown in FIGS. 49(*a*) and 49(*b*). In the object units E and F, the object portions 10*a* and 10*b* are formed in a desired arrangement. Lines L1 and L2 run along the direction of the grooves of the discrimination tool 2 shown in FIG. 34. In FIG. 49, the angle is almost 90°. The total length of the object units E and F equals the pitch of the grooves of the discrimination tool 2. The object units E and F shown in FIGS. 49(*a*) and 49(*b*) are arranged on the surface of the printed matter in accordance with desired rules. The object portions 10*a* and 10*b* in the object units E and F shown in FIGS. 49(*a*) and 49(*b*) need not always have the shapes shown in FIG. 49 and may have any other shapes.

Figure 50:
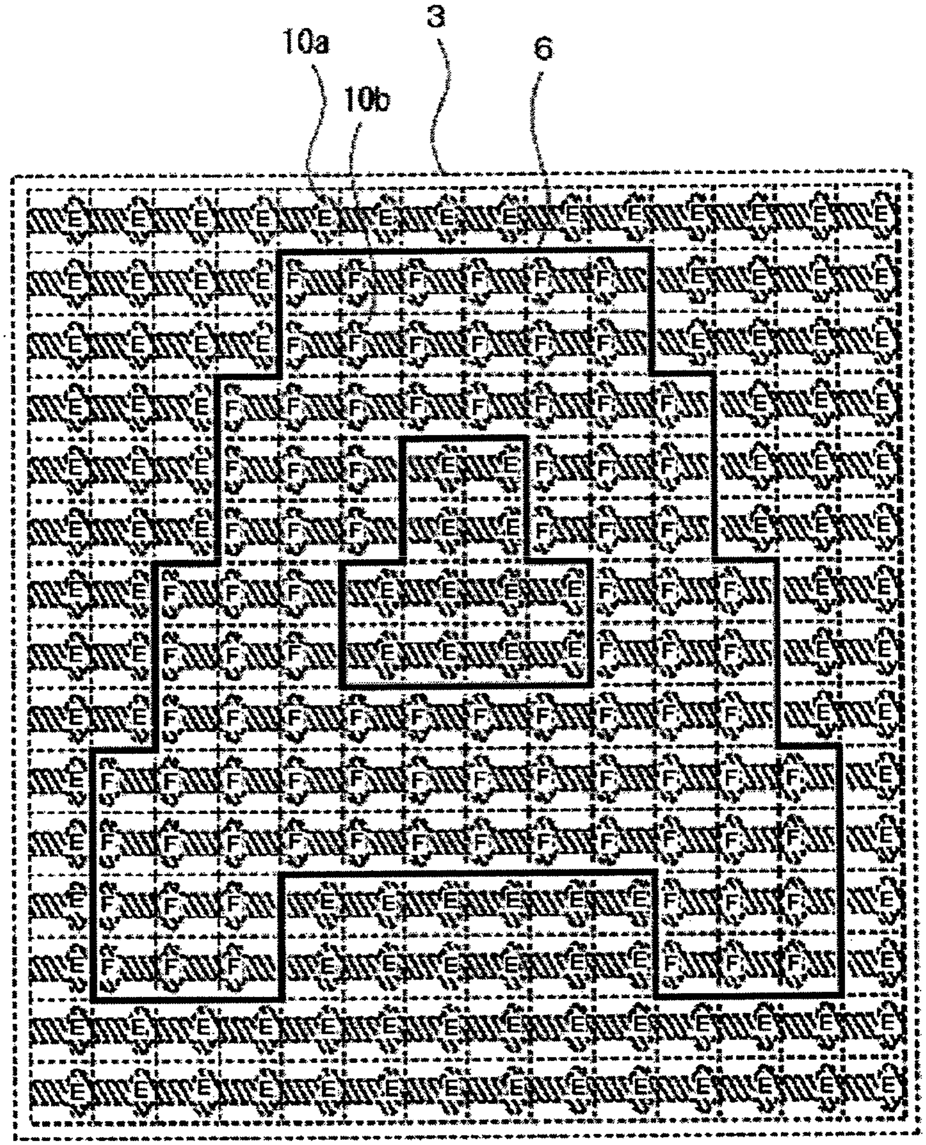
FIG. 50 is an explanatory view showing a positional relationship in which object units E and F are continuously periodically arranged in a matrix on a printed pattern 3 of a printed matter tightly in the vertical and horizontal directions.

FIG. 50 is an explanatory view showing a positional relationship in which the object units E in FIG. 49(*a*) and the object units F in FIG. 49(*b*) are continuously periodically arranged in a matrix on the printed pattern 3 of the printed matter tightly in the vertical and horizontal directions. Note that the bold solid lines in FIG. 50 simply indicate the portion of the second invisible image 6.

Figure 51:
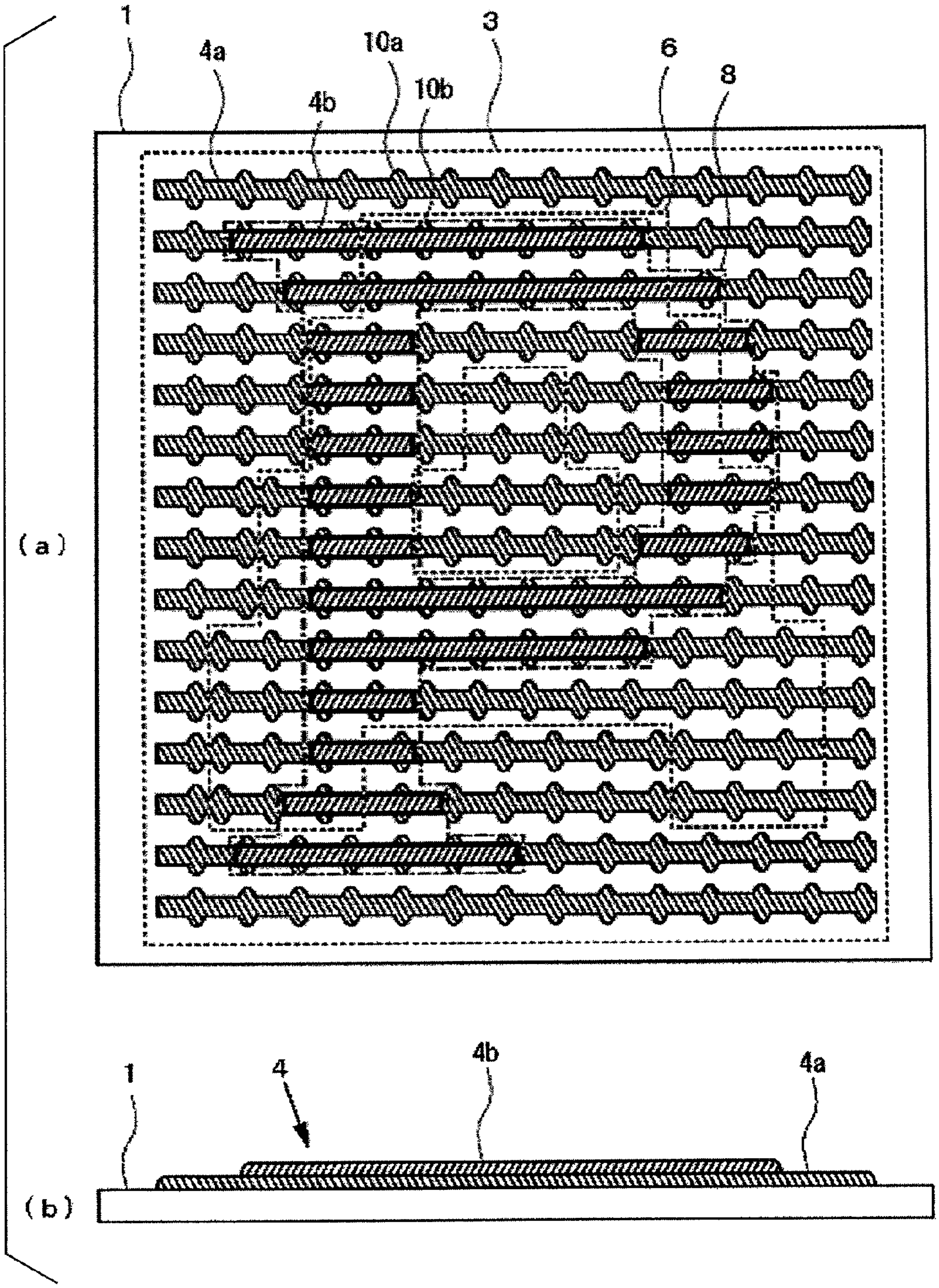
FIG. 51 shows explanatory views of a state in which objects 4 include low object portions 4*a* and high object portions 4*b;*

FIG. 51 shows explanatory views of a state in which the objects 4 include the low object portions 4*a* and the high object portions 4*b*. When the printed matter 1 is observed right from above, as shown in the plan view of FIG. 51(*a*), the observer does not recognize the projection heights of the low object portions 4*a* and the high object portions 4*b*. Actually, the low object portions 4*a* and the high object portions 4*b* have different projection heights, as shown in the front view of FIG. 51(*b*). That is, the low object portions 4*a* form the background pattern, whereas the high object portions 4*b* form a region serving as the first invisible image 8. Hence, the first invisible image 8 in the region formed by the high object portions 4*b* appears as a visible image upon observation from off-center, as in the sixth to eighth embodiments.

Figure 52:
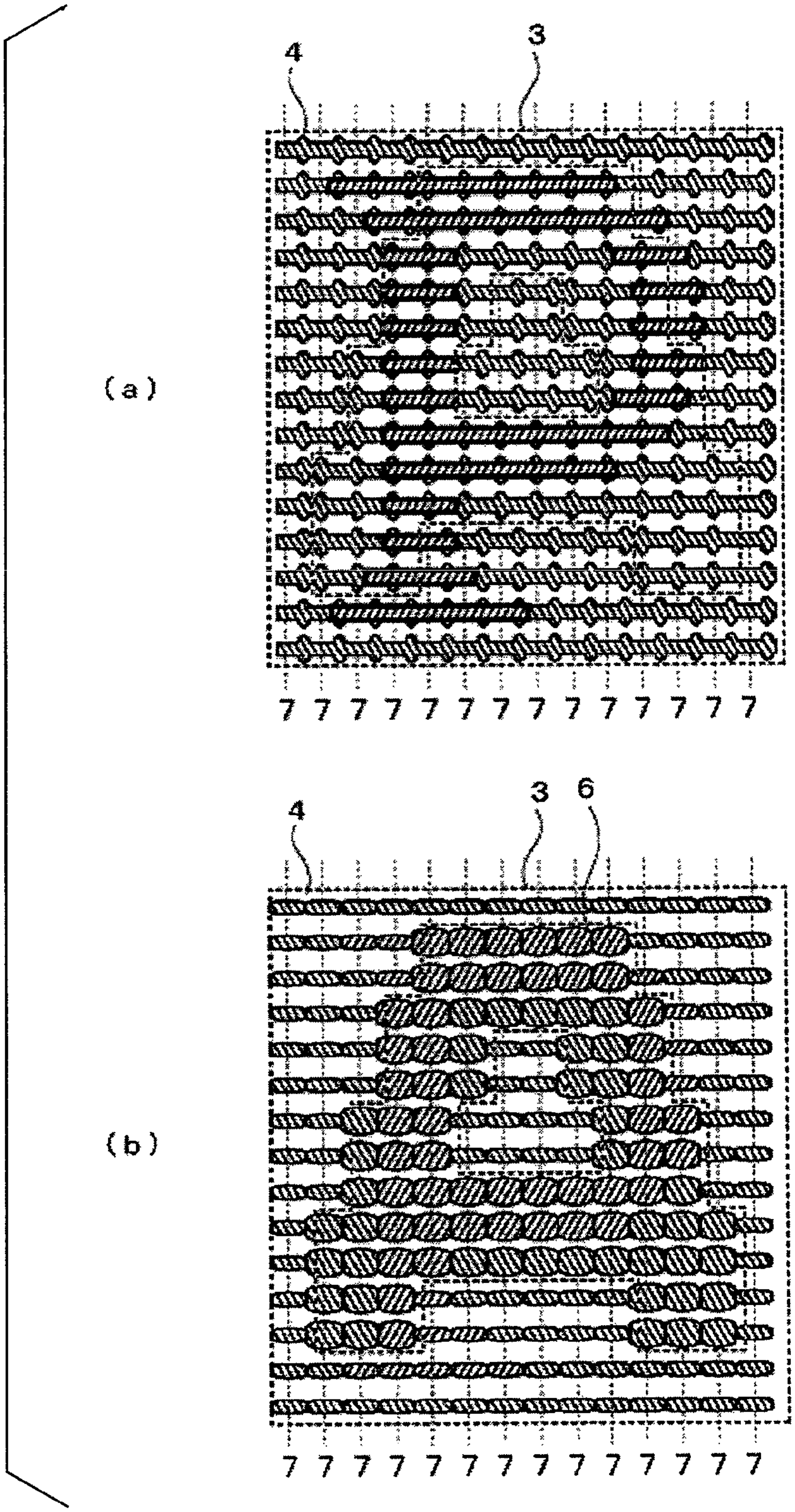
FIG. 52 shows views of a state in which visual observation from the front is done while overlaying a discrimination tool on the printed pattern 3 of the printed matter 1.

FIG. 52 shows a state in which visual observation from the front is done while overlaying the discrimination tool 2 formed from a lenticular lens on the printed pattern 3 of the printed matter 1 so as to make the center line of each lens element coincide with a line L1. When each center line 7 of the lenticular lens exists at the position shown in FIG. 52(*a*) so as to coincide with the line L1 in FIG. 49(*a*), the object portions 10*a* are located on the center lines 7. Since the object portions 10*a* located on the center lines 7 look magnified by the characteristics of the lenticular lens, a visible image having the positive graphic pattern shown in FIG. 52(*b*) is visualized upon visual observation. When each center line 7 of the lenticular lens coincides with a line L2 in FIG. 49(*b*), a visible image having the negative graphic pattern is visualized upon visual observation. That is, the second invisible image 6 appears as a negative or positive visible image.

DESCRIPTION OF THE REFERENCE NUMERALS

1 printed matter
2 discrimination tool
3 printed pattern
4 main line
4' object that forms hollow portion
4*a* low object portion
4*b* high object portion
4*c* high object portion
4*d* high object portion
4*e* high object portion
4*f* high object portion
5 sub-line
5*a* object
5*b* object
5*c* object
5*d* object
5*a*' hollow portion
5*b*' hollow portion
5*c*' hollow portion
5*d*' hollow portion
6 invisible image
7 center line
8 invisible image
9 pattern
10*a* object portion
10*b* object portion
11 printed matter
12 printed pattern
13 object
13 object group
14 object group
15 visual angle
A object unit
B object unit
C object unit
D object unit
E object unit
E' object unit
F object unit
F' object unit
L1 line
L2 line
L3 line
L4 line
S dimension
w object width
w1 object width
w2 object width

The invention claimed is:

1. An anti-counterfeit printed matter comprising:

a visible image printed on an outer surface of a base material by a first object group arrayed in a first direction at a predetermined pitch and a second object group printed in a non-imaging area of the first object group on the outer surface of the base material, the second object group printed on the outer surface of the base material in a second direction with respect to the first object group, the second object group forms a negative region and a positive region of an invisible image, the second object group includes a plurality of second objects that form one of the negative region and the positive region of the invisible image, a plurality of third objects printed on the outer surface of the base material that form the other region, and a plurality of fourth objects printed on the outer surface of the base material that relax density imbalance, an object area of the second object is the same or the same as that of the third objects, and the fourth object has an object area ½ or ½ that of the second object or the third objects, the second objects, the third objects, and the fourth objects are formed in a plurality of object units that are periodically arrayed, the plurality of object units include a first object unit, a second object unit, a third object unit, and a fourth object unit, the first object unit and the second object unit have the same size, the third object unit and the fourth object unit include an object unit whose size in the first direction is twice as large as that of the first object unit and the second object unit, in the first object unit, the second object is formed so as to pass through a center of the first object unit in a "2:2" ratio, in the second object unit, the third objects in pair are obtained by dividing the second object and formed at equal intervals from a center of the second object unit in a "0:0" and "4:4" ratio so as to oppose each other, in the third object unit, the second object, the fourth object, and one of the third objects in pair are sequentially formed in a "2:3:3" ratio, in the fourth object unit, the other of the third objects in pair, the fourth object, and the second object are sequentially formed in a "3:3:2" ratio, and one of the third object unit and the fourth object unit is formed on at least part of an outline of the invisible image;

wherein the invisible image is adapted to be viewed with a discrimination tool to reveal a visible printed image.

2. An anti-counterfeit printed matter according to claim 1, wherein:

the third object unit formed on the outline of the invisible image is printed on the outer surface of the base material on one side of the first object unit along the first direction, and the fourth object unit formed on the outline of the invisible image is printed on the outer surface of the base material on the other side of the first object unit along the first direction.

3. An anti-counterfeit printed matter according to claim 1, wherein the second objects, the third objects, and the fourth objects are printed on the outer surface of the base material as one line across the object units adjacent in the second direction.

4. An anti-counterfeit printed matter according to claim 1, wherein when a width of the first object unit and the second object unit in the first direction is represented by 4, and a width of the third object unit and the fourth object unit in the first direction is represented by 8, the second object formed in the first object unit is printed on the outer surface of the base material such that a center of the second object coincides with a center of the first object unit at a position based on a ratio of "2:2" in the first direction, the third objects formed in the second object unit are printed on the outer surface of the base material as a pair of objects obtained by dividing the second object and formed at equal intervals from a center of the second object unit in a "0:0" and "4:4" ratio in the first direction so as to oppose each other, the second object, the fourth object, and one of the third objects in pair are sequentially formed in the third object unit are arranged at positions in a "2:3:3" ratio in the first direction such that the center of the second object is spaced apart from one edge by 2, a center of the fourth object is spaced apart from the center of the second object by 3, and one of the third objects in pair is spaced apart from the center of the fourth object by 3, and the other of the third objects in pair, the fourth object, and the second object are sequentially formed in the fourth object unit are printed on the outer surface of the base material at positions in a "3:3:2" ratio in the first direction such that the one of the third objects in pair is printed on the outer surface of the base material at one edge, a center of the fourth object is spaced apart by 3, and the second object is spaced apart from the center of the fourth object by 3.

5. An anti-counterfeit printed matter according to claim 1, wherein each of the second object, the third object, and the fourth object has a triangular shape.

6. An anti-counterfeit printed matter comprising:

a visible image is printed on an outer surface of a base material by a first object group printed on the outer surface of the base material radially from a center and a second object group printed on the outer surface of the base material in a non-imaging area of the first object group, the second object group is printed on the outer surface of the base material concentrically from the center at a predetermined pitch, the second object group forms a negative region and a positive region of an invisible image, the second object group includes a plurality of second objects that form one of the negative region and the positive region of the invisible image, a plurality of third objects that form the other region, and a plurality of fourth objects that relax density imbalance, an object width of the second object is the same or the same as that of the third object, the fourth object has an object width ½ or ½ that of the second object or the fourth object, the second objects, the third objects, and the fourth objects are printed on the outer surface of the base material in a plurality of arch-shaped object units that are periodically arrayed, the plurality of arch-shaped object units include a first object unit, a second object unit, a third object unit, and a fourth object unit, the first object unit and the second object unit that are adjacent have the same size, the third object unit and the fourth object unit include an object unit having a size larger than that of the first object unit and the second object unit that are adjacent and a shape elongated toward the center in a concentric direction with respect to the first object unit and the second object unit, in the first object unit, the second object is formed in the concentric direction at a predetermined position with a predetermined tilted major axis relative to the first object unit, in the second object unit, the third object is formed in the concentric direction at a position shifted from a formation position of the second object by a ½ or ½ pitch, said third object having the same predetermined tilted major axis relative to the second object unit, in the third object unit, the second object, the fourth object, and the third object are sequentially printed on the outer surface of the base material with the same predetermined tilted major axis relative to the third object unit, in the fourth object unit, the third object and the fourth object are sequentially printed on the outer surface of the base material with the same predetermined tilted major axis relative to the fourth object unit, and one of the third object unit and the fourth object unit is printed on the outer surface of the base material on at least part of an outline of the invisible image;

wherein the invisible image is adapted to be viewed with a discrimination tool to reveal a visible printed image.

7. An anti-counterfeit printed matter according to claim 6, wherein the first object group and the second object group are printed on the outer surface of the base material from projecting objects.

8. An anti-counterfeit printed matter according to claim 6, wherein:

fifth object units and sixth object units that have the same area are printed on the outer surface of the base material in a matrix on a surface of the base material, the fifth object unit has a first object printed on the outer surface of the base material to run in a first direction, and a second object printed on the outer surface of the base material at a first position in a region where the first object does not exist, the sixth object unit has the first object printed on the outer surface of the base material to run in the first direction, and a third object printed on the outer surface of the base material at a second position in the region where the first object does not exist, the first object has a first object portion having a first height from the surface of the base material and a second object portion having a second height different from the first height, thereby forming a first invisible image, and a region where one of the fifth object unit and the sixth object unit is printed on the outer surface of the base material forms an image portion of a second invisible image, whereas a region where the other is arranged forms a background portion of the second invisible image.

9. An anti-counterfeit printed matter according to claim 8, wherein:

the first invisible image is visually recognizable from a predetermined angle range different from 90° with respect to the base material, and the second invisible image is visually recognizable by enlarging the second object arranged at the first position in each of the plurality of fifth object units or by enlarging the third object arranged at the second position in each of the plurality of second object units.

10. An anti-counterfeit printed matter according to claim 8, wherein:

when the sixth object unit is printed on the outer surface of the base material on one side of the fifth object unit along the first direction, one of the second object in the fifth object unit and the third object in the sixth object unit is deleted, and a fourth object having an object area ratio ½ or ½ that of the second object and the third object is printed on the outer surface of the base material at a center of one of the fifth object unit and the sixth object unit in which the object has been deleted so as to relax density imbalance, and when the sixth object unit is printed on the outer surface of the base material on the other side of the fifth object unit along the first direction, the fourth object is printed on the outer surface of the base material at a position corresponding to a boundary line between the fifth object unit and the sixth object unit.

11. An anti-counterfeit printed matter according to claim 8, wherein:

the first objects, the second objects, the third objects, and the fourth objects are formed in a plurality of object units, the plurality of object units include a first object unit, a second object unit, a third object unit, and a fourth object unit, the first object unit and the second object unit have the same size, a size of the third object unit and the fourth object in the first direction is twice as large as that of the first object unit and the second object unit in the first object unit, the second object is printed on the outer surface of the base material so as to pass through a center of the first object unit, in the second object unit, the third object in pair having a object area ratio ½ or ½ that of the second object are printed on the outer surface of the base material at equal intervals from a center of the second object unit so as to oppose each other, in the third object unit, the second object, the fourth object, and the third object having the object area ratio ½ or ½ that of the second object are arrayed in the order named, and in the fourth object unit, the third object having the object area ratio ½ or ½ that of the second object, the fourth object, and the second object are arranged in the order named.

12. An anti-counterfeit printed matter according to claim 8, wherein:

object units arranged adjacently on one side of the first object unit along the first direction are the first object unit and the third object unit, object units arranged adjacently on the other side of the first object unit along the first direction are the first object unit and the fourth object unit, object units arranged adjacently on one side of the second object unit along the first direction are the second object unit and the fourth object unit, and object units arranged adjacently on the other side of the second object unit along the first direction are the second object unit and the third object unit.

13. An anti-counterfeit printed matter according to claim 8, wherein each of the second object, the third object, and the fourth object is formed from a hollow portion.

14. An anti-counterfeit printed matter according to claim 8, wherein a visible image is formed by printing on the outer surface of the base material the first objects whose object area ratio per unit length at least partially varies.

15. An anti-counterfeit printed matter according to claim 8, wherein the visible image is formed by printing on the outer surface of the base material the first objects at least partially in relief.

16. An anti-counterfeit printed matter according to claim 8, wherein each of the second object, the third object, and the fourth object is formed from one of a circle and a polygon.

17. An anti-counterfeit printed matter according to claim 8, wherein the second object, the third object, and the fourth object are printed on the outer surface of the base material to be adjacent to the first object.

18. An anti-counterfeit printed matter according to claim 8, wherein the second object and the third object are printed on the outer surface of the base material to be integrated with the first object.

19. An anti-counterfeit printed matter according to claim 2, wherein the second objects, the third objects, and the fourth objects are formed as one line across the object units adjacent in the second direction.

20. An anti-counterfeit printed matter according to claim 2, wherein when a width of the first object unit and the second object unit in the first direction is represented by 4, and a width of the third object unit and the fourth object unit in the first direction is represented by 8, the second object formed in the first object unit is printed on the outer surface of the base material such that a center of the second object coincides with a center of the first object unit at a position based on a ratio of "2:2" in the first direction, the third objects formed in the second object unit are printed on the outer surface of the base material as a pair of objects obtained by dividing the second object and formed at equal intervals from a center of the second object unit in a "0:0" and "4:4" ratio in the first direction so as to oppose each other, the second object, the fourth object, and one of the third objects in pair are sequentially formed in the third object unit are printed on the outer surface of the base material at positions in a "2:3:3" ratio in the first direction such that the center of the second object is spaced apart from one edge by 2, a center of the fourth object is spaced apart from the center the second object by 3, and one of the third objects in pair is spaced apart from the center of the fourth object by 3, and the other of the third objects in pair, the fourth object, and the second object are sequentially formed in the fourth object unit are printed on the outer surface of the base material at positions in a "3:3:2" in the first direction such that the one of the third objects in pair is printed on the outer surface of the base material at one edge, a center of the fourth object is spaced apart by 3, and the second object is spaced apart from the center of the fourth object by 3.

* * * * *